US005969861A

United States Patent [19]

Ueda et al.

[11] Patent Number: 5,969,861

[45] Date of Patent: Oct. 19, 1999

[54] POLARIZING OPTICAL SYSTEM

[75] Inventors: Motoi Ueda, Naka-gun; Takeshi Hasegawa, Tokyo; Mikio Okamoto, Yokohama, all of Japan

[73] Assignee: Nikon Corporation, Tokyo, Japan

[21] Appl. No.: 08/691,923

[22] Filed: Aug. 1, 1996

Related U.S. Application Data

[63] Continuation-in-part of application No. 08/532,693, filed as application No. PCT/JP95/00164, Feb. 7, 1995.

[30] Foreign Application Priority Data

| | | | |
|---|---|---|---|
| Feb. 7, 1994 | [JP] | Japan | 6-013570 |
| Apr. 8, 1994 | [JP] | Japan | 6-070623 |
| Aug. 2, 1995 | [JP] | Japan | 7-197622 |
| Aug. 3, 1995 | [JP] | Japan | 7-198738 |

[51] Int. Cl.[6] ...................... G02B 5/30

[52] U.S. Cl. ...................... 359/488; 359/485; 359/501; 501/11; 501/53; 501/73

[58] Field of Search ...................... 359/485, 488, 359/501; 501/11, 53, 55, 60, 61, 73, 74, 75

[56] References Cited

U.S. PATENT DOCUMENTS

| | | | |
|---|---|---|---|
| 3,801,878 | 4/1974 | Merrin | 317/234 |
| 4,127,322 | 11/1978 | Jacobson et al. | 353/31 |
| 5,375,012 | 12/1994 | Borrelli et al. | 359/485 |

FOREIGN PATENT DOCUMENTS

| | | |
|---|---|---|
| 26 03 450 | 9/1976 | Germany . |
| 123 521 | 1/1977 | Germany . |
| 35 04 558 | 8/1986 | Germany . |
| 246 978 | 6/1987 | Germany . |
| 195 80 247 | 3/1996 | Germany . |
| 44 34 921 | 4/1996 | Germany . |
| 58-088139 | 11/1981 | Japan . |
| 61-84606 | 4/1986 | Japan . |
| 61-141402 | 6/1986 | Japan . |
| 62-12634 | 1/1987 | Japan . |
| 3-284705 | 12/1991 | Japan . |
| 61-84606 | 12/1991 | Japan . |

OTHER PUBLICATIONS

Optical Technology Contact, Etsuhiro Mochida, Birefringence by Phase Modulation Method–Measurement and Application.

Patent Abstracts of Japan, JP pat No. 3–50138, Mar. 1991, Abs. date May 1991, vol. 15, No. 193.

*Primary Examiner*—Casandra Spyrou
*Assistant Examiner*—Darren E. Schuberg
*Attorney, Agent, or Firm*—Foley & Lardner

[57] ABSTRACT

A polarizing optical system comprising: at least, polarizing characteristic imparting means for imparting a polarizing characteristic to light emitted from a light source; analyzer means for converting the polarizing characteristic into light intensity information; and output means for outputting the light intensity information; at least one element constituting the polarizing characteristic imparting means comprising an optical glass having a photoelastic constant C in the range of substantially zero with respect to a wavelength range of 0.4 μm to 3.0 μm. The optical glass has a photoelastic constant C in the range of −0.8 to +0.8 ($10^{-8}$ $cm^2/N$) with respect to a wavelength range of 0.4 μm to 3.0 μm, and has the following composition when represented in terms of wt.% of oxides:

$SiO_2$: 17.0–27.0% (35.5–57.0 mol %)

$Li_2O+Na_2O+K_2O$: 0.5–5.0% (0.7–20.0 mol %)

PbO: 72.0–75.0% (39.1–45.0 mol %)

$As_2O_3+Sb_2O_3$: 0–3.0% (0.0–2.0 mol %)

The above-mentioned optical glass for polarizing optical system causes substantially no optical path difference based on an optical anisotropy, even when a mechanical external stress or a thermal stress occurs. Accordingly, it is possible to easily attain a polarizing optical system which is capable of well retaining the polarizing characteristic of optical information by substantially obviating the effect of the thermal stress or mechanical external stress.

26 Claims, 37 Drawing Sheets

(Table 1)

LIST OF EXAMPLES (mol%, wt%)

| No. | 1 | | 2 | | 3 | | 4 | |
|---|---|---|---|---|---|---|---|---|
| | mol% | wt% | mol% | wt% | mol% | wt% | mol% | wt% |
| $SiO_2$ | 52.7 | 23.9 | 52.7 | 23.8 | 52.7 | 23.8 | 52.7 | 23.8 |
| $Na_2O$ | 1.9 | 0.9 | 1.9 | 0.9 | 1.9 | 0.9 | 1.9 | 0.9 |
| $K_2O$ | 1.3 | 0.9 | 1.3 | 0.9 | 1.3 | 0.9 | 1.3 | 0.9 |
| PbO | 43.9 | 74.0 | 42.9 | 72.2 | 41.9 | 70.4 | 40.9 | 68.6 |
| $PbF_2$ | – | – | 1.0 | 1.9 | 2.0 | 3.7 | 3.0 | 5.5 |
| $Sb_2O_3$ | 0.2 | 0.3 | 0.2 | 0.3 | 0.2 | 0.3 | 0.2 | 0.3 |
| $K_2SiF_6$ | – | – | – | – | – | – | – | – |
| F/O (%) | – | | 1.31 | | 2.65 | | 4.00 | |
| PHOTOELASTIC CONSTANT ($10^{-8}$ $cm^2/N$) | +0.02 | | +0.02 | | +0.03 | | +0.01 | |
| REFRACTIVE INDEX nd | 1.849 | | 1.845 | | 1.841 | | 1.837 | |
| WAVELENGTH CORR. TO TRANSMITTANCE OF 80% (nm) | 416 | | 411 | | 408 | | 404 | |

ARRANGEMENT OF OPTICAL ELEMENTS

Fig. 16

(Table 1)

LIST OF EXAMPLES (mol%, wt%)

| No. | 1 | | 2 | | 3 | | 4 | |
|---|---|---|---|---|---|---|---|---|
| | mol% | wt% | mol% | wt% | mol% | wt% | mol% | wt% |
| $SiO_2$ | 52.7 | 23.9 | 52.7 | 23.8 | 52.7 | 23.8 | 52.7 | 23.8 |
| $Na_2O$ | 1.9 | 0.9 | 1.9 | 0.9 | 1.9 | 0.9 | 1.9 | 0.9 |
| $K_2O$ | 1.3 | 0.9 | 1.3 | 0.9 | 1.3 | 0.9 | 1.3 | 0.9 |
| PbO | 43.9 | 74.0 | 42.9 | 72.2 | 41.9 | 70.4 | 40.9 | 68.6 |
| $PbF_2$ | — | — | 1.0 | 1.9 | 2.0 | 3.7 | 3.0 | 5.5 |
| $Sb_2O_3$ | 0.2 | 0.3 | 0.2 | 0.3 | 0.2 | 0.3 | 0.2 | 0.3 |
| $K_2SiF_6$ | — | — | — | — | — | — | — | — |
| F/O (%) | — | | 1.31 | | 2.65 | | 4.00 | |
| PHOTOELASTIC CONSTANT ($10^{-8}$ $cm^2/N$) | +0.02 | | +0.02 | | +0.03 | | +0.01 | |
| REFRACTIVE INDEX nd | 1.849 | | 1.845 | | 1.841 | | 1.837 | |
| WAVELENGTH CORR. TO TRANSMITTANCE OF 80% (nm) | 416 | | 411 | | 408 | | 404 | |

Fig. 17

(Table 2)

LIST OF EXAMPLES (mol%、wt%)

| No. | 5 | | 6 | | 7 | | 8 | |
|---|---|---|---|---|---|---|---|---|
| | mol% | wt% | mol% | wt% | mol% | wt% | mol% | wt% |
| $SiO_2$ | 52.7 | 23.8 | 52.7 | 23.7 | 52.7 | 23.6 | 52.7 | 23.5 |
| $Na_2O$ | 1.9 | 0.9 | 1.9 | 0.9 | 1.9 | 0.9 | 1.9 | 0.9 |
| $K_2O$ | 1.3 | 0.9 | 1.3 | 0.9 | 1.3 | 0.9 | 1.3 | 0.9 |
| PbO | 39.9 | 66.8 | 38.9 | 65.0 | 36.4 | 60.6 | 33.9 | 56.2 |
| $PbF_2$ | 4.0 | 7.3 | 5.0 | 9.2 | 7.5 | 13.7 | 10.0 | 18.2 |
| $Sb_2O_3$ | 0.2 | 0.3 | 0.2 | 0.3 | 0.2 | 0.3 | 0.2 | 0.3 |
| $K_2SiF_6$ | — | — | — | — | — | — | — | — |
| F／O (%) | 5.37 | | 6.75 | | 10.30 | | 13.98 | |
| PHOTOELASTIC CONSTANT ($10^{-8}cm^2/N$) | +0.03 | | +0.03 | | +0.03 | | +0.04 | |
| REFRACTIVE INDEX nd | 1.830 | | 1.826 | | 1.810 | | 1.798 | |
| WAVELENGTH CORR. TO TRANSMITTANCE OF 80% (nm) | 399 | | 394 | | 391 | | 388 | |

Fig.18

(Table 3)

LIST OF EXAMPLES (mol%、wt%)

| No. | 9 | | 10 | | 11 | | 12 | |
|---|---|---|---|---|---|---|---|---|
| | mol% | wt% | mol% | wt% | mol% | wt% | mol% | wt% |
| $SiO_2$ | 52.1 | 23.2 | 52.1 | 22.9 | 52.1 | 22.9 | 45.7 | 19.0 |
| $Na_2O$ | 2.0 | 0.9 | 2.0 | 0.9 | 2.0 | 0.9 | 2.0 | 0.9 |
| $K_2O$ | — | — | — | — | — | — | 2.0 | 1.3 |
| PbO | 44.3 | 73.2 | 38.2 | 62.5 | 35.7 | 58.1 | 45.5 | 70.4 |
| $PbF_2$ | 0.2 | 0.3 | 6.3 | 11.3 | 8.8 | 15.7 | — | — |
| $Sb_2O_3$ | 0.1 | 0.3 | 0.1 | 0.3 | 0.1 | 0.3 | 1.5 | 3.1 |
| $K_2SiF_6$ | 1.3 | 2.1 | 1.3 | 2.1 | 1.3 | 2.1 | 3.3 | 5.3 |
| F/O (%) | 5.44 | | 14.10 | | 17.86 | | 13.62 | |
| PHOTOELASTIC CONSTANT ($10^{-8}cm^2/N$) | +0.03 | | +0.04 | | +0.04 | | +0.03 | |
| REFRACTIVE INDEX nd | 1.830 | | 1.798 | | 1.789 | | 1.810 | |
| WAVELENGTH CORR. TO TRANSMITTANCE OF 80% (nm) | 398 | | 386 | | 380 | | 390 | |

Fig. 19

(Table 4)

LIST OF EXAMPLES (mol%、wt%)

| No. | 13 | | 14 | |
|---|---|---|---|---|
| | mol% | wt% | mol% | wt% |
| $SiO_2$ | 45.2 | 19.8 | 40.0 | 17.5 |
| $Na_2O$ | 5.1 | 2.3 | 0.5 | 0.2 |
| $K_2O$ | 3.8 | 2.6 | — | — |
| KF | — | — | 15.6 | 10.7 |
| PbO | 40.3 | 65.4 | 41.4 | 67.5 |
| $PbF_2$ | 4.2 | 7.5 | 2.5 | 4.1 |
| $Sb_2O_3$ | 0.1 | 0.3 | — | — |
| $K_2SiF_6$ | 1.3 | 2.1 | — | — |
| F/O (%) | 11.58 | | 16.90 | |
| PHOTOELASTIC CONSTANT ($10^{-8}cm^2/N$) | +0.04 | | +0.04 | |
| REFRACTIVE INDEX nd | 1.814 | | 1.748 | |
| WAVELENGTH CORR. TO TRANSMITTANCE OF 80% (nm) | 410 | | 396 | |

Fig. 20

(Table 5)

| No. | 21 | 22 | 23 | 24 |
|---|---|---|---|---|
| REFRACTIVE INDEX | 1.8223 | 1.8301 | 1.8360 | 1.8426 |
| | 25 | 26 | 27 | BK7 |
| | 1.8501 | 1.8570 | 1.8637 | 1.5168 |

Fig. 21

(Table 6)

| No. | 22 | 25 | BK7 |
|---|---|---|---|
| STRESS ($N/cm^2$) | 31.5 | 31.0 | 30.0 |
| DEGREE OF BIREFRINGENCE (nm/cm) | 9.45 | 0.31 | 83.4 |

EXTINCTION RATIO

AVERAGE DATA WITH THE WAVELENGTH OF 480-610 nm AND THE INCIDENT ANGLE OF 0, +6, -6 DEGREES

| | | |
|---|---|---|
| TRANSMISSION | : $T_P >= 80\%$, $T_S <= 0.02\%$ | EXT. RATIO > 4000 |
| REFLECTION | : $R_S >= 80\%$, $R_P <= 4\%$ | EXT. RATIO > 20 |

NEW PBS (DISCERNIBLE SHAPE IS GHOST IMAGE)

CONVENTIONAL-TYPE PBS

Fig. 26

(Table 7)

LIST OF EXAMPLES (wt%)

| No. | 21 | 22 | 23 | 24 |
|---|---|---|---|---|
| $SiO_2$ | 25.9 | 25.4 | 24.9 | 24.4 |
| $B_2O_3$ | — | — | — | — |
| $Na_2O$ | 0.9 | 0.9 | 0.9 | 0.9 |
| $K_2O$ | 0.9 | 0.9 | 0.9 | 0.9 |
| BaO | — | — | — | — |
| PbO | 72.0 | 72.5 | 73.0 | 73.5 |
| $As_2O_3$ | — | — | — | — |
| $Sb_2O_3$ | 0.3 | 0.3 | 0.3 | 0.3 |
| PHOTOELASTIC CONSTANT ($10^{-8}cm^2/N$) | 0.41 | 0.30 | 0.22 | 0.10 |
| LINEAR EXPANSION COEFFICIENT ($10^{-7}/K^{-1}$) | 88 | 90 | 91 | 91 |

Fig. 27

(Table 8)

LIST OF EXAMPLES (wt%) cont.

| 番 号 | 25 | 26 | 27 | BK7 |
|---|---|---|---|---|
| $SiO_2$ | 23.9 | 23.4 | 22.9 | 68.9 |
| $B_2O_3$ | — | — | — | 10.1 |
| $Na_2O$ | 0.9 | 0.9 | 0.9 | 8.8 |
| $K_2O$ | 0.9 | 0.9 | 0.9 | 8.4 |
| BaO | — | — | — | 2.8 |
| PbO | 74.0 | 74.5 | 75.0 | — |
| $As_2O_3$ | — | — | — | 1.0 |
| $Sb_2O_3$ | 0.3 | 0.3 | 0.3 | — |
| PHOTOELASTIC CONSTANT ($10^{-8}cm^2/N$) | 0.01 | −0.07 | −0.12 | 2.78 |
| LINEAR EXPANSION COEFFICIENT ($10^{-7}/K^{-1}$) | 93 | 93 | 94 | 83 |

CORRELATION BETWEEN LEAD OXIDE AND PHOTOELASTIC CONSTANT

POLARIZING MICROSCOPE
OPTICAL SYSTEM

Fig.34

(TABLE 9)

| SAMPLE NO. | (A) | | 31 | | 32 | |
|---|---|---|---|---|---|---|
| | wt % | mol % | wt % | mol % | wt % | mol % |
| $SiO_2$ | 23.9 | 52.7 | – | – | 20.1 | 45.1 |
| $B_2O_3$ | – | – | 28.3 | 55.9 | 3.0 | 5.8 |
| $Al_2O_3$ | – | – | – | – | 3.8 | 5.0 |
| $Na_2O$ | 0.9 | 1.9 | – | – | – | – |
| $K_2O$ | 0.9 | 1.3 | – | – | – | – |
| MgO | – | – | – | – | – | – |
| CaO | – | – | – | – | – | – |
| SrO | – | – | – | – | – | – |
| BaO | – | – | – | – | – | – |
| PbO | 74.0 | 43.9 | 71.4 | 43.9 | 72.8 | 43.9 |
| $As_2O_3$ | – | – | 0.3 | 0.2 | 0.3 | 0.2 |
| $Sb_2O_3$ | 0.3 | 0.2 | – | – | – | – |
| $(F_2/F_2+O_2)$ | – | | – | | – | |
| REFRACTIVE INDEX (nd) | 1.849 | | 1.823 | | 1.827 | |
| WAVELENGTH CORR. TO TRANSMITTANCE OF 80% (nm) | 416 | | 380 | | 403 | |
| PHOTOELASTIC CONSTANT C(633nm) | +0.01 ($cm^2/N$) | | +0.55 ($cm^2/N$) | | -0.08 ($cm^2/N$) | |

Fig.35

(TABLE 10)

| SAMPLE NO. | 33 | | 34 | | 35 | |
|---|---|---|---|---|---|---|
| | wt % | mol % | wt % | mol % | wt % | mol % |
| $SiO_2$ | 19.0 | 42.7 | 21.6 | 47.7 | 21.6 | 47.7 |
| $B_2O_3$ | 2.6 | 5.0 | 2.6 | 5.0 | 2.6 | 5.0 |
| $Al_2O_3$ | 3.8 | 5.0 | – | – | – | – |
| $Na_2O$ | 0.9 | 1.9 | 0.9 | 1.9 | 0.9 | 1.9 |
| $K_2O$ | 0.9 | 1.3 | 0.9 | 1.3 | 0.9 | 1.3 |
| MgO | – | – | – | – | – | – |
| CaO | – | – | – | – | – | – |
| SrO | – | – | – | – | – | – |
| BaO | – | – | – | – | – | – |
| PbO | 72.5 | 43.9 | 73.7 | 43.9 | 73.7 | 43.9 |
| $As_2O_3$ | 0.3 | 0.2 | 0.3 | 0.2 | 0.3 | 0.2 |
| $Sb_2O_3$ | – | – | – | – | – | – |
| $(F_2/F_2+O_2)$ | – | | – | | 0.1 | |
| REFRACTIVE INDEX (nd) | 1.847 | | 1.838 | | 1.799 | |
| WAVELENGTH CORR. TO TRANSMITTANCE OF 80% (nm) | 416 | | 394 | | 372 | |
| PHOTOELASTIC CONSTANT C(633nm) | -0.09 ($cm^2/N$) | | +0.04 ($cm^2/N$) | | +0.05 ($cm^2/N$) | |

Fig.36

(TABLE 11)

| SAMPLE NO. | 36 | | 37 | | 38 | |
|---|---|---|---|---|---|---|
| | wt % | mol % | wt % | mol % | wt % | mol % |
| $SiO_2$ | 16.9 | 37.7 | 17.8 | 40.0 | 21.5 | 48.9 |
| $B_2O_3$ | 7.8 | 15.0 | 2.1 | 3.9 | 1.3 | 2.5 |
| $Al_2O_3$ | – | – | – | – | – | – |
| $Na_2O$ | 0.9 | 1.9 | – | – | 0.9 | 1.9 |
| $K_2O$ | 0.9 | 1.3 | – | – | 0.9 | 1.3 |
| MgO | – | – | 0.9 | 3.0 | – | – |
| CaO | – | – | 1.2 | 3.0 | – | – |
| SrO | – | – | 2.3 | 3.0 | – | – |
| BaO | – | – | 3.4 | 3.0 | – | – |
| PbO | 73.2 | 43.9 | 72.3 | 43.9 | 72.1 | 43.9 |
| $As_2O_3$ | 0.3 | 0.2 | – | – | – | – |
| $Sb_2O_3$ | – | – | – | – | 3.3 | 1.5 |
| $(F_2/F_2+O_2)$ | – | | – | | – | |
| REFRACTIVE INDEX (nd) | 1.830 | | 1.895 | | 1.854 | |
| WAVELENGTH CORR.TO TRANSMITTANCE OF 80% (nm) | 392 | | 417 | | 395 | |
| PHOTOELASTIC CONSTANT C(633nm) | +0.15 ($cm^2/N$) | | -0.63 ($cm^2/N$) | | +0.03 ($cm^2/N$) | |

Fig.38

(TABLE 12)

(wt %)

| SAMPLE NO. | $Zn(PO_3)_2$ | $AlF_3$ | $MgF_2$ | $CaF_2$ | $SrF_2$ | $BaF_2$ | $LaF_3$ | $SiO_2$ |
|---|---|---|---|---|---|---|---|---|
| 47 | 36.1 | 12.1 | 7.7 | 7.7 | 9.6 | 21.6 | 2.8 | 2.4 |

Fig.39

(TABLE 13)

| SAMPLE NO. | 41 | 42 | 43 | 44 | 45 | 46 | 47 | A | BK7 |
|---|---|---|---|---|---|---|---|---|---|
| REFRACTIVE INDEX (nd) | 1.441 | 1.447 | 1.498 | 1.508 | 1.570 | 1.593 | 1.527 | 1.798 | 1.517 |
| ABBE'S NUMBER ($\nu$ d) | 93.9 | 91.0 | 82.5 | 80.2 | 70.0 | 67.9 | 72.8 | 93.9 | 64.1 |
| PHOTOELASTIC CONSTANT C ($10^{-8}cm^2/N$) | 0.71 | 0.80 | 0.62 | 0.93 | 0.75 | 0.51 | 0.43 | 0.04 | 2.78 |
| WAVELENGTH (nm) CORRESPONDING TO TRANSMTTANCE OF 80% | 334 | 337 | 342 | 344 | 356 | 360 | 324 | 388 | 329 |

POLARIZING OPTICAL SYSTEM

RELATED APPLICATIONS

This is a continuation-in-part application of application Ser. No. 08/532,693 filed on Oct. 6, 1995 for OPTICAL GLASS FOR POLARIZING OPTICAL SYSTEM, PRODUCTION PROCESS THEREFOR AND POLARIZING BEAM SPLITTERS, now pending, which is a 371 of PT/JP95/00164, filed Feb. 7, 1995.

BACKGROUND OF THE INVENTION

1. Field of the Invention

The present invention relates to a polarizing optical system such as polarizing beam splitter and spatial light modulator for effecting polarizing modulations which utilizes an optical glass having an extremely small photoelastic constant C.

2. Related Background Art

In recent years, the utilization of a "polarizing characteristic", as one of the factors constituting optical information, has rapidly been developed in various fields such as the field of liquid crystal. Examples of an optical element for controlling polarized light, includes a polarized light-modulating type spatial light modulator (SLM) for spatially modulating polarized lights or a polarizing beam splitter for separating a P-polarized light and an S-polarized light from each others etc. Some apparatuses (such as projection-type display device) utilizing such an optical element have already been put to practical use.

Along with such development in the utilization of the polarizing characteristic, in an optical system utilizing polarized light, i.e., a polarizing optical system, the importance of high-precision control of the polarizing characteristic constituting optical information has been increased year by year. Based on the increase in the above-mentioned importance, it has earnestly been desired to further improve the precision or accuracy in the control of the polarizing characteristic.

Among various optical elements constituting a polarizing optical system (such as substrate and prism), it is usual to use a material having an optical isotropy especially for some optical elements which are required to retain the polarizing characteristic. The reason for this is that when an optical element comprising a material having an optical anisotropy is used, the phase difference (optical path difference) between the ordinary ray and the extraordinary ray perpendicular to the ordinary ray will be changed during their passage through such a material, with respect to light which has been transmitted by the optical element, and therefore the polarizing characteristic cannot be retained in such a case. In other words, even in a case where an optical element or component constituting a certain optical system has a performance of precisely controlling the polarized lights good characteristic cannot be obtained by the entire optical systems if the substrate or base material as another component constituting the optical system (which should retain the polarizing characteristic) impairs the polarizing characteristic.

In general, a glass which has sufficiently been subjected to annealing has an optical isotropy and also has various characteristics better than those of other materials in view of its durability, strengths transmittance, refractive index, cost, etc., and therefore such a glass is widely used for optical elements which should retain the polarizing characteristic. Particularly, borosilicate glass (e.g., a borosilicate glass mfd. by Schott Co., Germany, trade names "BK7") is inexpensive and excellent in durability, and also has little dispersion. Therefore, the borosilicate glass is widely used in many polarizing optical systems.

However, even when the above-mentioned conventional optical glass for polarizing optical system is used for the optical elements, a certain optical anisotropy based on a photoelastic effect can be induced in the optical element, under the application of a mechanical external stress or a thermal stress to the optical element. Accordingly, when the conventional optical glass is used for the optical element for a polarizing optical system the polarizing characteristic of optical information can be changed on the basis of the "induced optical anisotropy" as described above. Therefore, in such a case, it is difficult for the polarizing optical system to exhibit a desired performance.

It is considered that the mechanical external stress and the thermal stress as described above are developed mainly in the following situation.

Thus, it is considered that the "mechanical external stress" is mainly developed in a step of processing a glass (such as cutting the bonding or joining of the glass with another material, and film formation on the surface of a glass) or often a step of assembling a glass into an optical system (such as holding of the glass by a jig or holding device, and the adhesion of the glass to another member). In addition, it is considered that the "thermal stress" is developed by the production of heat in the interior of a glass (such as heat production based on the absorption of light energy), or the production of heat outside a glass (e.g., that based on heat production in a peripheral device). Furthers when a glass is caused to contact or is joined with another material having a thermal expansion coefficient different from that of the glass, it is considered that a stress is developed along with the above-mentioned production of heat.

As described above, when a polarizing optical system is constituted by using an optical element, it has been difficult to completely obviate the action of the mechanical external stress or the thermal stress. Accordingly, when the conventional optical glass for polarizing optical system is used for such an optical system, it is extremely difficult to avoid the induction of the optical anisotropy based on the above-mentioned mechanical external stress or thermal stress.

SUMMARY OF THE INVENTION

An object of the present invention is to provide an optical glass for polarizing optical system, which does not substantially impair the polarizing characteristic of optical information, even under the action of a mechanical external stress or a thermal stress.

Another object of the present invention is to provide an optical glass for polarizing optical system, which is capable of controlling its refractive index in a desirable manner.

A further object of the present invention is to provide a polarizing optical system having an excellent characteristic.

As a result of earnest study, the present inventors have found that the polarizing characteristic of optical information in an optical glass for polarizing optical system (under the action of a mechanical external stress or a thermal stress) may desirably be evaluated by using a "photoelastic constant based on the value of birefringence or double refraction (under the application of a stress) measured by a photoelasticity modulation method". The optical glass for polarizing optical system according to the present invention is based on the above discovery and characterized by a photoelastic constant C thereof in the range of substantially zero with respect to a wavelength range of 0.4 $\mu$m to 3.0 $\mu$m.

In general, when a force is applied to a transparent substance having homogeneity and isotropy such as glass so as to develop a stress therein, an optical anisotropy is induced in the transparent substances and the transparent substance is caused to have a birefringence property in a similar manner as in a certain kind of crystalline substance. Such a phenomenon is called an "photoelastic effect". The refractive index of a transparent substance in which a stress has been developed, may be represented by a so-called "(refractive) index ellipsoid", and the principal refractive index axis of the refractive index ellipsoid coincides with the principal stress axis.

In general, when the principal refractive indices are denoted by $n_1$, $n_2$, and $n_3$, and the principal stresses are denoted by $\sigma_1$, $\sigma_2$, and $\sigma_3$ (those having the common subscript are those having the same direction), these principal refractive indices and principal stresses satisfy the following relationship.

<Equation 1>

$$n_1=n_0+C_1\sigma_1+C_2(\sigma_2+\sigma_3)$$

$$n_2=n_0+C_1\sigma_2+C_2(\sigma_3+\sigma_1)$$

$$n_3=n_0+C_1\sigma_3+C_2(\sigma_1+\sigma_2)$$

Herein, the above-mentioned $C_1$ and $C_2$ are constants peculiar to the wavelength of light and the transparent substances and $n_0$ is a refractive index under the application of no stress.

In a case where light is incident on the transparent substance having such a refractive index, when a coordinate is defined so that the direction of the incident light is the same as that of the above $\sigma_3$, the incident light is separated into two linearly polarized light components respectively having $\sigma_1$ and $\sigma_2$ directions (namely, linearly polarized light components respectively having planes of vibration which are perpendicular to each other). On the other hands when light emerges from the transparent substance, in a case where the refractive index in the respective directions of the principal stresses ($n_1$, $n_2$) are different from each other, an optical path difference (phase difference) $\Delta\phi$ represented by the following equation is provided between these two linearly polarized light components.

$$\begin{aligned}\Delta\phi &= (2\pi/\lambda)(n_2-n_1)\cdot 1 \qquad \langle\text{Equation 2}\rangle\\ &= (2\pi/\lambda)(C_1-C_2)(\sigma_2-\sigma_1)\cdot 1\\ &= (2\pi/\lambda)\cdot C\cdot(\sigma_2-\sigma_1)\cdot 1\end{aligned}$$

In the above Equation 2, $\lambda$ denotes the wavelength of light, and l ("el") denotes the light transmission thickness of the transparent substance. The constant $C=C_1-C_2$ in the above Equation is called "photoelastic constant".

According to the present inventor's knowledge, the value of the photoelastic constants C of conventional optical glasses which have been used for polarizing optical systems are large. For example, the value of the above constant C=2.78 [$10^8$ $cm^2/N$] (wavelength $\lambda$=633 nm) was obtained in the case of the commercially available borosilicate glass "BK7" (Schott Co.) as described hereinabove. In the case of the borosilicate glass having such a large photoelastic constant C, the optical anisotropy induced by the thermal stress or mechanical external stress, and the optical path difference $\Delta\phi$ based on the anisotropy, naturally become certain values which are not negligible.

On the contrary, in the case of the above-mentioned optical glass for polarizing optical system according to the present invention, the photoelastic constant C is in the range of substantially zero, with respect to a wavelength range of 0.4 $\mu$m to 3.0 $\mu$m. The term "a photoelastic constant C in the range of substantially zero" used herein refers to a condition such that the influence of the optical path difference due to optical anisotropy, which is provided when the glass is used for a polarizing optical system, is within a negligible extent with respect to the entirety of the above optical system The photoelastic constant C may preferably be in the range of −0.8 to 0.8 [$10^{-8}$ $cm^2/N$], more preferably −0.1 to 0.1 [$10^8$ $cm^2/N$] with respect to incident light in a visible region. It is particularly preferred that the photoelastic constant C may preferably be in the range of −0.1 to 0.1 [$10^{-8}$ $cm^2/N$], with respect to incident light having a wavelength within the entire visible region (e.g., in a wavelength region of 0.4 to 0.7 $\mu$m).

When the photoelastic constant C varies depending on the wavelength of the incident light, at least three points of wavelength $\lambda$ are selected in the above-mentioned predetermined wavelength range (i.e., 0.4 $\mu$m to 3.0 $\mu$m, more preferably 0.4 $\mu$m to 1.0 $\mu$m, particularly preferably 0.4 to 0.7 $\mu$m) so as to provide substantially equal intervals therebetween, and the values of the photoelastic constant for these respective wavelength points are averaged thereby to provide the above value of the photoelastic constant C.

FIG. 1 is a graph showing a relationship between the fluorine/oxygen (F/O) ratio in a composition of the optical glass for polarizing optical system according to the present invention wherein the photoelastic constant C becomes substantially zero for a wavelength of incident light (633 nm), and the refractive index of the glass. Further, FIG. 2 is a graph showing variation in the photoelastic constant C along with a change in the above F/O ratio in the above-mentioned glass composition.

As shown in FIGS. 1 to 2, in the refractive index of the optical glass according to the present invention, a certain linearity may be established with respect to the F/O ratio, and it is observed that the photoelastic constant C of the glass becomes substantially zero irrespective of the F/O ratio. According to the present inventors' knowledge, the photoelastic constant C is dependent on the lead ion content in the optical glass but is not dependent on the amount of fluorine ions introduced into the glass, and therefore it is assumed that a phenomenon such that the photoelastic constant C becomes substantially zero is established in the glass composition according to the present invention.

FIG. 3 is a graph showing transmission spectra of one composition series of the optical glass according to the present invention at a depth of 10 mm. As shown in FIG. 3, it is recognized that the transmittance of blue light is increased by introducing fluorine into a glass composition. According to the present inventor's investigation, it is recognized that the tendency of an increase in the blue light transmittance becomes marked as the F/O ratio is increased, and along with such an increase, the absorption edge (limit of absorption on the shorter wavelength side) is also shifted to the shorter wavelength side.

As a result of further study based on the above-mentioned findings, the present inventors have found a glass having a specific composition range, which is capable of attaining little elution of platinum at the time of the melting of the glass-forming materials, of having an improved transmittance in a shorter-wavelength visible region to an ultraviolet region, and of having a photoelastic constant C of the glass in the range of substantially zero.

The optical glass for polarizing optical system according to the present invention (second embodiment) is based on the above discovery, and has the following composition when represented in terms of oxide mol %:

$B_2O_3$: 0–57.0 mol %

$Al_2O_3$: 0–13.0 mol %

($B_2O_3$+$Al_2O_3$: 0.1–57.0 mol %)

$SiO_2$: 0–54.0 mol %

($SiO_2$+$B_2O_3$+$Al_2O_3$: 43.0–57.0 mol %)

PbO: 43.0–45.5 mol %

$R_2O$ (R: Li, Na, K): 0–3.5 mol %

R'O (R': Mg, Ca, Sr, Ba): 0–12.0 mol %

$As_2O_3$+$Sb_2O_3$: 0–1.5 mol %; and further contains fluorine in the following ranges $F_2/(F_2+O_2)$: 0–0.1.

The above optical glass may preferably have the following composition when represented in terms of oxide mol %:

$B_2O_3$: 0–19.0 mol %

$Al_2O_3$: 0–13.0 mol %

($B_2O_3$+$Al_2O_3$: 2.0–19.0 mol %)

$SiO_2$: 38.0–54.0 mol %

($SiO_2$+$B_2O$+$Al_2O_3$: 43.0–57.0 mol %)

PbO: 43.0–45.5 mol %

$R_2O$ (R: Li, Na, K): 0–3.5 mol %

R'O (R': Mg, Ca, Sr, Ba): 0–12.0 mol %

$As_2O_3$+$Sb_2O_3$: 0–1.5 mol %; and further contains fluorine in the following range:

$F_2/(F_2+O_2)$: 0–0.1 (Herein, the wavelength of light incident to the glass according to the present invention may preferably be in the range of 0.4 $\mu$m to 3.0 $\mu$m.)

In general, when a high-quality glass is melted, there is used a platinum crucible which is stable to the melted or liquefied glass. However, depending on the composition system of the glass, coloring of the resultant glass due to the elution of the platinum poses a problem in some cases. In other words, even in lead-containing glasses, it becomes important to obtain a glass having a further improved transmittance by sufficiently suppressing the coloring of the glass due to the elution of the platinum.

The glass containing only $SiO_2$ as a glass-forming oxide has a problem such that the melting thereof requires a high temperature. Accordingly, it is usual to lower the viscosity of the melted glass by the addition of an alkali metal oxide so as to decrease the melting temperature. However, as a result of various chemical experiments, the present inventors have found that the above-mentioned elution of the platinum is greatly accelerated or promoted by an alkali metal oxide, etc., which often functions as a fluxing agent for $SiO_2$. Further, as a result of earnest study, the present inventors have found that the content of the alkali metal oxide, etc., can be suppressed by replacing $SiO_2$ as a glass-forming oxide with another glass-forming oxide of $B_2O_3$ and/or $Al_2O_3$ so as to enhance the fusibility of the glass, and have reached the optical glass according to the present invention (second embodiment) as described above.

In addition, as a result of further earnest study for the purpose of finding a light-transmissive material having a sufficient transmittance which is particularly suitably usable for a high-precision polarizing optical system utilizing the entirety of a visible region or an ultraviolet region, the present inventors have found that a fluorophsphate optical glass having a specific refractive index $n_d$ and Abbe's number $\nu_d$ not only has a photoelastic constant which is much smaller than those of ordinary optical glasses used in the conventional polarizing optical systems, but also has a satisfactory transmittance suitable for various use thereof. Further, the present inventors have also confirmed that such a fluorophsphate optical glass has a feature such that it has a small variation in the value of the photoelastic constant depending on the wavelength of light to be used, as compared with that of optical glasses for a polarizing optical system containing a predetermined amount of lead ions.

In the case of a glass having a large dispersion of the photoelastic constant such as lead glass, even when the glass has a composition wherein the photoelastic constant is controlled to substantially zero with respect to a specific wavelength of light, when the glass is used in a wide range of the wavelength of light, the photoelastic constant is changed depending on the wavelength in some cases so that the resultant optical anisotropy caused by a mechanical external stress or thermal stress poses a problem. On the other hand, the present inventors have found that a specific fluorophsphate optical glass not only has a small dispersion in the photoelastic constant thereof, but also similarly has a small dispersion in the photoelastic constant thereof at any wavelength in a wide wavelength range, and further it is little affected by the optical anisotropy caused by the mechanical external stress or thermal stress.

The fluorophsphate optical glass according to the present invention is based on the above discoveries, and has a refractive index $n_d$ of 1.43–1.65, and an Abbe's number $\nu_d$ of 62–96, the absolute value of the photoelastic constant C of the glass being $1.0\times10^{-8}$ $cm^2$/N or less at the wavelength of light to be used for the glass.

The above dispersion in the photoelastic constant C has been determined by constituting a simple polarizing optical system, and evaluating the constant by using the optical system. When the thus determined value of the photoelastic constant is $1.0\times10^{-8}$ $cm^2$/N or less, such a glass can be used as an optical glass for polarizing optical system practically without causing a problem. In particular, the variation in the photoelastic constant C (dispersion in the values of the photoelastic constant C) may preferably be within $0.3\times10^{31}$ 8 $cm^2$/N or less in the entirety of a visible region of about 400–700 nm of the wavelength of light at which the optical glass for a polarizing optical system is to be used.

The present invention further provides: a polarizing optical system comprising: at least, polarizing characteristic imparting means for imparting a polarizing characteristic to light emitted from a light source;

analyzer means for converting the polarizing characteristic into light intensity information; and output means for outputting the light intensity information;

at least one element constituting the polarizing characteristic imparting means comprising an optical glass having a photoelastic constant C in the range of substantially zero with respect to a wavelength range of 0.4 $\mu$m to 3.0 $\mu$m In the above-mentioned polarizing optical system using the optical glass according to the present invention, factors which are capable of disturbing polarizing information of light before the light is passed through the analyzer unit may be removed as completely as possible, and therefore the polarizing information may be precisely converted into the intensity information.

Further scope of applicability of the present invention will become apparent from the detailed description given hereinafter. However, it should be understood that the detailed description and specific examples, while indicating preferred embodiments of the inventions are given by way of illustration only, since various changes and modifications within the spirit and scope of the invention will become apparent to those skilled in the art from this detailed description.

BRIEF DESCRIPTION OF THE DRAWINGS

The file of this patent contains at least one drawing executed in color. Copies of this patent with color drawing (s) will be provided by the Patent and Trademark Office upon request and payment of the necessary fee.

FIG. 16 (Table 1) is a table showing the compositions and data of various physical properties of optical glasses (Sample Nos. 1 to 4) for a polarizing optical system according to the present invention, which were prepared in Example 1.

FIG. 17 (Table 2) is a table showing the compositions and data of various physical properties of optical glasses (Sample Nos. 5 to 8) for a polarizing optical system according to the present invention, which were prepared in Example 1.

FIG. 18 (Table 3) is a table showing the compositions and data of various physical properties of optical glasses (Sample Nos. 9 to 12) for a polarizing optical system according to the present invention, which were prepared in Example 1.

FIG. 19 (Table 4) is a table showing the compositions and data of various physical properties of optical glasses (Sample Nos. 13 to 14) for a polarizing optical system according to the present invention, which were prepared in Example 1.

FIG. 20 (Table 5) is a table showing the data of refractive index of optical glasses for a polarizing optical system according to the present invention, etc., which were measured in Example 2.

FIG. 21 (Table 6) is a table showing the data of degree of birefringence of optical glasses for a polarizing optical system according to the present inventions etc., under the application of a predetermined stress, which were measured in Example 3.

FIG. 26 (Table 7) is a table showing the compositions and data of various physical properties of optical glasses (Sample Nos. 21 to 24) for a polarizing optical system according to the present inventions which were prepared in Example 1.

FIG. 27 (Table 8) is a table showing the compositions and data of various physical properties of optical glasses (Sample Nos. 25 to 27) for a polarizing optical system according to the present invention, which were prepared in Example 1.

FIG. 34 (Table 9) is a table showing raw material compositions and optical characteristics of Sample No. 31, 32 and Comparative Sample (A) obtained in Example 6.

FIG. 35 (Table 10) is a table showing raw material compositions and optical characteristics of Sample No. 33–35 obtained in Example 6.

FIG. 36 (Table 11) is a table showing raw material compositions and optical characteristics of Sample No. 36–38 obtained in Example 6.

FIG. 38 (Table 12) is a table showing raw material composition of Sample No. 46 obtained in Example 7.

FIG. 39 (Table 13) is a table showing optical characteristics of Sample No. 41–47, Comparative Sample (A) and commercially available optical glass of "BK7" obtained in Example 7.

DESCRIPTION OF THE PREFERRED EMBODIMENTS

Hereinbelow the present invention will be described in detail with reference to the accompanying drawings as desired.

(Photoelastic constant C)

The optical glass for polarizing optical system according to the present invention is characterized in that the photoelastic constant C thereof is in the range of substantially zero with respect to a wavelength range of 0.4 $\mu$m to 3.0 $\mu$m. The photoelastic constant C may preferably be in the range of −0.8 to +0.8 ($10^{-8}$ $cm^2/N$), more preferably in the range of −0.5 to +0.5 ($10^{-8}$ $cm^2/N$), further preferably in the range of −0.1 to +0.1 ($10^{-8}$ $cm^2/N$), particularly preferably in the range of −0.05 to +0.05 ($10^{-8}$ $cm^2/N$).

In the present inventions the optical path difference $\Delta\phi$ is measured by measuring birefringence (or double refraction) by use of light having a known wavelength $\lambda$ under a condition such that a known uniaxial stress $\sigma_2$ is applied to a sample having a known size of l (el) so as to satisfy a relationship of $\sigma_1=\sigma_3=0$ in the <Equation 1> and <Equation 2> as described hereinabove. Based on the thus determined optical path difference $\Delta\phi$, it is possible to determine a photoelastic constant $C=C_1-C_2$ according to the above <Equation 2>. With respect to the details of such a method for measuring the "photoelastic constant C", an instruction manual attached to a birefringence measuring apparatus ADR-150LC as described hereinafter; or Etsuhiro Mochida "Optical Technique Contact," Vol. 27, No. 3, page 127 (1989) may be referred to.

Figure 1:
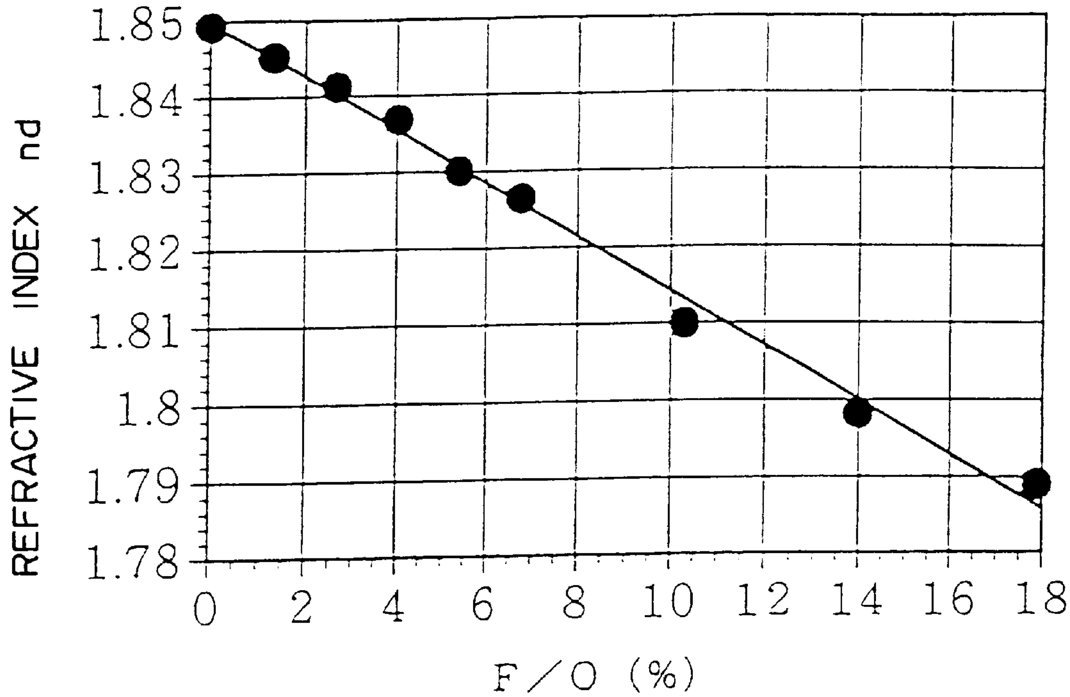
FIG. 1 is a graph showing a relationship between the F/O ratio in a composition of the optical glass according to the present invention, and the refractive index $n_d$ as a change in the physical property of the glass.
Figure 2:
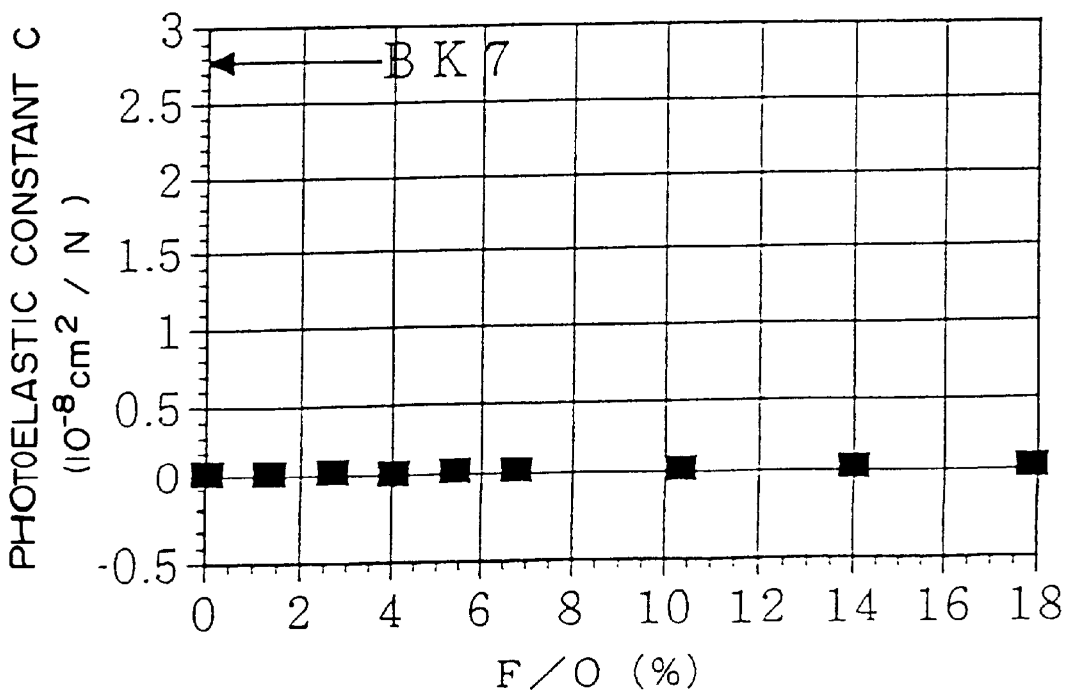
FIG. 2 is a graph showing a relationship between the F/O ratio in a composition of the optical glass according to the present invention, and a photoelastic constant C as a physical property of the glass.
Figure 3:
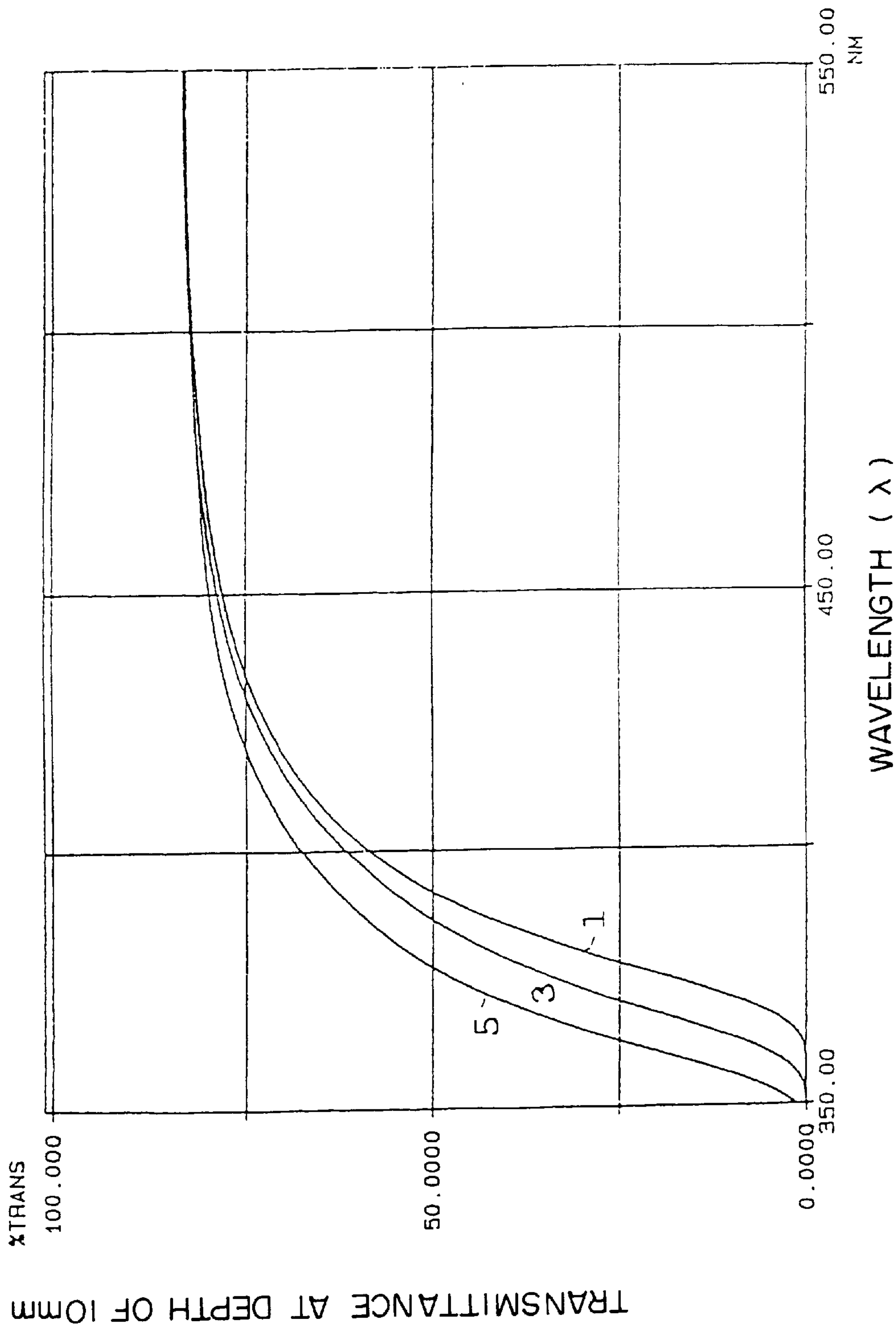
FIG. 3 is a graph showing a spectral transmission spectra of the optical glasses at a thickness of 10 mm, which were prepared in Examples 1, 3 and 5 as described hereinafter.
Figure 4:
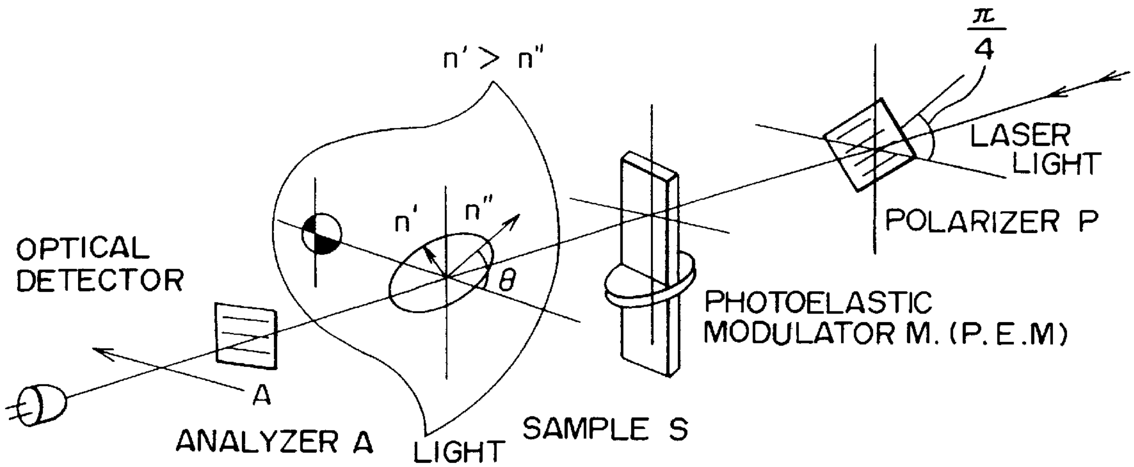
FIG. 4 is a schematic perspective view showing an example of the optical system for measuring the photoelastic constant C of the optical glass according to the present invention.
Figure 5:
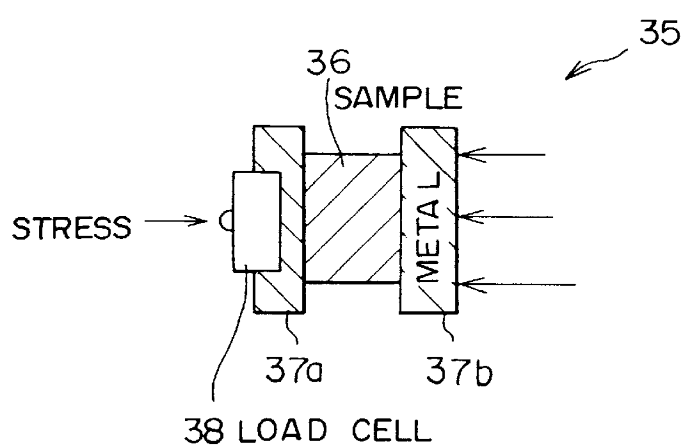
FIG. 5 is a schematic sectional view showing an example of the holding device for applying a stress to a sample glass, which is usable in the optical system of FIG. 4.

FIG. 4 is a schematic view showing the arrangement of optical elements in a measurement system for measuring the above-mentioned photoelastic constant C (birefringence measuring apparatus, trade names ADR-150LC mfd. by Oak Seisakusho Co.). In FIG. 4, the "Sample S" is sandwiched between and held by a sample holder for applying a uniaxial stress to the samples as shown in a schematic sectional view of FIG. 5, whereby the birefringence may be measured while applying a predetermined stress to the sample. Referring to FIG. 5, the sample holder comprises: a pair of metal blocks 37*a* and 37*b* (dimensions: (40 to 50 mm)×(30 to 40 mm), thickness: 25 to 30 mm) for holding a sample 36 therebetween; and a load cell 38 (diameter 20 mm, thickness: 9.5 mm, trade name, 9E01-L32-100K mfd. by Nihon Denshi-Sanei K.K.) disposed in the metal block 37*a*. When the load cell 38 is arranged in this manner, the value of the stress to be applied to the sample may be monitored.

The sizes of above-mentioned sample 36 are 10 mm×15 mm×20 mm, the dimensions of the stress plane are 10 mm×20 mm, the dimensions of the light transmission plane are 15 mm×20 mm, and the length of the light transmission thickness is 10 mm.

(Glass composition)

In the optical glass for polarizing optical system according to the present inventions fluorine is not an essential components. However, the glass may preferably contain fluorine in view of a large latitude or degree of freedom in the refractive index (a large latitude in selecting the refractive index) of a composition for providing a photoelastic constant C of substantially zero, and/or in view of a relatively large transmittance of light in a shorter wavelength region (wavelength about 400–480 nm).

(Embodiment containing no fluorine)

The optical glass for polarizing optical system according to the present invention (in an embodiment not containing fluorine) may preferably have the following composition, when represented in terms of oxide wt. %.

$SiO_2$: 17.0–27.0% (35.5–57.0 mol %)

$Li_2O+Na_2O+K_2O$: 0.5–5.0% (0.7–20.0 mol %)

PbO: 72.0–75.0% (39.1–45.0 mol %)

$As_2O_3+Sb_2O_3$: 0–3.0% (0.0–2.0 mol %)

The above amount of $SiO_2$ may more preferably be 22.0–26.0%. The amount of ($Li_2O+Na_2O+K_2O$) may more preferably be 0.5–3.0 %. The amount of PbO may more preferably be 73.0–75.0% (39.6–45.0 mol %). The amount of ($As_2O_3+Sb_2O_3$) may more preferably be 0.1–0.5%.

In the optical glass for polarizing optical system according to the present invention (in an embodiment not containing fluorine), the above contents of the respective components are preferred for the following reasons (PbO)

As described above, the photoelastic constant C of a glass has a tendency to largely depend on the PbO content. More specifically, there is a tendency such that as the PbO content is increased, the value of the photoelastic constant C is decreased, and the value of the photoelastic constant C becomes zero in a certain content, and thereafter becomes a negative value. When such a characteristic of PbO is utilized, the PbO content may preferably be used for regulating the value of the photoelastic constant C of the glass to substantially zero. According to the present inventors' knowledge, it is assumed that the reason for the change in the photoelastic constant C depending on the PbO content is that the state of the coordination of lead ions is changed along with an increase in the PbO content. The term "a photoelastic constant C in the range of substantially zero" used herein refers to a condition such that the influence of the optical path difference due to optical anisotropy of the glass according to the present invention, which is provided when the glass is used for a polarizing optical system, is within a negligible extent with respect to the entirety of the above polarizing optical system. More specifically, the photoelastic constant C may preferably be in the range of −0.1 to 0.1 [$10^{-8}$ $cm^2/N$] with respect to light in a wavelength region of 500 to 650 nm. In order to obtain an optical glass having a photoelastic constant C in such a range, e.g., it is preferred to adopt a PbO content in the range of 73–75 wt. %.

According to the present inventors' experiment, it has been found that the photoelastic constant C can be made substantially zero even when a glass composition not containing lead oxide is used. However, when such a glass composition not containing lead oxide is caused to have a photoelastic constant C in the range of substantially zero, the resultant glass has a relatively large thermal expansion coefficient and also is more liable to be broken, and therefore such a glass should carefully be applied to a polarizing optical system.

($SiO_2$)

$SiO_2$ is a glass forming component in the optical glass according to the present invention, and it may preferably be contained in an amount of 17 wt. %. When the $SiO_2$ content exceeds 27 wt %, the above-mentioned PbO content is liable to decrease so as to deviate from the preferred range of the content thereof, and the photoelastic constant C tends to be large.

(Alkali metal component)

The alkali metal component such as $Na_2O$, $K_2O$ and/or $Li_2O$ has a function of lowering the glass melting temperature and glass transition temperature, and of improving the stability to devitrification. From such a viewpoint, the alkali metal content (when two or more kinds of alkali metal are contained, the total of those contents) may preferably be 0.5 wt. % or more. On the other hand, when the content exceeds 5 wt. %, the chemical durability of the glass can be impaired considerably (Defoaming agent)

$As_2O_3$, $Sb_2O_3$ or ($AS_2O_3$+$Sb_2O_3$) capable of functioning as a defoaming agent, may be introduced into raw materials for the glass, as desired. When the content of the defoaming agent (when two or more kinds of defoaming agents are contained, the total of those contents; e.g., the total amount of ($As_22O_3$+$Sb_2O_3$)) exceeds 3 wt. %, the resistance to devitrification, transmission spectrum characteristic, etc., of the glass tend to be lowered. The amount of the defoaming agent may more preferably be 0.2–0.5 wt. %.

(Embodiment containing fluorine)

The optical glass for polarizing optical system according to the present invention (in an embodiment containing fluorine) may preferably have the following compositions when represented in terms of mol %.

$SiO_2$: 40.0–54.0 mol %

$R_2O$ (R: alkali metal): 0.5–9.0 mol %

PbO: 43.0–45.5 mol %

$As_2O_3$+$Sb_2O_3$: 0–1.5 mol %

Fluorine/oxygen (F/O) ratio: 0.1–18.0%

The optical glass for polarizing optical system according to the present invention (in an embodiment containing fluorine) may also have the following compositions when represented in terms of mol %.

$SiO_2$: 40.0–54.0 mol %

$R_2O$ (R: alkali metal): 0.5–9.0 mol %

RF: 0–16.0 mol %

$R_2SiF_6$: 0–3.3 mol %

PbO+$PbF_2$: 43.0–45.5 mol %

$PbF_2$: 0–10.0 mol %

$As_22O_3$+$Sb_2O_3$: 0–1.5 mol % fluorine/oxygen (F/O) ratio: 0.1–18.0%

In the optical glass for polarizing optical system according to the present inventions the above contents of the respective components are preferred for the following reasons.

(Lead ion)

The lead ion may preferably be used mainly for the purpose of controlling the photoelastic constant C. In general, the photoelastic constant C of a glass composition system containing lead ions tends to depend on the content of the lead ions. A value of the photoelastic constant C of substantially zero may easily be obtained when the lead ion content (calculated in terms of PbO) is 43.0–45.50 mol % (more preferably, 44.0–45.5 mol %).

(Fluorine)

It is observed that when fluorine is introduced into the optical glass composition according to the present invention, the refractive index of the glass is decreased, and further, the absorption edge of the transmission spectrum is shifted to the shorter wavelength side.

The means for introducing fluorine into a glass composition is not particularly limited. For example, it is possible to introduce fluorine into the glass composition by using a fluoride (such as KF, $K_2SiF_6$ and/or $PbF_2$) as a raw material for the glass. According to the present inventors knowledge, fluorine may be introduced into the glass in an amount of 16.0 mol %, 3.3 mol %, and 10.0 mol %, respectively, when each of KF, $K_2SiF_6$, and $PbF_2$ is used alone as a raw material for the glass. When the amount of such a component exceeds the amount thereof which can suitably be introduced into the glass, crystals can be precipitated due to excess fluorine. On the other hand, when plural kinds of fluorides are used as a raw material for the glass in a mixture or combination, it is possible to increase the fluorine/oxygen (F/O) ratio to 18.0%. The (F/O) ratio may more preferably be 5.0–18.0%.

($SiO_2$)

$SiO_2$ is a glass forming oxide in the optical glass according to the present invention. In the optical glass according to the present invention, the $SiO_2$ content may preferably be 40.0 mol % or more. On the other hand, in order not to decrease the lead ion content as described above for providing a preferred photoelastic constant C to deviate the lead ion content from a preferred range thereof, the $SiO_2$ content may preferably be 54.0 mol % or less. The $SiO_2$ content may more preferably be 45–53 mol % or less.

(Alkali metal oxide)

An alkali metal oxide such as $Li_2O$, $Na_2O$ and/or $K_2O$ has an effect of lowering the melting temperature and glass transition temperature of a glass, and of improving the stability of the glass to the devitrification. In order to make the above effect sufficient, the content thereof (when plural kinds of the alkali metal oxides are contained in the glass, the total content thereof; e.g., total amount of $Li_2O$+$Na_2O$+

$K_2O$) may preferably be 0.5 mol % or more. On the other hand, when the alkali metal oxide content exceeds 9.0 mol %, the decrease in the chemical durability of the glass becomes marked. The alkali metal oxide content may preferably be 2.0–9.0 mol %.

(Plaining agent)

$As_2O_3$, $Sb_2O_3$ or ($As_2O_3$+$Sb_2O_3$) capable of functioning as a defoaming agent, may be introduced into raw materials for the glass, as desired. When the content of the defoaming agent (when two or more kinds of defoaming agents are contained, the total of those contents; e.g., the total amount of ($As_22O_3$+$Sb_2O_3$)) exceeds 1.5 mol %, the resistance to devitrification, transmission spectrum characteristic, etc., of the glass tend to be lowered. The amount of the defoaming agent may more preferably be 0.1–1.5 mol %.

(Production process)

As described above, the present invention may provide an optical glass for polarizing optical system having a photoelastic constant C in the range of substantially zero with respect to incident light having a wavelength in the visible region. As described above, it is possible to arbitrarily regulate the refractive index, as long as the glass composition falls within the above-mentioned preferred range thereof.

The process for producing the optical glass for polarizing optical system according to the present invention is not particularly limited. For example, the optical glass for polarizing optical system according to the present invention may easily be produced by using oxide, fluoride, carbonate, nitrate, etc., as raw materials corresponding to the above-mentioned components, weighing and mixing them to provide a formulated raw material, heating the formulated raw material to 1000 to 1300° C. to be melted and subjecting the formulated raw material to plaining and stirring to be homogenized, casting the resultant mixture into a preheated metal mold, and then gradually cooling or annealing the resultant mixture. However, at this time, if an excess amount (e.g., 5.0 mol % in terms of the content thereof) of the nitrate is used, the above-mentioned effect of the introduction of fluorine in the present invention tends to be reduced.

(Optical glass of second embodiment)

In the optical glass (second embodiment) for polarizing optical system according to the present inventions the reasons for preferred composition ranges for the respective components which have been found according to various chemical experiments are as follows.

The oxides capable of forming the glass according to this embodiment are $SiO_2$, $B_2O_3$, $Al_2O_3$. When the total content of these components is below 43.0 mol %, the resultant glass is liable to cause devitrification. On the other hands the above total content exceeds 57.0 mol %, the lead ion content as described hereinbelow is liable to be decreased to a value outside a predetermined range thereof, and it becomes difficult to obtain a desired value of the photoelastic constant C.

The above-mentioned $B_2O_3$ is a glass-forming oxide, and also has a good fusibility. However, when the content thereof exceeds 57.0 mol %, the lead ion content as described hereinbelow is liable to be decreased to a value outside a predetermined range thereof, and it becomes difficult to obtain a desired value of the photoelastic constant C. Further, in view of the resultant chemical stability, the $B_2O_3$ content may preferably be 19.0 mol % or less.

The above-mentioned $Al_2O_3$ is an intermediate oxide, and is an oxide capable of forming a glass. This oxide is used for the purpose of substituting for $SiO_2$ so as to enhance the fusibility. When the $Al_2O_3$ content exceeds 13.0 mol % a decrease in the resultant transmittance may be observed in some cases due to the elution of the platinum.

When the $SiO_2$ is replaced by $B_2O_3$ and/or $Al_2O_3$ it is possible to lower the melting temperature without impairing the stability of the glass, as compared with that in the case of $SiO_2$ only. In addition, at the time of the melting operation in a platinum crucible, the platinum is prevented from being eluted, so as to enable an improvement in the resultant transmittance of the glass. The $B_2O_3$ and $Al_2O_3$ can be introduced in to the glass until the total amount thereof reaches 57.0 mol %. In order to fully exhibit the effect of these components, the above total amount may preferably be 2.0 mol % or more. When this total amount exceeds 19.0 mol % the resultant chemical stability of the glass is considerably impaired.

When the $SiO_2$ content exceeds 54.0 mol % the resultant fusibility of the glass is decreased. In order to obtain a good formability (or moldability) and chemical stability, an $SiO_2$ content of 38.0 mol % or more is rather preferred.

As described above, the PbO may be used for the purpose of controlling the photoelastic constant C. When the lead ion content is 43.0–45.5 mol %, the value of the photoelastic constant C becomes substantially zero.

Alkali metal oxides such as $Li_2O$, $Na_2O$, and $K_2O$ may be used for lowering the melting temperature and glass transition temperature of the glass, and for enhancing the stability of the glass to the devitrification. However, when the content thereof exceeds 3.5 mol %, the coloring of the glass due to the elution of the platinum is remarkably promoted.

Similarly, alkaline-earth metal oxides such as MgO, CaO, SrO, and BaO may be used for lowering the melting temperature and glass transition temperature of the glass, and for enhancing the stability of the glass to the devitrification. In addition, these oxides can also promote the elution of the platinum. However, the effect of these oxides is weaker than that of the alkali metal oxide, and therefore these oxides may be introduced into the glass until the content thereof reaches 12.0 mol %.

($As_2O_3$+$Sb_2O_3$) as a plaining agent may be introduced into the glass as desired. However, when the content thereof exceeds 1.5 mol %, the devitrification resistances spectral transmission characteristic, etc., of the glass may be impaired.

In addition, when fluorine is introduced into the above-mentioned glass composition, it is possible to further shift the absorption edge in the shorter wavelength side of the spectral transmission curve to the shorter wavelength side. The fluorine may be introduced into the glass by using a fluoride such as KF, $K_2SiF_6$, and $PbF_2$. However, when the ratio of $F_2/(F_2+O_2)$ with which the corresponding oxide is replaced by the fluoride exceeds 0.1, the stability of the glass may be impaired so as to cause devitrification.

As described above, the present invention may provide an optical glass for polarizing optical system having a photoelastic constant C in the range of substantially zero with respect to the wavelength of incident light.

The process for producing the optical glass for polarizing optical system according to this embodiment is not particularly limited. For example, the optical glass for polarizing optical system according to the present invention may easily be produced by using oxide, fluoride, carbonate, nitrate, etc., as raw materials corresponding to the above-mentioned components constituting each of the respective glass compositions, weighing and mixing them in a box of which temperature is set to room temperature to provide desired ratios therebetween thereby to provide a formulated raw material. Then the resultant formulated raw material is heated to 1000 to 1300° C. in a platinum crucible by means of an electric furnace under the environment of atmospheric air to be melted, is subjected to plaining and stirring in an ordinary manner to be homogenized, and is then casted into a metal mold (made of stainless steel) which has been preheated to 300–450° C. in advance, and the resultant mixture is gradually cooled or annealed the resultant mixture, thereby to provide an optical glass for polarizing optical system according to the present invention.

(Optical glass for polarizing optical system of third embodiment)

In general oxide-type optical glasses, the photoelastic constant C shows a relatively high value. It is considered that the cause for this mainly depends on the bonding property between atoms contained in the glass. For example, a bond having a relatively high covalent property such as Si—O bond in an oxide-type glass is strongly localized and has electrons with anisotropic extension. Accordingly, such an electronic structure is largely affected by a stress, and therefore the photoelastic constant C also becomes large. On the other hand, in a bond having a strong ionic property, the localization of electron is little, and the electronic structure is "soft" or flexible, and therefore the distortion in the electronic structure caused by a stress is little. In addition, since the symmetry is high, the photoelastic constant C shows a low value.

In this viewpoint, in an oxide-type optical glass, a larger amount of a modifier oxide such as alkali metal oxide and alkali earth metal oxide can be contained in the glass so as to lower the photoelastic constant C. However, in such a case, the content of the glass-forming oxide is decreased, and therefore the glass stability is extremely lowered. However, according to the present inventor's findings, PbO is a special component such that it is one of the modifier oxides, but can be contained in a particularly large amount in the glass. Further, only the PbO is capable of causing the photoelastic constant C of the glass to be in the range of substantially zero.

On the other hand, in consideration of an anion site, in order to lower the photoelastic constant C, it is effective to use a halogen atom capable of forming a bond having a higher ionic property instead of using an oxygen atom. In particular, in consideration of an industrially producible optical glass, a system into which F atoms have been introduced, is suitable for the purpose of lowering the photoelastic constant C. However, the stability of a pure fluoride glass (i.e., a glass containing no oxygen atoms as anions) is considerably poor as compared with that of an oxide-type, and therefore a fluorophsphate glass is suitable as an optical glass for a general purpose.

Figure 40:
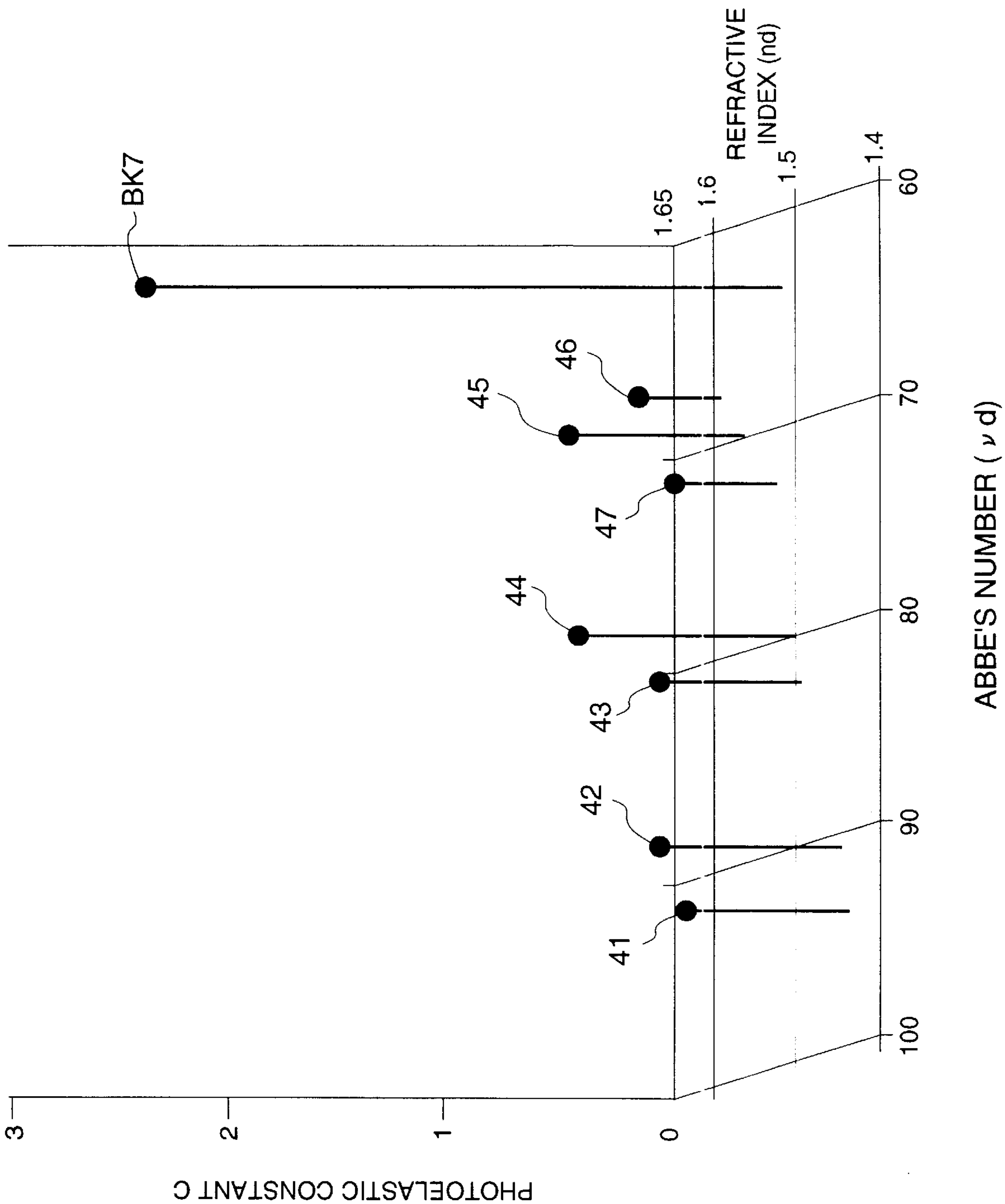
FIG. 40 is a graph showing relationships between Abbe's numbers and photoelastic constants.

FIG. 40 shows relationships among refractive indices $n_d$, Abbe's numbers $\nu_d$ of arbitrary fluorophsphate optical glasses, and photoelastic constants C thereof or the wavelength of light to be used (633 nm). In this figure, Numbers of 41–46 respectively denote the Sample Nos. of the optical glass which have been obtained in Examples appearing hereinafter. From the above FIG. 40, it may be understood that the photoelastic constant C of the glass according to the present invention is much smaller than that of a commercially available optical glass of "BK7" mfd. by Schott Co. which has widely been used for a general purpose.

Figure 41:
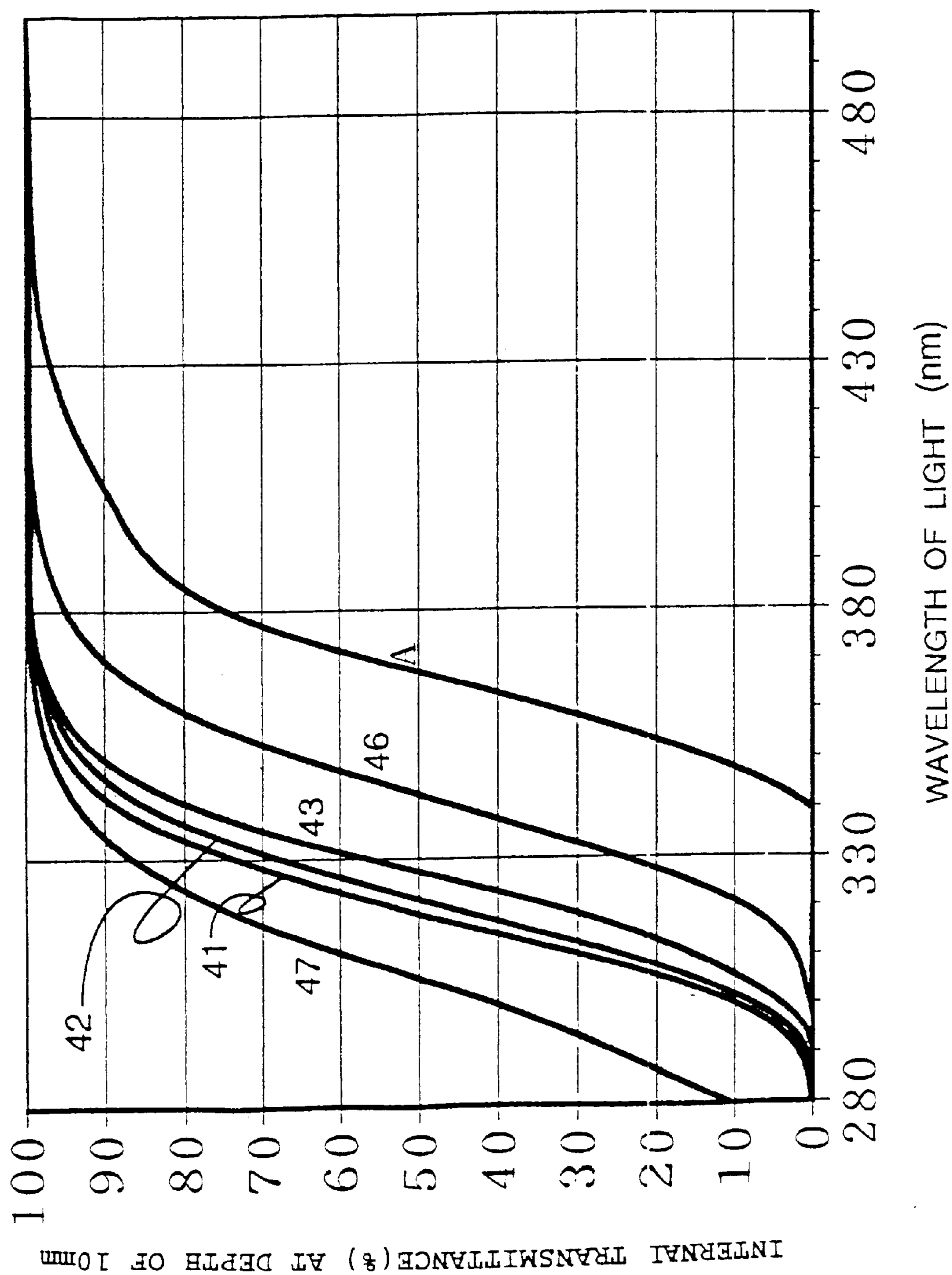
FIG. 41 is a graph showing spectral internal transmittance curves of the optical glasses of respective Samples at a depth of 10 mm, which were prepared in Example 7.

Further, FIG. 41 shows spectral transmission curves of the above-mentioned optical glass Samples according to the present invention at a depth of 10 mm (internal transmittance of 10 mm-thick samplesn) together with that of Reference Example. In view of transmittances, it may be understood that the fluorophsphate optical glass according to the present invention is superior to the transmittance of the optical glass (A) for the polarizing optical system containing lead ions at a depth of 10 mm.

Figure 42:
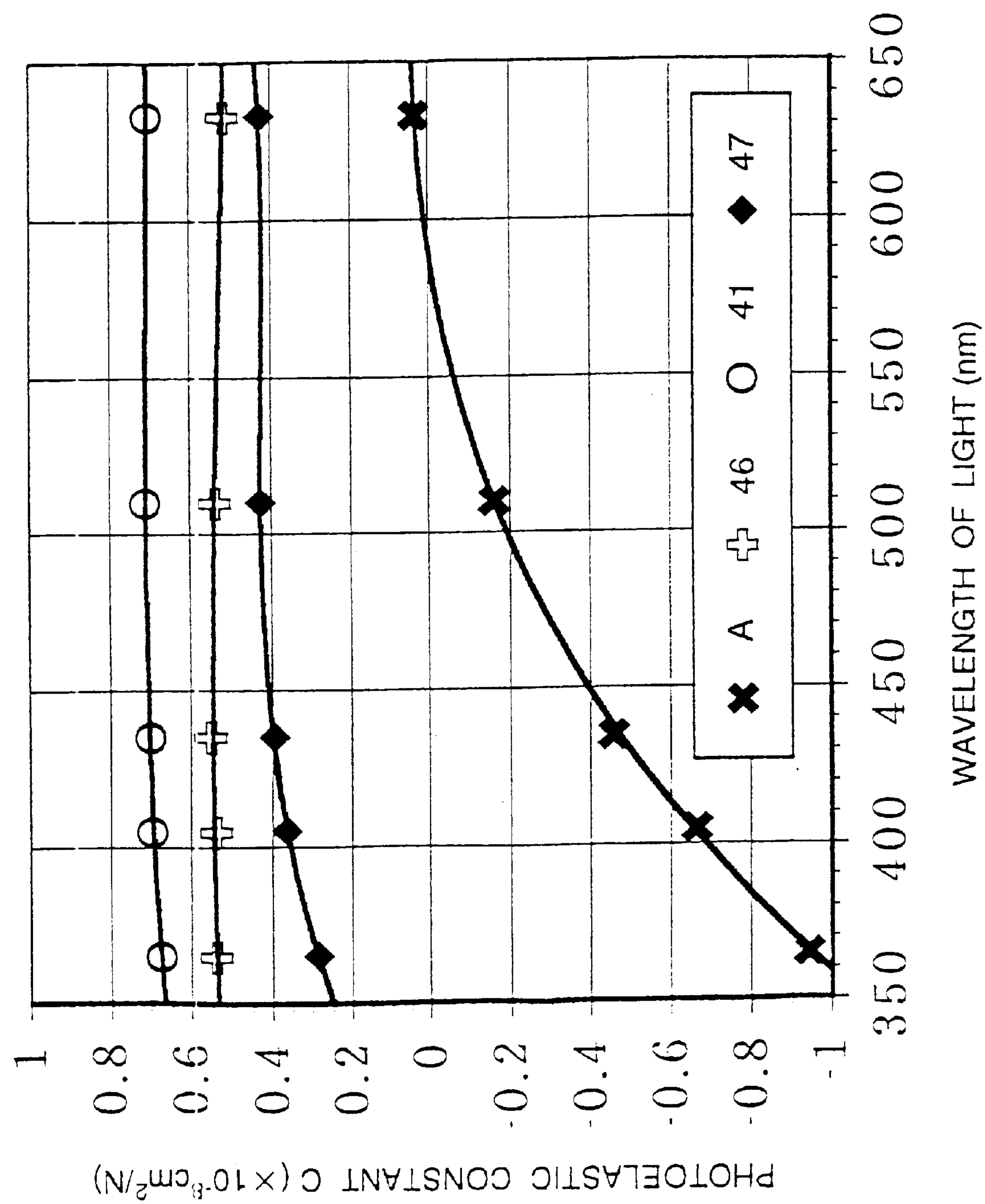
FIG. 42 is a graph showing wavelength dependence of Sample Nos. 46, 41 and 47, and Comparative Sample (A) among the glasses prepared in Example 7.

Further, FIG. 42 shows the wavelength dependence of the photoelastic constant C of the optical glass Sample according to the present inventions together with that of Reference Example. From these two figures, it may be understood that the glass according to the present invention is superior to an optical glass (A) for polarizing optical system containing a certain amount of lead ions, in the transmittance in a short-wavelength visible region and in an ultraviolet regions and further is applicable to many optical elements, because it has a small dispersion in the photoelastic constant with respect to wavelength of light. In particular, the glass according to the present invention is usable for a polarizing optical system having a large optical transmission thickness such as large-size polarizing beam splitter, which is particularly required to attain high-precision control of polarizing characteristic and is also required to have an excellent transmittance.

Figure 7:
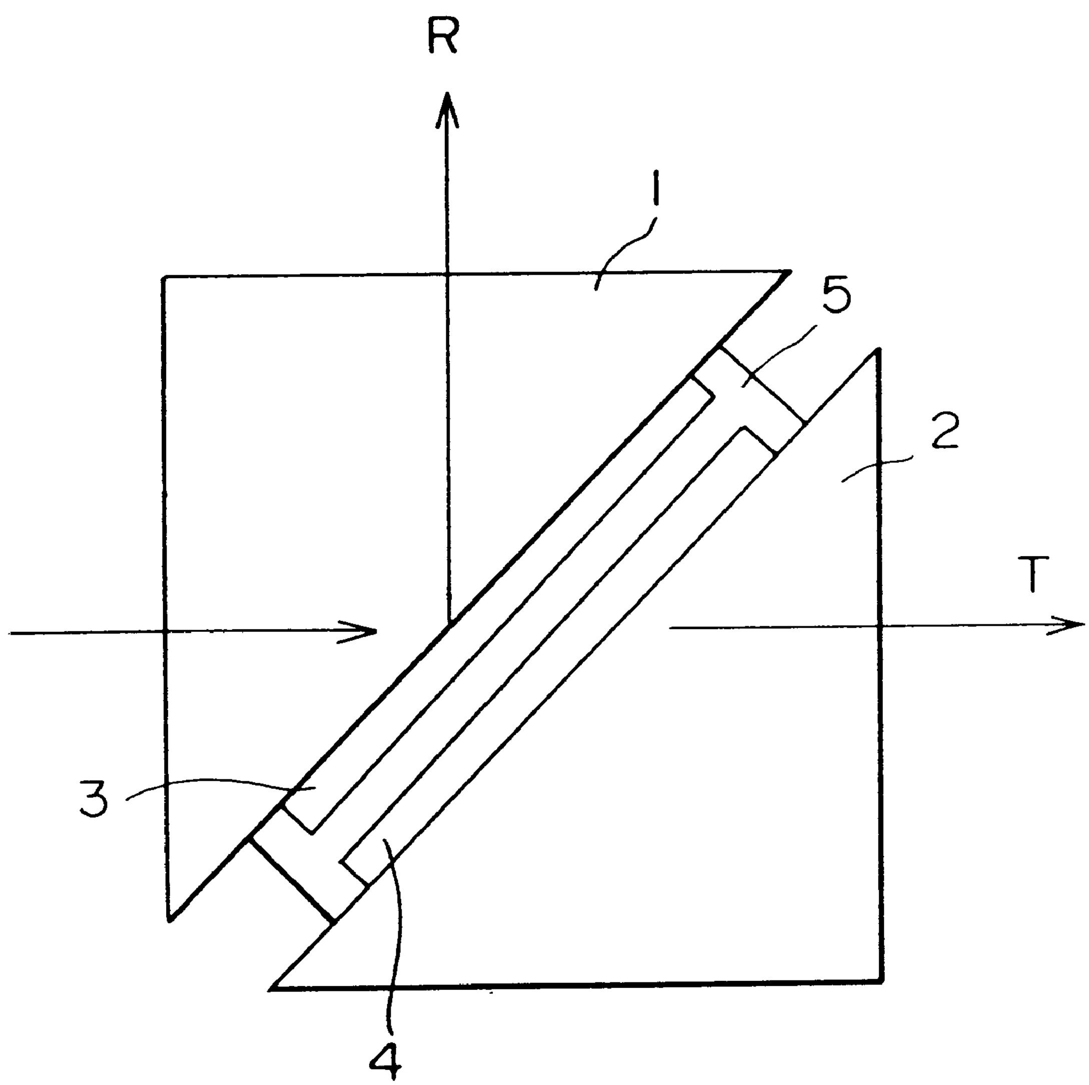
FIG. 7 is a schematic sectional view showing an example of the structure of the polarizing beam splitter according to the present invention.

For example, the polarizing beam splitter comprises two dielectric multilayer films formed between two light-transmissive substrates as shown in FIG. 7. In FIG. 7, two prisms 1 and 2 as substrates of a light-transmissive material are formed by using an optical glass for polarizing optical system according to the present invention, and dielectric multilayer films 3 and 4 are held by an adhesion layer 5 between the two prisms.

The optical loss due to the absorption, scattering, etc., at the time of the passage of light through a glass becomes larger, as the optical transmission thickness of the prisms 41 and 42 becomes larger. Therefore, the fluorophsphate optical glass according to the present invention having little optical loss is suitably usable for such a polarizing beam splitter with a large optical transmission thickness. In additions even when the polarizing beam splitter is used with respect to a wide wavelength range of lights the glass according to the present invention may provide a uniform and high-precision characteristic for any wavelength of such a range, because the wavelength dependence of the photoelastic constant thereof is small.

As described above, the present invention may provide a fluorophsphate optical glass for polarizing optical system having an excellent transmittance and a small photoelastic constant C with respect to wavelength of light to be used.

The process for producing the optical glass for polarizing optical system according to the present invention is not particularly limited. For example, the optical glass for polarizing optical system according to the present invention may easily be produced by using metaphosphoric acid salt, fluoride, oxide, carbonate, nitrate, etc., as raw materials corresponding to the above-mentioned components, weighing and mixing them to provide a formulated raw material having predetermined ratios, heating the formulated raw material to 900 to 1300° C. to be melted and subjecting the formulated raw material to plaining and stirring to be homogenized, casting the resultant mixture into a preheated metal mold, and then gradually cooling or annealing the resultant mixture.

The above fluorophsphate optical glass according to the present invention has a large Abbe's number $\nu_d$ as compared with that of an oxide-type glass such as "BK7", or an optical glass for polarizing optical system containing a predetermined amount of lead ions, and also have little dispersion. Therefore, the glass according to the present invention may provide little chromatic aberration in an optical element using the above optical glass for polarizing optical system.

As a results according to the present inventions it is possible to reduce the load of optical-design for other elements positioned before and after the above-mentioned optical element in an optical system, so that the glass according to the present invention may contribute to an improvement in the performance of the entire optical system, and to a reduction in the cost thereof.

(Polarizing optical system)

Figure 30:
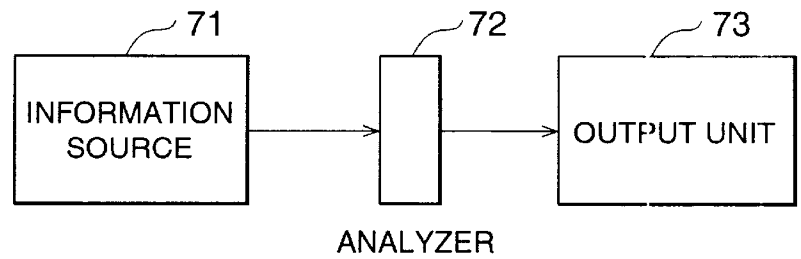
FIG. 30 is a block diagram showing an embodiment of the polarizing optical system for which the optical glass according to the present invention is suitably usable.
Figure 33:
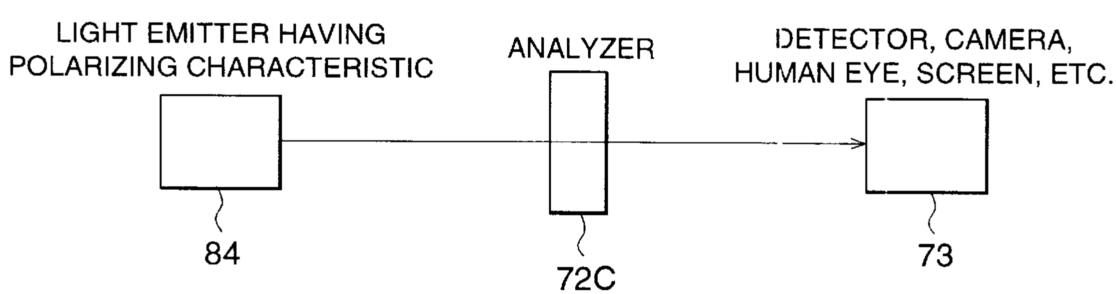
FIG. 33 is a block diagram showing an embodiment of the polarizing optical system having no polarizer.

The above-mentioned optical glass for polarizing optical system according to the present invention may be applied to many optical elements by utilizing the characteristic thereof. The range or latitude of the application of the optical glass for polarizing optical system according to the present invention is not particularly limited, but the optical glass may particularly preferably be utilized for an optical element or polarizing optical system which is required to have a high-precision polarizing characteristic, such as polarizing beam splitter and read-out transparent substrate for a spatial light modulator. Herein, "polarizing optical system" refers to an optical system wherein polarizing information is propagated in the form of intensity information of light. In general, as shown in the block diagram of FIG. 30, the polarizing optical system comprises an optical information source 71 for outputting (polarizing) information; an analyzer unit 72 for converting the polarizing state or condition in the polarizing information into "intensity information of light"; and an output unit 73 for receiving the "intensity information of light" (When the light emitter itself to be observed has a polarizing characteristic, as shown in FIG. 33 appearing herein after, the above-mentioned optical information source 71 is omissible from the polarizing optical system). In such a polarizing optical system, since the polarizing information is required to be precisely converted into the intensity information, the factor capable of disturbing the polarizing information of light, before it passes through the analyzer unit 72 should be removed as completely as possible. Accordingly, in particular, the above-mentioned optical glass for polarizing optical system according to the present invention is effectively usable for the purpose of preventing the turbulence in the polarizing information of light, before it passes through the analyzer unit. In such a viewpoint, for example, the optical glass according to the present invention is suitably usable for an optical element such as polarizer, wave plate, phase compensator, PBS, and read-out transparent substrate for SLM.

(SLM projector)

Figure 31:
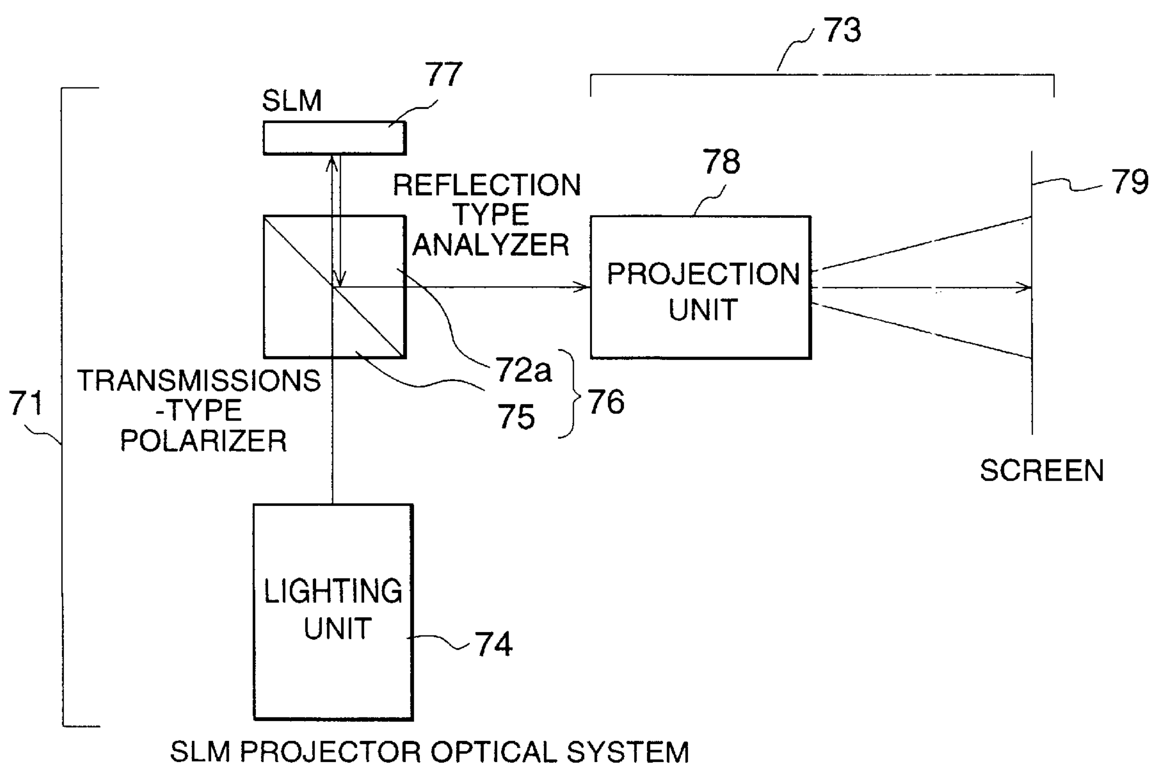
FIG. 31 is a block diagram showing an embodiment of SLM (Spatial Light Modulator)-type projector as an example of the polarizing optical system.

FIG. 31 is a block diagram showing an embodiment of the SLM (Spatial Light Modulator)-type projector as an example of the polarizing optical system as described above. Referring to FIG. 31, in the optical information source 71 constituting this SLM projector, light emitted from a light source 74 is converted into a linearly polarized light by a polarizing beam splitter (PBS) 76 comprising a transmission-type polarizer 75 and a reflection-type analyzer 72*a;* and further, the resultant polarized light is subjected to polarizing modulation by using an SLM 77, thereby to impart a spatial image information to the phase of the polarized light.

In the system shown in FIG. 31, the light emanating from the above SLM is again passed through the PBS (i.e., the reflection-type analyzer 72*a*) so that the light is converted into intensity information, and is further propagated to a projection-type optical system 78 (and a screen 79) corresponding to an output unit 73.

In the SLM projector of FIG. 31, the image information having a spatial intensity distribution is transmitted to the screen 79. The wavelength of light to be processed in this system can be expanded to a visible region. More specifically, for example, a color-image information may be processed in this system by dividing the band of light into three colors of Red, Green, and Blue.

(Polarizing microscope)

Figure 32:
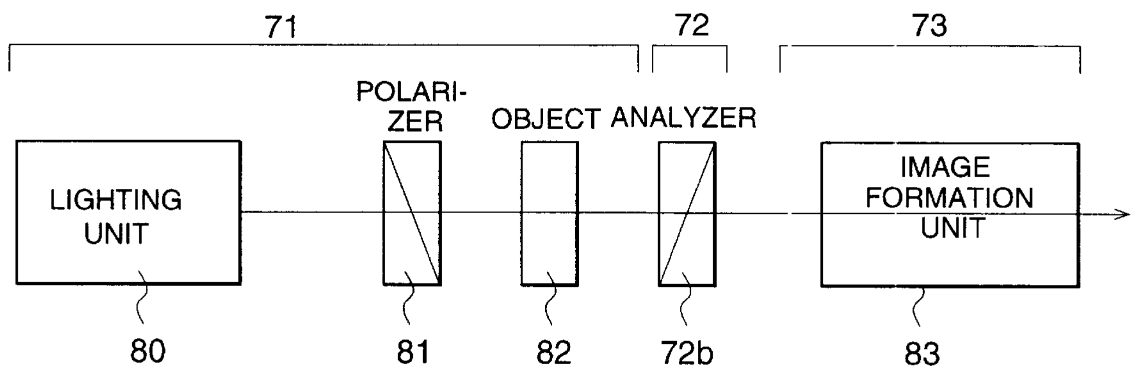
FIG. 32 is a block diagram showing an embodiment of polarizing microscope as an example of the polarizing optical system.

FIG. 32 is a block diagram showing an embodiment of the polarizing microscope as another example of the polarizing optical system. Referring to FIG. 32, in the optical information source 71 constituting this polarizing microscope, light emitted from a light source 80 is passed through a polarizer 81, and thereafter is incident to a sample 82, thereby to subject the light to polarizing modulation. In the embodiment of FIG. 32, the transmitted light from the sample 82 is observed. In addition, it is also possible to similarly observe the reflected light from the sample 82.

In FIG. 32, the polarizing-modulated image information emanating from the sample 82 is passed through an analyzer 72*b* to be converted into intensity information, and further, is transmitted to an eyepiece lens system 83 and to a human eye (not shown). In the analyzer unit 72 shown in FIG. 32, it is also possible to impart the light with defferent intensities corresponding to the respective wavelengths by introducing a phase compensator (not shown) into the analyzer unit. In other words, it is also possible to convert the polarizing distribution into different color tones as well as light intensities.

(System having no polarizer)

FIG. 33 is a block diagram showing an embodiment of the polarizing optical system which has no polarizer. In this system shown in FIG. 33, for example, the light emitted from a light source 84 having polarizing information (such as star as a light emitter) is passed through an analyzer 72*c* (as desired, after the light is passed through an unshown telescope) to be converted into intensity information, and is outputted to an output unit 73. It is possible to use, as the output unit in FIG. 33, a detector, a camera, an eye, a screen, etc. The system shown in FIG. 33 is also applicable to a telescope or microscope for observing a light emitter or refrected light having polarizing information.

In a case where such a system is used in combination with an object to be observed or a light emitter or reflected light having a linear polarization characteristic, the polarizing information can be converted into intensity information by disposing a deflector as an analyzer. In the case of circularly polarized lights it is difficult to distinguish such light from light having no polarization. Accordingly, in such a case, it is possible that the circularly polarized light is converted into a linearly polarized light by means of a ¼-wave plate, etc., and thereafter is passed through a deflector, whereby the light information can be converted into intensity information.

(Beam splitter)

Hereinbelow, there will be specifically described an embodiment wherein the optical glass for polarizing optical system according to the present invention is applied to a polarizing beam splitter.

The above polarizing beam splitter typically includes embodiments as described below.

(Embodiment 1)

A polarizing beam splitter comprising a dielectric multilayer film formed on a light-transmissive substrate (or base material), wherein:

the above dielectric multilayer film comprises a first dielectric multilayer film and a second dielectric multilayer film respectively having two different design reference wavelengths $\lambda_1$ and $\lambda_2$;

Each of the first and second dielectric multilayer films comprises an alternate layers each of which comprises a laminate (or multilayer structure) comprising a two-layer basic cycle including a high-refractive index substance and a low-refractive index substance having an optical film thickness of $\lambda_1/4$ or $\lambda_2/4$ at each reference wavelength of $\lambda_1$ or $\lambda_2$, which is repetitively disposed or formed in n cycles (no an arbitrary integer); and a thin film adjusting layer disposed on each of both sides of the alternate layer and comprising each one of the high-refractive index substance and the low-refractive index substance having an optical film thickness of $\lambda_1/8$ or $\lambda_2/8$; and the alternate layer of the first dielectric multilayer film and the alternate layer of the second dielectric multilayer film respectively comprise combinations of different substances from each others (Embodiment 2)

A polarizing beam splitter according to the above Embodiment 1, wherein the alternate layer of the first dielectric multilayer film comprises a combination of $TiO_2$ as the high-refractive index substance and $SiO_2$ as the low-refractive index substance; and the alternate layer of the second dielectric multilayer film comprises a combination of $TiO_2$ as the high-refractive index substance and $Al_2O_3$ as the low-refractive index substance.

(Embodiment 3)

A polarizing beam splitter according to the above Embodiment 1, wherein the alternate layer of the first dielectric multilayer film comprises a combination of $TiO_2$ as the high-refractive index substance and $SiO_2$ as the low-refractive index substance; and the alternate layer of the second dielectric multilayer film comprises a combination of $ZrO_2$ as the high-refractive index substance and $MgF_2$ as the low-refractive index substance.

(Embodiment 4)

A polarizing beam splitter according to the above Embodiment 1, wherein the alternate layer of the first dielectric multilayer film and the alternate layer of the second dielectric multilayer film are immersed or disposed in a liquid medium having substantially the same refractive index as that of the light-transmissive substrate.

In the polarizing beam splitter according to the present invention having the above structure, there are selected an arrangement thereof and substances to be used for the high-refractive index layer and low-refractive index layer constituting the alternate layer of the dielectric multilayer film such that they do not narrow the band width of a wavelength range to be used, even when the incident angle of a light beam to the dielectric multilayer film is somewhat changed.

In general, in order to conduct polarizing separation over a wide band, it is preferred to increase the band width for separating a P-polarized light component and an S-polarized light component with respect to the wavelength of a light beam which is to be incident on a polarizing separation film. In order to satisfy such a condition, it is preferred that the incident light beam is caused to be incident on the polarizing separation film in accordance with the Snell's law so as to provide a design incident angle in the neighborhood of the Brewster's angle, which is an angle for providing the maximum polarizing separation between the P-polarized light component and the S-polarized light component.

The above dielectric multilayer film structure comprises the first and second dielectric multilayer films respectively having design reference wavelengths different from each other. In general, such a structure is designed so as to provide different incident angles for light beams which are to be incident on the first and second dielectric multilayer films, respectively. In addition, it is preferred to select the high-refractive index substance and low-refractive index substance constituting the first and second dielectric multilayer films so that the following Brewster's conditions (1) and (2) are made different from each other. For example, it is preferred that one of the alternate layers of the dielectric multilayer film comprises a combination of $TiO_2$ as the high-refractive index substance and $SiO_2$ as the low-refractive index substance, and the other of the alternate layers of the dielectric multilayer film comprises a combination of $TiO_2$ as the high-refractive index substance and $Al_2O_3$ as the low-refractive index substance.

For the respective design reference wavelengths $\lambda_1$, $\lambda_2$ ($\lambda_1 \neq \lambda_2$), and a design reference incident angle $\theta$, the corresponding incident angles are denoted by $\theta_1$ and $\theta_2$, respectively For each of the set of the above conditions, the Brewster's condition is represented by the following equation (1) or (2).

$$\lambda_1 > \lambda_2$$

$$\lambda_1,\ \theta_1;\ nH_1\ \mathrm{COS}\theta H_1 = nL_1\ \mathrm{COS}\theta L_1 \tag{1}$$

$$\lambda_2,\ \theta_2;\ nH_2\ \mathrm{COS}\theta H_2 = nL_1\ \mathrm{COS}\theta L_2 \tag{2}$$

$\theta_1$; Angle of incidence of light when the light emerging from the light-transmissive substrate 1 is incident on the boundary between the first dielectric multilayer film and the light-transmissive substrate 1.

$\theta_2$; Angle of incidence of light when the light emerging from the light-transmissive substrate 2 is incident on the boundary between the second dielectric multilayer film and the light-transmissive substrate 2.

$nH_1$, $nL_1$; Refractive indices of the high-refractive index substance layer and the low-refractive index substance layer constituting the alternate layer of the first dielectric multilayer film at the design reference wavelength $\lambda_1$.

$nH_2$, $nL_2$; Refractive indices of the high-refractive index substance layer and the low-refractive index substance layer constituting the alternate layer of the second dielectric multilayer film at the design reference wavelength $\lambda_2$.

$\theta H_1$, $\theta L_1$; Angle of incidence of light which emerges from each of the high-refractive index substance layer and the low-refractive index substance layer and is incident on the boundary, in the alternate layer of the first dielectric multilayer film at the design reference wavelength $\lambda_1$.

$\theta H_2$, $\theta L_2$; Angle of incidence of light which emerges from each of the high-refractive index substance layer and the low-refractive index substance layer and is incident on the boundary, in the alternate layer of the second dielectric multilayer film at the design reference wavelength 12.

Figure 6:
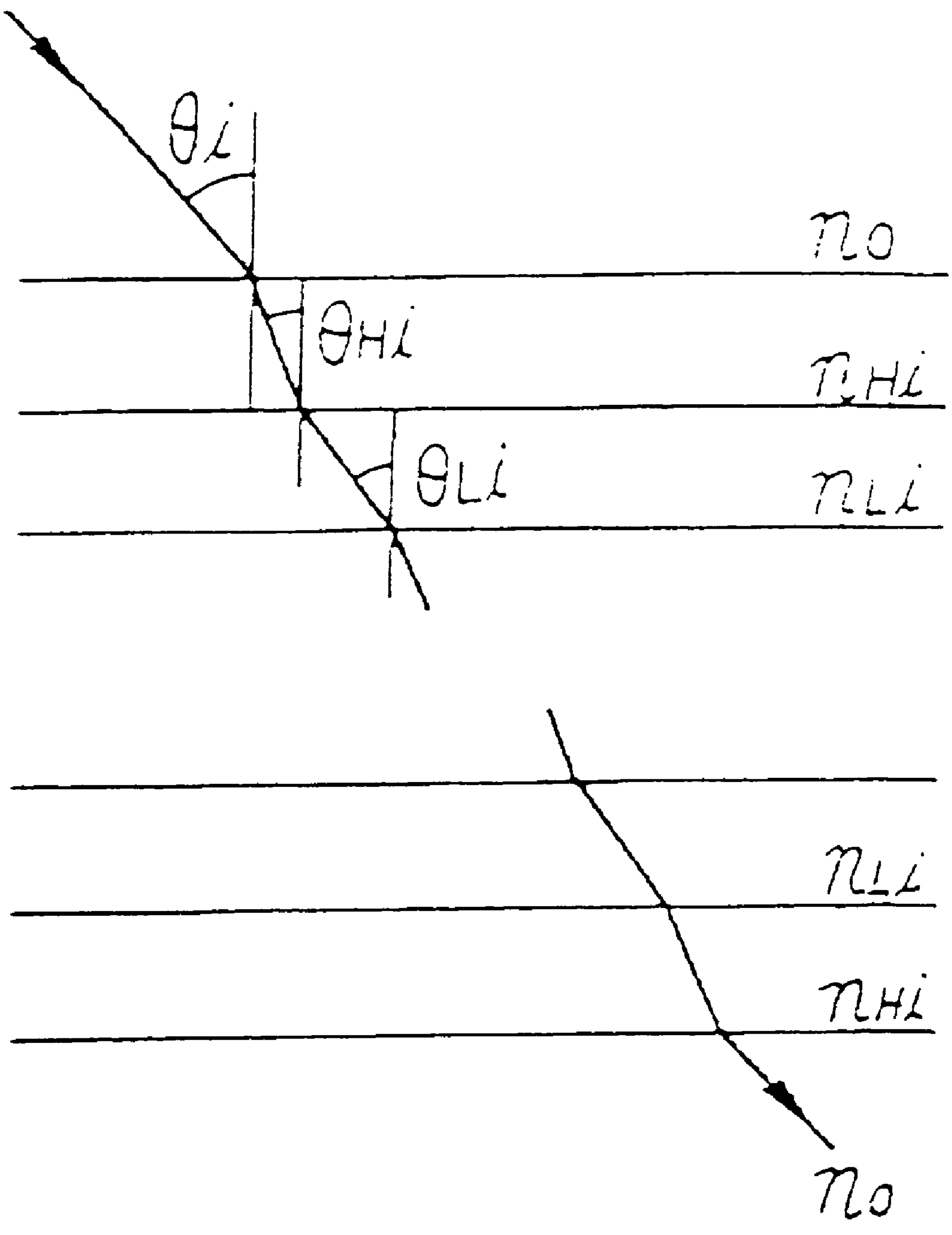
FIG. 6 is a schematic sectional view for illustrating a state of a light beam which is incident on the dielectric multilayer film constituting a polarizing beam splitter according to the present invention.

FIG. 6 is a view for illustrating the state of the incidence of a light beam which is to be incident on the above dielectric multilayer film, when it emerges from the high-refractive index substance layer and the low-refractive index substance layer and is incident on the boundary. In FIG. 6, the $\theta_i$, $\theta H_i$, $\theta L_i$ respectively correspond to the first and second dielectric multilayer films (i=1 and 2).

It is preferred that the film thicknesses of the high-refractive index substance layer, the low-refractive index substance layer, and the adjusting layer to be used for the alternate layer of the dielectric multilayer film according to the present invention are $\lambda/4$, $\lambda/4$, and $\lambda/8$, respectively.

However, these film thicknesses to be actually formed can also be determined experimentally in a trial-and-error manner, and therefore these thicknesses can be somewhat different from the above design values.

The above "adjusting layer" is a layer having a function of reducing a ripple which can occur in the transmittance of the P-polarized light component. When a large ripple occurs, the wavelength range wherein the polarizing beam splitter is usable may undesirably be limited.

Figure 9:
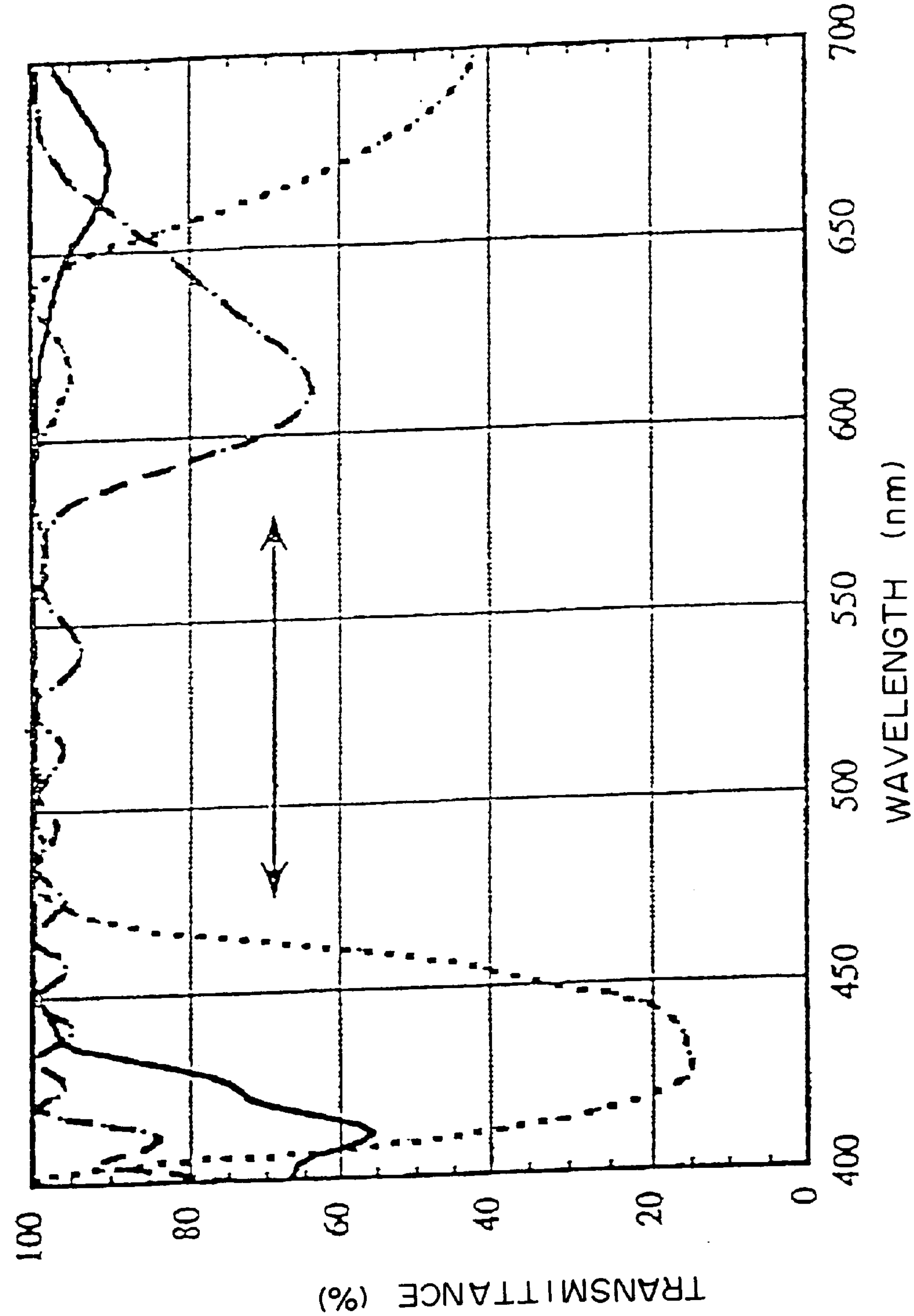
FIG. 9 is a graph for comparing the transmittance characteristics based on the structures of conventional polarizing beam splitters.

In order to compare the above embodiment of the polarizing beam splitter according to the present invention with another one, there will be briefly described the transmittance characteristic of another polarizing beam splitter. Such a polarizing beam splitter has basically the same structure as that shown in FIG. 7, wherein the alternate layers of the first and second dielectric multilayer films use the same combinations of a high-refractive index substance layer of $TiO_2$ and a low-refractive index substance layer of $SiO_2$. FIG. 9 is a graph showing the incident angle dependence of the transmittance characteristic of such a polarizing beam splitter.

Referring to FIG. 9, in the case of the design reference incident angle of 45 degrees, a band wherein the P/S polarizing separation ratio is high is 160 nm (denoted by a solid line in FIG. 9). On the other hand, when the incident angle is shifted by ±2.5 degrees to 42.5 degrees or 47.5 degrees, the band width becomes 90 nm (denoted by a dotted line of FIG. 9 and an alternate long and short dashed line). As shown in FIG. 9, a polarizing beam splitter using a dielectric multilayer film comprising only one combination may provide a wide wavelength range to be used wherein the S- and P-polarized light components can be separated from each other. However, in such a structure, a desired wavelength band width is extremely narrowed only when the angle of incidence of light to be incident on the dielectric multilayer film is shifted to a small extent.

On the contrary, in the polarizing beam splitter according to the above-mentioned embodiment of the present invention, the band width to be used therefor may be extremely broadened while retaining the separation ratio between the P-polarized light component and the S-polarized light component, even when the angle of incidence of a light beam to be incident on the dielectric multilayer film is somewhat shifted or deviated. In addition, it is possible to increase the latitude or degree of freedom in the arrangement of an optical system into which the polarizing beam splitter has been assembled.

(Process for constituting dielectric multilayer film)

Hereinbelow, there will be described a process for constituting the dielectric multilayer film of the polarizing beam splitter according to the present invention.

FIG. 7 shows a structure wherein a first dielectric multilayer film 3 and a second dielectric multilayer film 4 are respectively formed or disposed on a prisms 1 and 2 as light-transmissive substrates, and are joined with each other by the medium of an adhesive layer 5.

Figure 8:
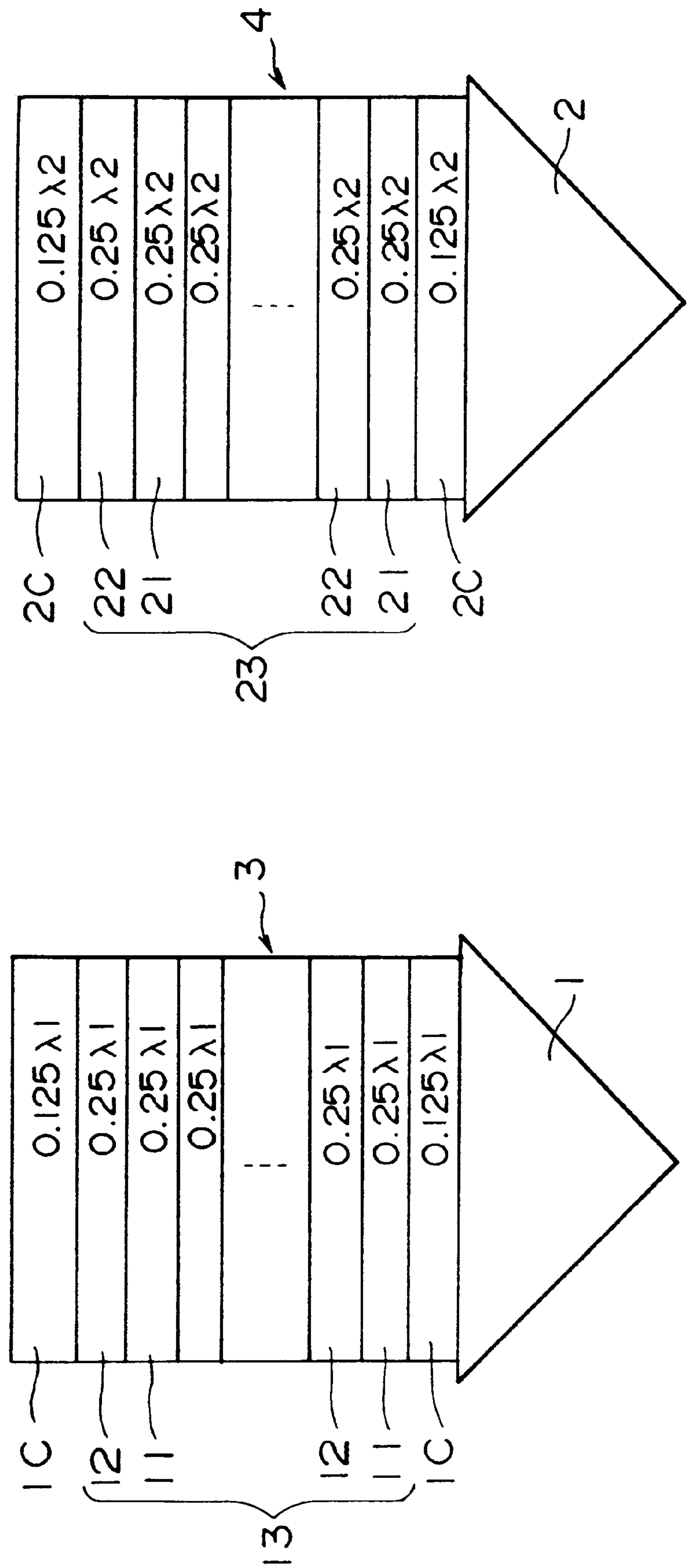
FIG. 8 is a schematic sectional view showing an example of the structure of the first dielectric multilayer film 13 and the second dielectric multilayer film 23 according to the present invention.

In the structure shown in FIG. 8, a first dielectric multilayer film 13 and a second dielectric multilayer film 23 are sequentially disposed or formed on a light-transmissive substrate 1. Another light-transmissive substrate is further bonded onto the upper side thereof.

The loss of light due to absorption, scattering etc., at the time of the passage of the light through a glass becomes greater, as the optical transmission thicknesses of the prism 1 and 2 are increased. Accordingly, the optical glass for polarizing optical system according to the present invention, which has been improved in the transmittance thereof, may suitably be used for such a polarizing beam splitter having a large optical transmission thickness.

Figure 11:
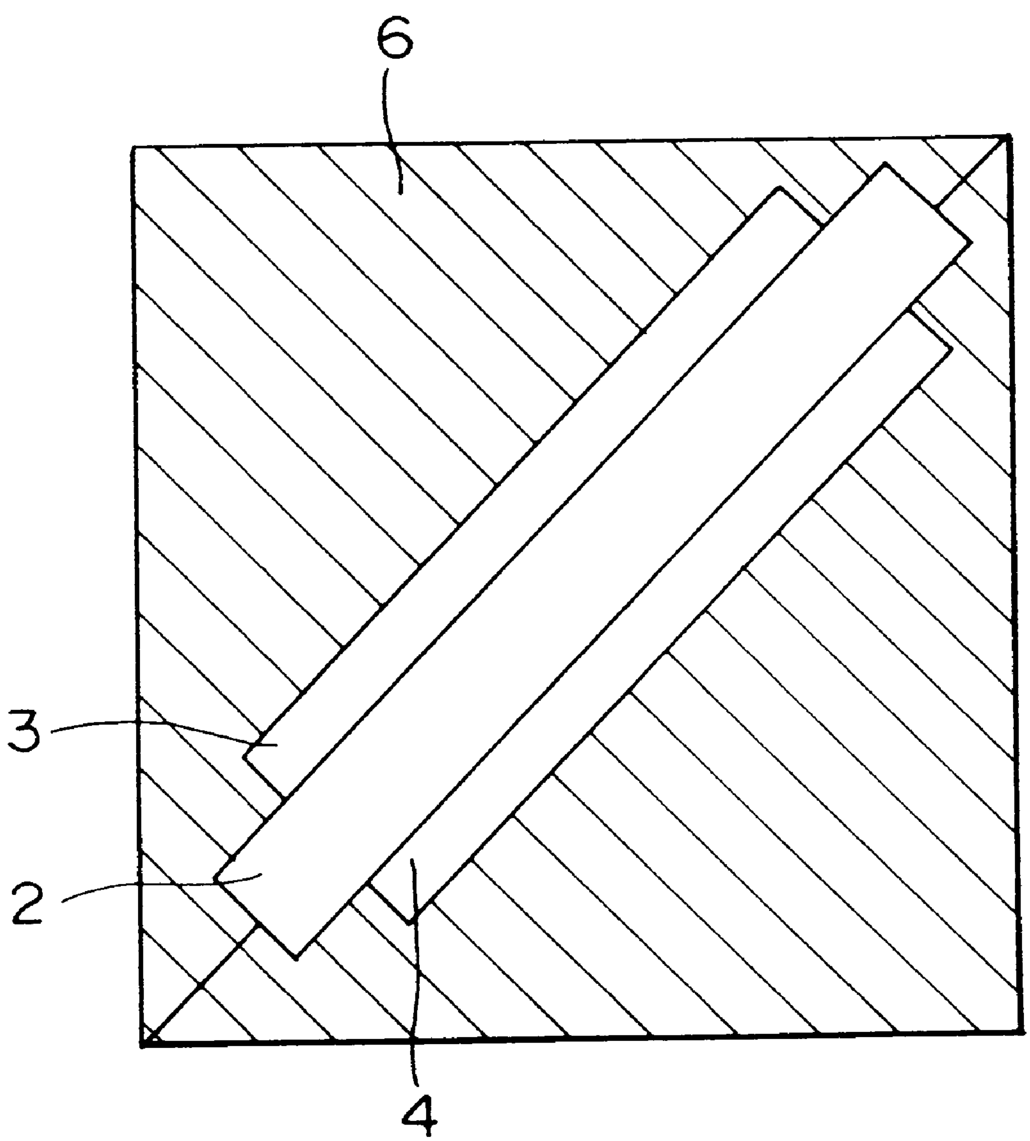
FIG. 11 is a schematic sectional view showing an example of the structure of another polarizing beam splitter (fourth structure embodiment) according to the present invention.

FIG. 11 shows a structure wherein dielectric multilayer films 3 and 4 are disposed on both sides of a flat glass plate 2 as a light-transmissive substrate, and further the resultant laminate is immersed in a liquid medium 6 having substantially the same refractive index as that of the glass. When such a structure is adopted, substantially the same performance as that of the structure of FIG. 7 may be provided.

(Embodiments of structure of polarizing beam splitter)

There is described a first embodiment of the structure of the polarizing beam splitter according to the present invention.

FIG. 7 shows the structure of a polarizing beam splitter wherein a prism 1 (on which a laminate of an adjusting layer 1C and an alternate layer 13 of a first dielectric multilayer film 3 is disposed, as shown in FIG. 8), is joined with prism 2 (on which a laminate of an adjusting layer 2C and an alternate layer 23 of a second dielectric multilayer film 4 is disposed, as shown in FIG. 8) by an optical adhesive 5.

In this embodiment of the structures the prisms 1 and 2 have a refractive index $n_s$=1.84. Furthers the optical adhesive has a refractive index $n_b$=1.52. FIG. 7 shows reflected light R and transmitted light T when a light beam is incident was at an angle of 45 degrees. The transmitted light T includes an S-polarized light component $T_s$ and a P-polarized light component $T_p$.

Figure 10:
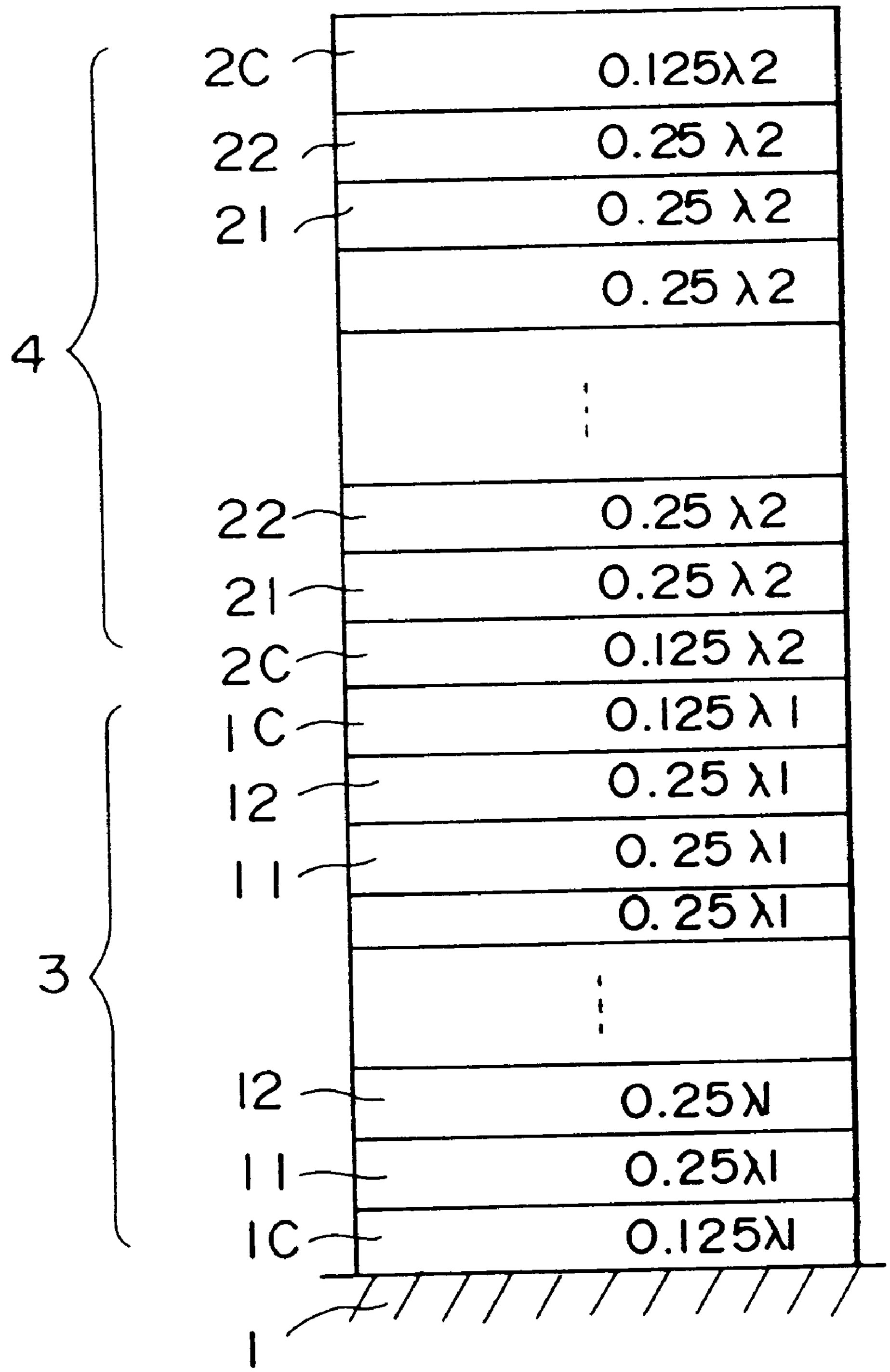
FIG. 10 is a schematic sectional view showing an example of the structure of the first dielectric multilayer film 13 and the second dielectric multilayer film 23 according to a third structure embodiment of the present invention.

Referring to FIG. 10, the alternate layer 13 of the first dielectric multilayer film has a design reference wavelength $\lambda_1$=680 nm, and has a structure such that a $TiO_2$ layer 11 as a high-refractive index substance having $nH_1$=2.38, and an $Al_2O_3$ layer 12 as a low-refractive index substance having $nL_1$=1.65 are alternately disposed in an optical film thickness of $\lambda_1/4$, respectively.

On the other hand, the alternate layer 23 of the second dielectric multilayer film has a design reference wavelength $\lambda_2$=420 nm, and has a structure such that a $TiO_2$ layer 21 as a high-refractive index substance having $nH_2$=2.38, and an $SiO_2$ layer 22 as a low-refractive index substance having $nL_1$=1.47 are alternately disposed in an optical film thickness of $\lambda_2/4$, respectively In addition, an adjusting layer 1C or 2C having a film thickness of $\lambda_1/8$ or $\lambda_2/8$, respectively is disposed between the above-mentioned alternate layer 13 or 23 of the first or second dielectric multilayer film and the prism 1 or prism 2.

In the polarizing beam splitter having the above structure, there is supposed a case wherein the angle of incidence of a light beam is shifted or deviated by ±2.5 degrees from the design reference angle of 45 degrees.

In this case, the low-refractive index substance 12 and the high-refractive index substance 11 used in the alternate layer 13 of the first dielectric multilayer film corresponding to a higher angle side (i.e., corresponding to a shorter wavelength side in terms of the wavelength to be used) are selected so that the above-mentioned Brewster's condition (1) is satisfied at an angle of $\theta_1$=47.5 degrees at which a light beam emerging from the light-transmissive substrate 1 is incident on the boundary between the light-transmissive substrate 1 and the first dielectric multilayer film 13. In this embodiment of the structure, $TiO_2$ was selected as the high-refractive index layer 11, and $Al_2O_3$ was selected as the low-refractive index layer 12, as the combination of materials or substances constituting the alternate layer 13 of the first dielectric multilayer film.

On the other hand, the low-refractive index substance 22 and the high-refractive index substance 21 used in the alternate layer 23 of the second dielectric multilayer film corresponding to a lower angle side (i.e., corresponding to a longer wavelength side in terms of the wavelength to be used) are selected so that the above-mentioned Brewster's condition (2) is satisfied at an angle of $\theta_1$=42.5 degrees at which a light beam emerging from the light-transmissive substrate 2 is incident on the boundary between the light-transmissive substrate 2 and the first dielectric multilayer film 23. In this embodiment of the structure, $TiO_2$ was selected as the high-refractive index layer 21, and $SiO_2$ was selected as the low-refractive index layer 12, as the combination of materials or substances constituting the alternate layer 23 of the second dielectric multilayer film.

Figure 12:
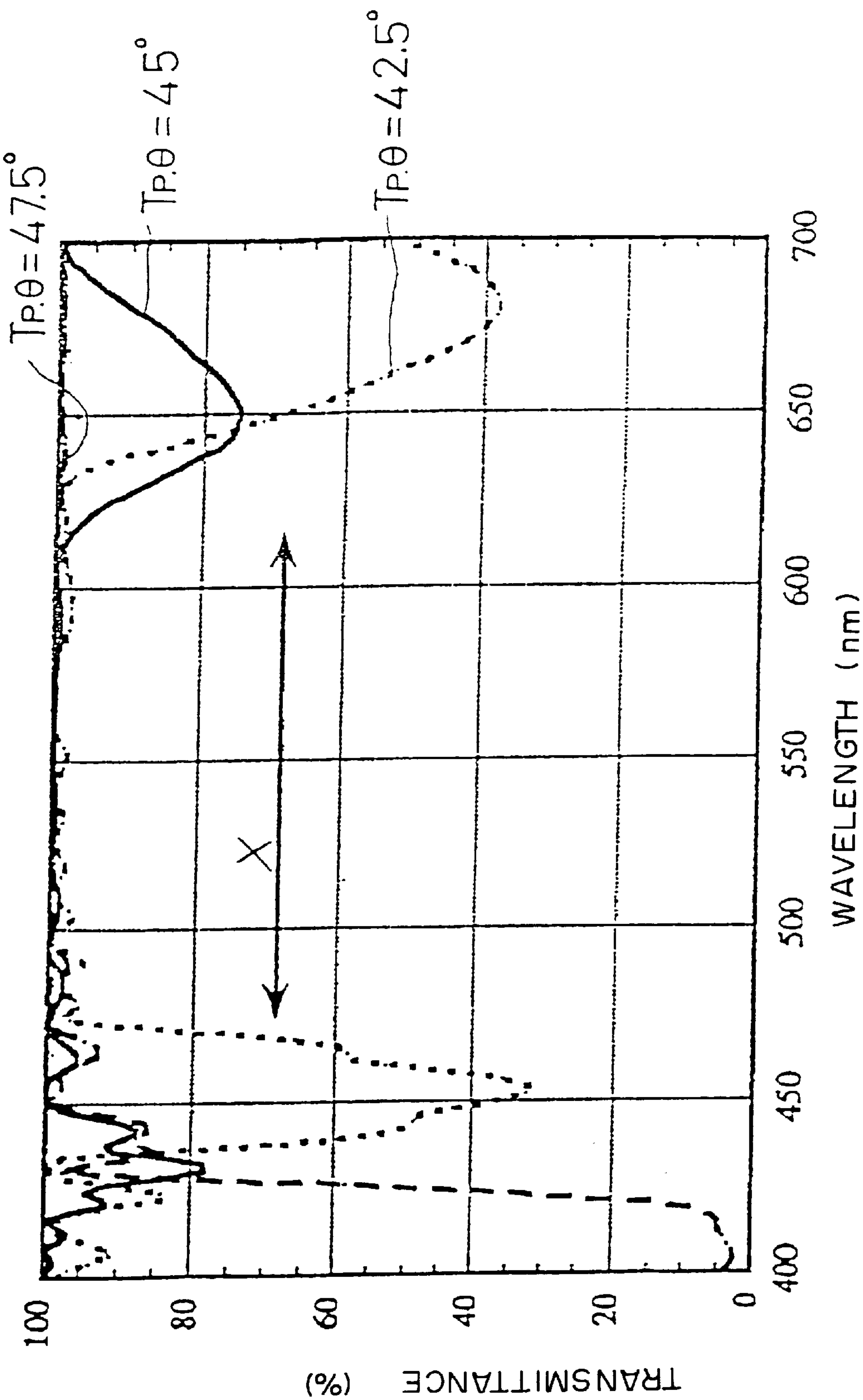
FIG. 12 is a graph for illustrating the transmittance characteristic of the dielectric multilayer film constituting the polarizing beam splitter of the first structure embodiment according to the present invention.

FIG. 12 is a graph showing the transmittance characteristics $T_p$, $T_s$ of the P-polarized light component and S-polarized light component in the dielectric multilayer film structure of the above-mentioned first structure embodiment, and transmittance characteristics at incident angles of 42.5 degrees, 45 degrees and 47.5 degrees, respectively.

Hereinbelow, the incident angle dependence of the transmittance of P- and S-polarized light components in the polarizing beam splitter having the above-mentioned structure of the dielectric multilayer of the first structure embodiment is compared with that of the polarizing beam splitter (Comparative Example) having the characteristic as shown in FIG. 9 as described above.

Referring to FIG. 9, in a case where the multilayer structure of the Comparative Example is used, when the incident angle is shifted by few degrees (e.g., by about ±2.5 degrees) from the design reference angle in the wavelength range of from 480 nm to 570 nm, the band width X thereof becomes 90 nm which is a very narrow band.

On the contrary, in the first structure embodiment according to the present invention of which characteristic is shown in FIG. 12, a high polarizing separation property ($T_n/T_p$) of 0.1% or less is provided in the wavelength range of from 460 nm to 620 nm. In this embodiment, even when the incident angle is shifted by ±2.5° from the design reference angle of incidence, the band width X is maintained at a broad band of 160 nm.

Figure 13:
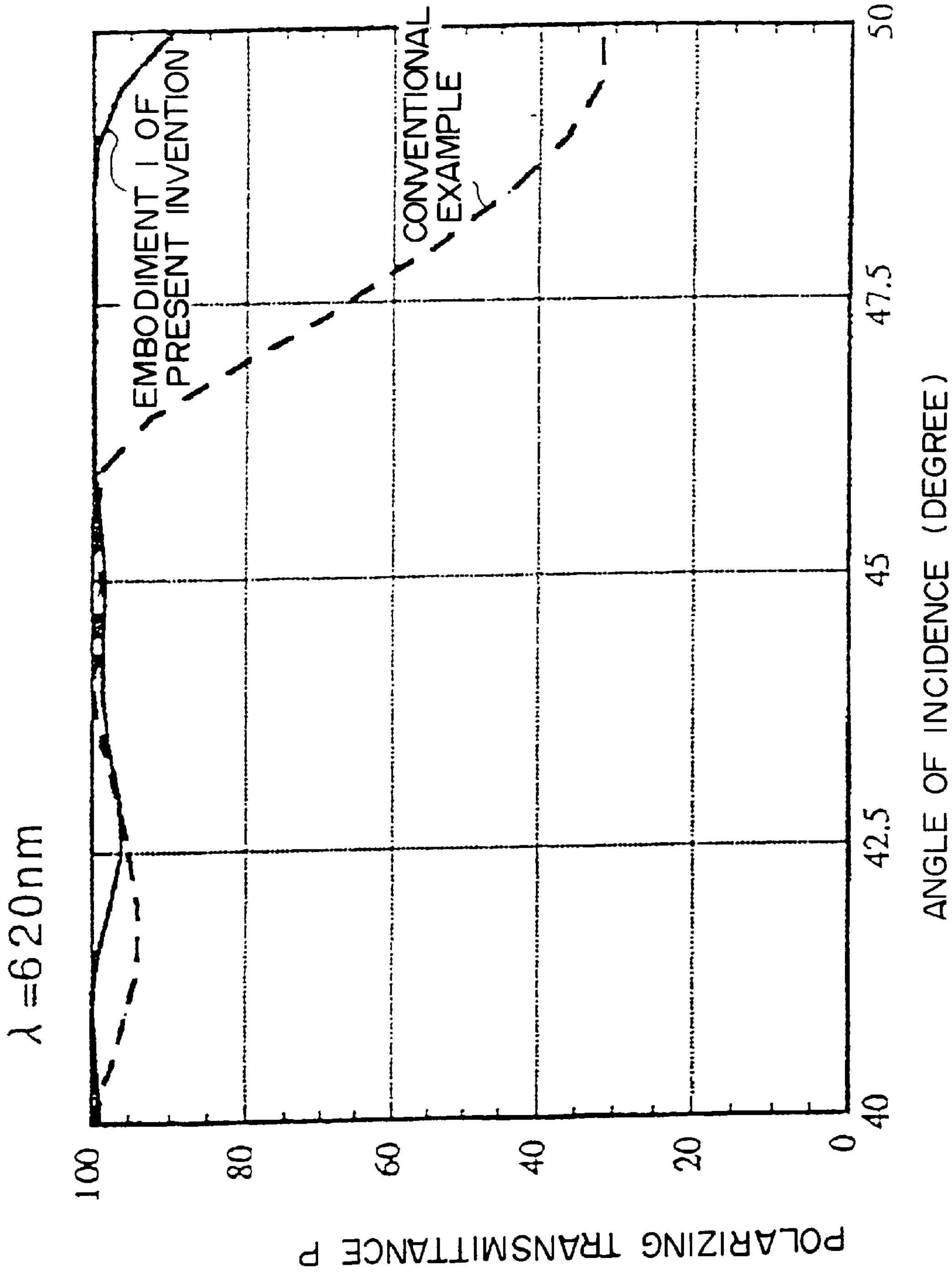
FIG. 13 is a graph for illustrating the incident angle dependence of the transmittance characteristic of the dielectric multilayer film constituting the polarizing beam splitter of the first structure embodiment according to the present invention.

FIG. 13 is a graph showing the incident angle dependence of the transmittance of P-polarized light components at a longer wavelength $\lambda$=620 nm in the above-mentioned first structure embodiment according to the present invention.

As shown in FIG. 13, in the polarizing beam splitter of this structure embodiment, the band width of the transmittance characteristic can be considerably broadened even in consideration of the incident angle dependence thereof, as compared with that of the polarizing beam splitter of Comparative Example having the characteristic as shown in FIG. 9 wherein $TiO_2$ and $SiO_2$ are used for the combination of the same kind of substances, as the alternate layers constituting the first and second dielectric multilayer films.

According to the present inventors' knowledge, it is assumed that the reason for the provision of such a good characteristic in the present invention is that the film forming substances for the respective dielectric multilayer films are selected so that the alternate layer of the first dielectric multilayer film capable of causing a decrease in the longer wavelength side of the transmittance of the P-polarized light component, satisfies the Brewster's condition (1) at 47.5 degrees; and that the alternate layer of the first second dielectric multilayer film capable of causing a decrease in the shorter wavelength side of the transmittance, satisfies the Brewster's condition (2) at 42.5 degrees.

Thus, when the polarizing beam splitter having the structure according to the present invention is used, it is possible to considerably broaden the band width in the wavelength to be used, and to provide a polarizing beam splitter having a high degree of freedom in the incident angle of light.

(Second embodiment of structure of polarizing beam splitter)

Next, there is described a second embodiment of the structure of the polarizing beam splitter according to the present invention.

The dielectric multilayer film structure of the second structure embodiment is basically the same as that of the first structure embodiment, except that the combination of substances to be used for the dielectric multilayer film is different from that used in the first embodiment.

Referring to FIGS. 7 and 8, the second structure embodiment has a polarizing beam splitter structure wherein a light-transmissive substrate 1 having thereon a laminate of an adjusting layer 1C and an alternate layer 13 of a first dielectric multilayer film 3, is joined with a light-transmissive substrate 2 having thereon a laminate of an adjusting layer 2C and an alternate layer 23 of a second dielectric multilayer film 4, by an optical adhesive 5. The light-transmissive substrates 1 and have a refractive index $n_s$=1.52.

In this structure embodiment, the alternate layer 13 of the first dielectric multilayer film has a design reference wavelength $\lambda_1$=700 nm, and has a structure such that a $TiO_2$ layer as a high-refractive index substance having $nH_1$=2.38, and an $SiO_2$ layer as a low-refractive index substance having $nL_1$=1.47 are alternately disposed in an optical film thickness of $\lambda_1/4$, respectively The alternate layer 23 of the second dielectric multilayer film has a design reference wavelength of 430 nm, and has a structure such that a $ZrO_2$ layer as a high-refractive index substance having $nH_2$=2.02, and an $MgF_2$ layer as a low-refractive index substance having $nL_2$=1.37 are alternately disposed in an optical film thickness of $\lambda_2/4$, respectively.

In addition, an adjusting layer 1C or 2C having a film thickness of $\lambda_1/8$ or $\lambda_2/8$, respectively, is disposed between the above-mentioned alternate layer 13 or 23 of the first or second dielectric multilayer film, and the prism 1 or 2.

In the polarizing beam splitter having the above structure, when the angle of incidence of a light beam is shifted or deviated by ±4° from the design reference angle of 52° in the neighborhood of the design reference angle, the low-refractive index substance 12 and the high-refractive index substance 11 used in the alternate layer 13 of the first dielectric multilayer film corresponding to a higher angle side (i.e., corresponding to a shorter wavelength side in terms of the wavelength to be used) are selected so that the above-mentioned Brewster's condition (1) is satisfied at an incident angle of 56° as the angle of a light beam with respect to the normal of the film surface. In this embodiment of the structure, $TiO_2$ was selected as the high-refractive index layer 11, and $SiO_2$ was selected as the low refractive index layer 12, as the combination of materials or substances constituting the alternate layer 13 of the first dielectric multilayer film.

On the other hand, the low-refractive index substance 22 and the high-refractive index substance 21 used in the alternate layer 23 of the second dielectric multilayer film corresponding to a lower angle side (i.e., corresponding to a longer wavelength side in terms of the wavelength to be used) are selected so that the above-mentioned Brewster's condition (2) is satisfied at an incident angle of a light beam of 48°. In this embodiment of the structure, $ZrO_2$ was selected as the high-refractive index layer 21, and $MgF_2$ was selected as the low-refractive index layer 22, as the combination of materials or substances constituting the alternate layer 23 of the second dielectric multilayer film.

Figure 14:
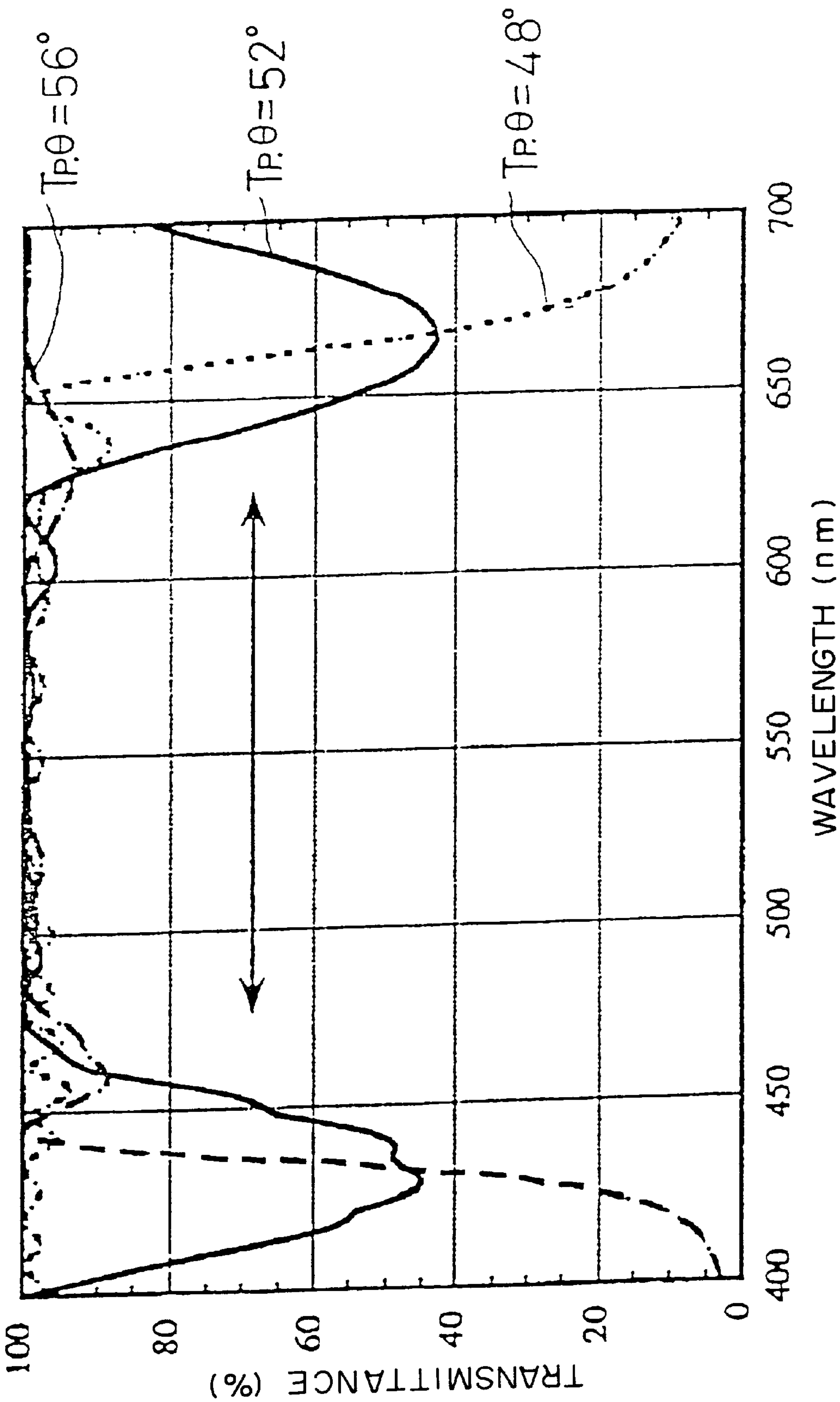
FIG. 14 is a graph for illustrating the transmittance characteristic of the dielectric multilayer film constituting the polarizing beam splitter of the second structure embodiment according to the present invention with respect to the P-polarized light component.

FIG. 14 is a graph showing the transmittance characteristics the P-polarized light component and S-polarized light component in the dielectric multilayer film structure of the above-mentioned first structure embodiment, and transmittance characteristics at incident angles of 48°, 52° and 56°, respectively.

Hereinbelow, the incident angle dependence of the transmittance of P- and S-polarized light components in the polarizing beam splitter having the above-mentioned structure of the dielectric multilayer of the second structure embodiment of the present invention is compared with that of the above-mentioned polarizing beam splitter (Comparative Example) having the characteristic as shown in FIG. 9.

Referring to FIG. 9, in a case where the multilayer structure of the Comparative Example is used, when the incident angle is shifted by few degrees (e.g., by about ±2.5 degrees) from the design reference angle in the wavelength range of from 480 nm to 570 nm, the band width X thereof becomes 90 nm which is a very narrow band to be used.

On the contrary, in the second structure embodiment according to the present invention of which characteristic is shown in FIG. 14, a high polarizing separation between the P-polarized light component and S-polarized light component is provided in the wavelength range of from 460 nm to 620 nm. In this embodiment, even when the incident angle is shifted by ±4° from the design reference angle of incidence, the band width X is maintained at a broad band of 170 nm.

As shown in FIG. 14, in the polarizing beam splitter of this structure embodiment, the band width of the transmittance characteristic can be considerably broadened even in consideration of the incident angle dependence thereof, as compared with the polarizing beam splitter of Comparative Example wherein $TiO_2$ and $SiO_2$ are used for the combination of the same kind of substances, as the alternate layers constituting the first and second dielectric multilayer films.

According to the present inventors' knowledge, it is assumed that the reason for the provision of such a good characteristic in the present invention is that the film forming substances for the respective dielectric multilayer films are selected so that the alternate layer of the first dielectric multilayer film capable causing a decrease in the longer wavelength side of the transmittance of the P-polarized light component, satisfies the Brewster's condition (1) at 56 degrees; and that the alternate layer of the first dielectric multilayer film capable of causing a decrease in the shorter wavelength side of the transmittance, satisfies the Brewster's condition (2) at 48 degrees.

Thus, when the design reference wavelengths and the combination of the high-refractive index substance and the low-refractive index substance constituting the first and second dielectric multilayer films are made different from each other, it is possible to considerably broaden the band width in the wavelength to be used, and to provide a high-band width polarizing beam splitter having a high degree of freedom in the incident angle of light and having a high polarizing separation ratio S/P.

(Third embodiment of the structure of polarizing beam splitter)

Figure 15:
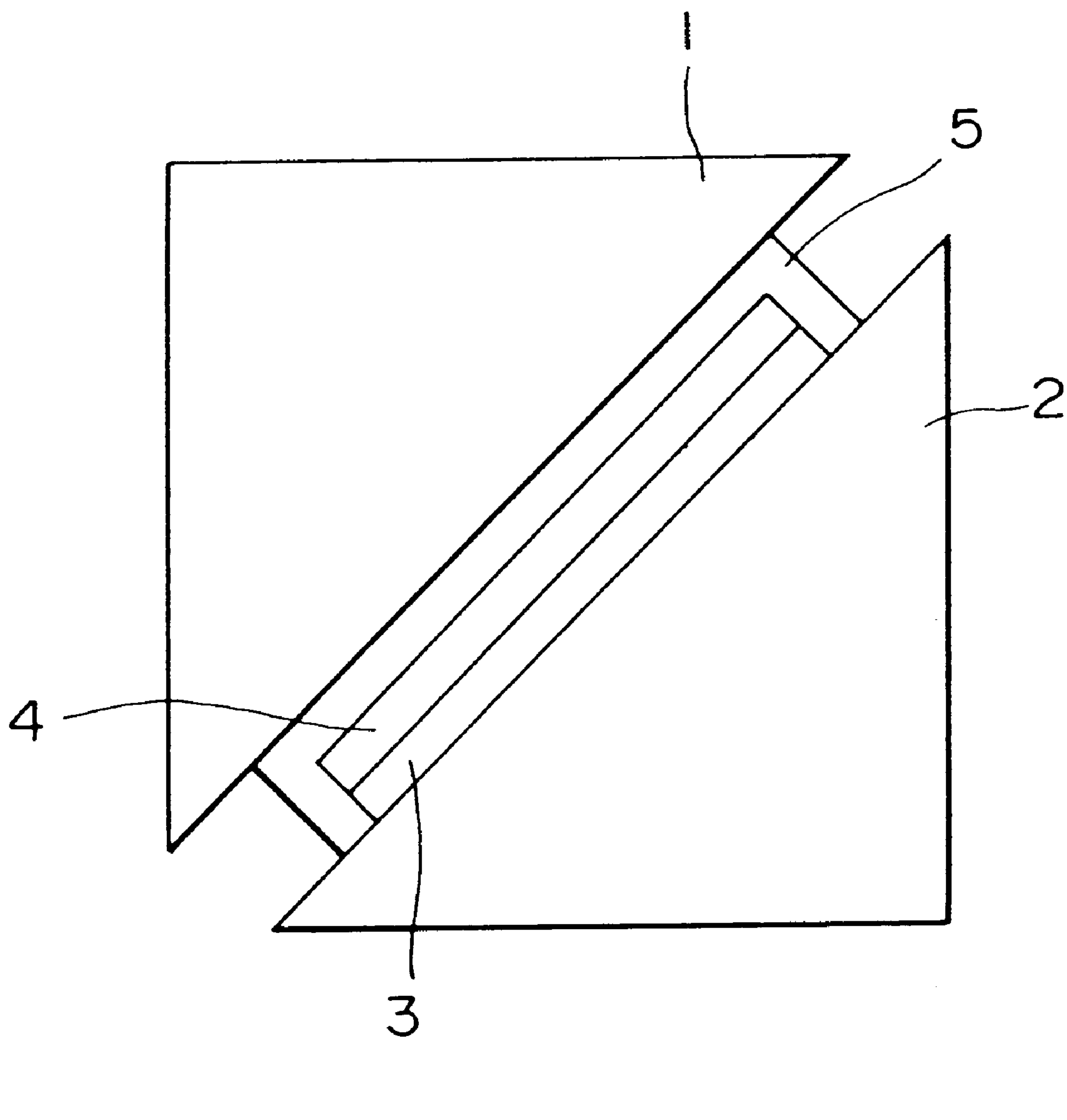
FIG. 15 is a schematic sectional view showing an example of the structure of a further polarizing beam splitter (third structure embodiment) according to the present invention.

FIGS. 15 and 10 show a third embodiment of the structure of the polarizing beam splitter according to the present invention.

This structure embodiment is an example of the modification of the polarizing beam splitter according to the present invention in the arrangement thereof. Referring to FIG. 15, on a light-transmissive substrate 1, a first dielectric multilayer film 3 and a second dielectric multilayer film 4 are sequentially disposed or laminated, and another light-transmissive substrate 2 is further disposed thereon by the medium of an adhesive layer 5.

The structure of FIG. 15 has an advantage such that the film formation of the low-refractive index layer and high-refractive index layer may be accomplished at one time or in one batch. In other words, when the structure arrangement of the third embodiment of the polarizing beam splitter is used, the film formation of the dielectric multilayer film may be accomplished at one time or in one batch, and therefore the resultant productivity may be increased.

(Fourth embodiment of the structure of polarizing beam splitter)

The above-mentioned FIG. 11 shows a fourth embodiment of the structure of the polarizing beam splitter according to the present invention.

Referring to FIG. 11, the polarizing beam splitter of this structure embodiment has as structure wherein a substrate of a transparent flat plate 2 is used as a light-transmissive substrate, a first dielectric multilayer film 3 and a second dielectric multilayer film 4 are disposed on both sides of the substrate of a transparent flat plate 2, and further the resultant laminate is immersed in a liquid medium 6 having substantially the same refractive index as that of the substrate of the transparent flat plate 2. For examples it is preferred to use ethylene glycol (refractive index=1.43), benzene (refractive index=1.51), etc.

In general, when a prism is used as a light-transmissive substrates there is a possibility that birefringence can occur due to the non-uniformity in the material constituting the interior of the prism. Further, it is known that there can be a case wherein the state of polarization is changed and the characteristic of a linearly polarized light is deteriorated, when a beam of light passes through a light-transmissive substrate. In such a case, the problem of the birefringence in the light-transmissive substrate may be solved by adopting a structure using a liquid medium as in the above structure embodiment.

In addition, it is not necessary to use an expensive prism in the polarizing beam splitter having the above-mentioned structure of this fourth structure embodiment. As a result, it is possible to simplify the structure of an optical system, and to reduce the cost thereof, etc.

The meanings of the reference numerals used in the above FIGS. 6 to 15 are as follows.

- 1: First light-transmissive substrate (prism)
- 2: Second light-transmissive substrate (prism)
- 3: First dielectric multilayer film
- 4: Second dielectric multilayer film
- 5: Adhesive layer
- 6: Liquid media
- 11: High-refractive index substance having an optical film thickness of $\lambda_1/4$
- 12: Low-refractive index substance having an optical film thickness of $\lambda_1/4$
- 13: Alternate layer comprising a high-refractive index substance and a low-refractive index substance each having an optical film thickness of $\lambda_1/4$
- 1C: Adjusting layer having an optical film thickness of $\lambda_1/8$
- 21: High-refractive index substance having an optical film thickness of $\lambda_2/4$
- 22: Low-refractive index substance having an optical film thickness of $\lambda_2/4$ 23: Alternate layer comprising a high-refractive index substance and a low-refractive index substance each having an optical film thickness of $\lambda_2/4$ 2C: Adjusting layer having an optical film thickness of $\lambda_2/8$ (Example of application of polarizing beam splitter)

Hereinbelow, there is described an example wherein the polarizing beam splitter according to the present invention is applied to a projector.

Figure 22:
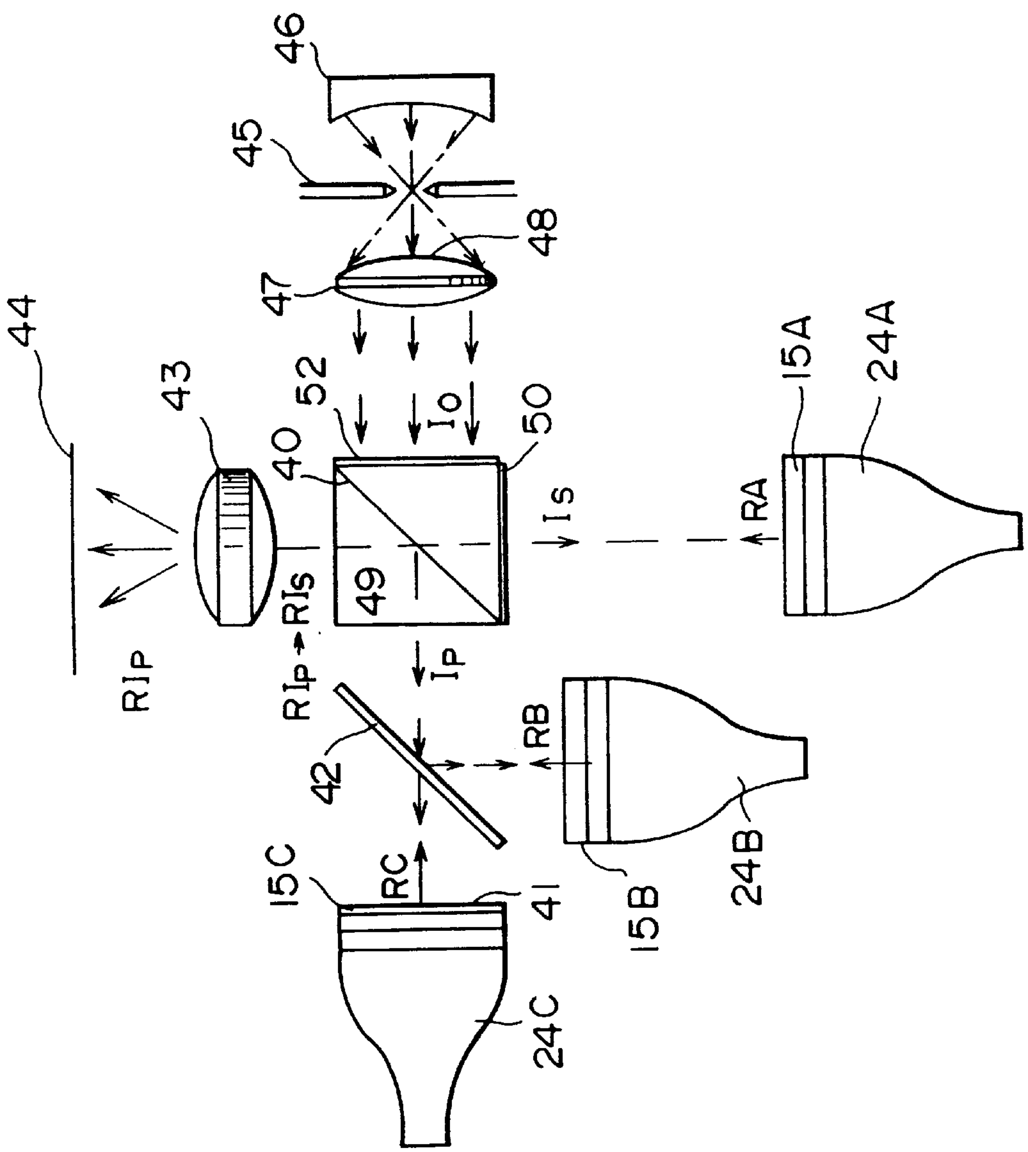
FIG. 22 is a schematic view showing an example of the structure of a projector utilizing a polarizing beam splitter according to the present invention.

FIG. 22 is a schematic view showing an example of the structure of a multi-color or full-color projector utilizing a polarizing beam splitter 40 according to the present invention (With respect to the details of such a projector, e.g., U.S. Pat. No. 4,127,322 may be referred to). The projector of this type is required to have a characteristic such that it can provide an image with a high contrast. In order to easily provide a high contrasts it is particularly preferred to use a polarizing beam splitter 40 having a high extinction ratio and being capable of suppressing the occurrence of non-uniformity in illuminance (that is, a polarizing beam splitter using an optical glass according to the present invention having a photoelastic constant C of substantially zero). The meanings of the reference numeral used in FIG. 22 are as follows:

15A, 15B, 15C: Optical valve (such as liquid crystal device)

24A, 24B, 24C: CRT

40: Polarizing beam splitter

41, 42: Dichroic mirror

43: Lens

44: Screen

45: Arc discharge tube

46: Spherical lens

47: Condenser/collimator lens

48: First optical axis

49: Glass cube

RA, RB, RC: Respective colors.

Figure 29:
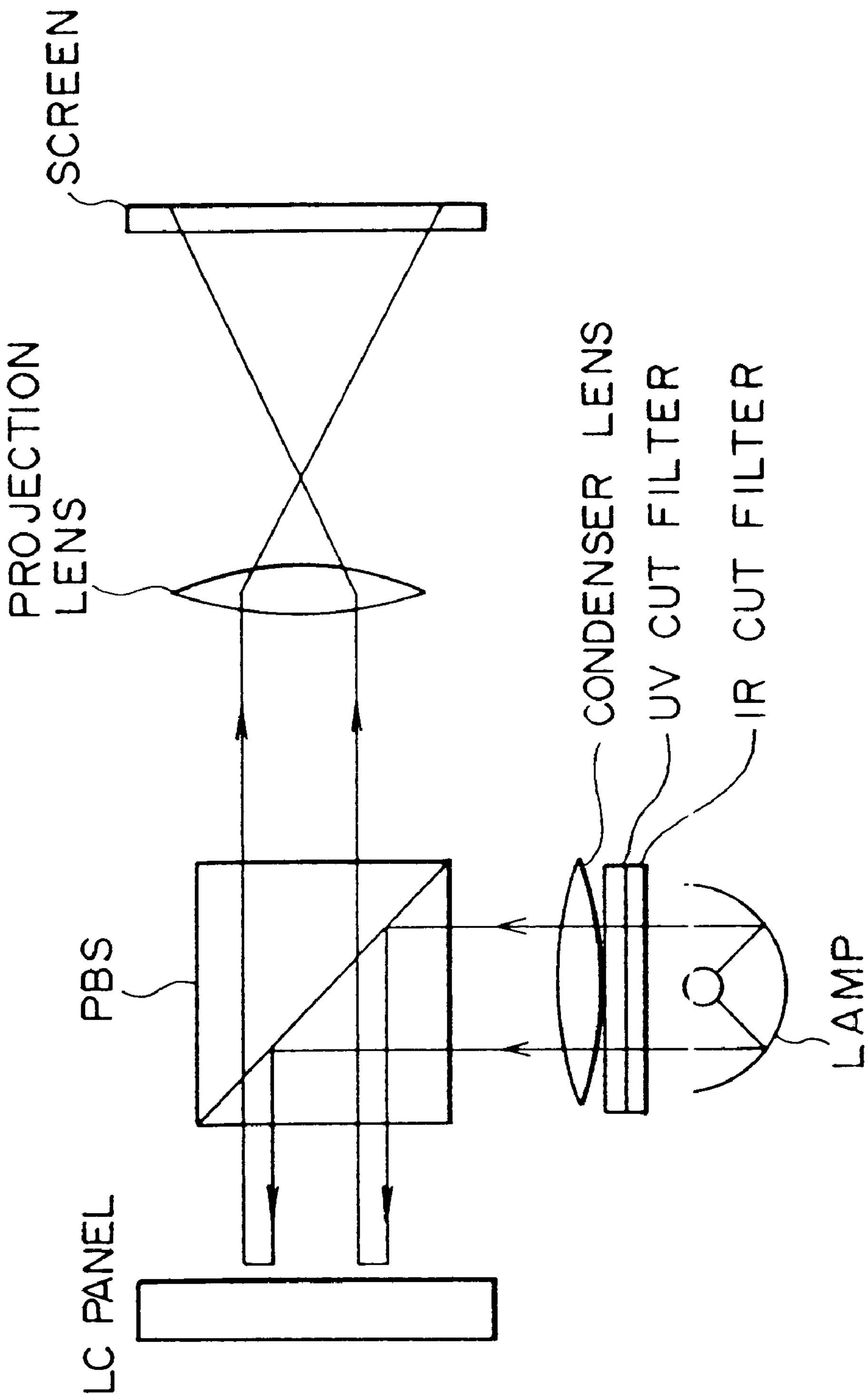
FIG. 29 is a schematic sectional view showing an example of the basic structure of a projector system utilizing a polarizing beam splitter which has been constituted by using the optical glass for polarizing optical system according to the present invention.

FIG. 29 is a schematic sectional view showing a basic example of the structure of the projector system using the polarizing beam splitter (PBS) according to the present invention. In this embodiment of FIG. 29, along an optical path, there are arranged a light source lamp, an IR-cutting filter, a UV-cutting filter, a condenser lens, the above-mentioned PBS, a liquid crystal (LC) device, (PBS), a projection lens, and a screen.

Hereinbelow, the present invention will be specifically described with reference to Examples, by which the present invention should not be limited.

EXAMPLES

Example 1

As respective raw materials for constituting respective glass compositions, there were provided corresponding oxides, carbonates, nitrates, etc. After these raw materials were highly refined in an ordinary manner, they were weighed (total weight of each batch: 100 to 500 g) in a box of which temperature had been set to room temperature, and mixed with each other so as to provide respective ratios (wt. %) as shown in FIG. 26 (Table 7) and FIG. 27 (Table 8) (wt. percents shown in the above FIGS. 26 to 28 were 100% in total).

The thus formulated raw materials were melted in a platinum crucible at 1000–1300 degrees by use of an electric furnace in the atmospheric air, and then the resultant mixture was subjected to clarification and stirring to be homogenized in an ordinary manner. Thereafter, the resultant mixture was casted into a metal mold (made of stainless steel) which had been preheated to 300–450 degrees in advance, and then gradually cooled or annealed, whereby seven kinds of optical glasses (Sample glass Nos. 21 to 27) for polarizing optical system were prepared.

With respect to each of the thus prepared glasses (No. 21 to 27), a photoelastic constant C for light having a wavelength of $\lambda$=633 nm, and a linear expansion coefficient were measured. At this time, the photoelastic constant C was obtained by the above-mentioned photoelastic modulation method, while using light having a wavelength of $\lambda$=633 nm, and the respective glass samples having a light transmission thickness of l (el)=10 mm as shown in the above-mentioned Equations (1) and (2). The thus obtained results are shown in FIGS. 26 to 28 (Tables 7 to 8).

As shown in the above Tables, this Example provided optical glasses for polarizing optical system having various kinds of compositions for providing a photoelastic constant C of substantially zero (C=−0.12 to 0.41).

Figure 28:
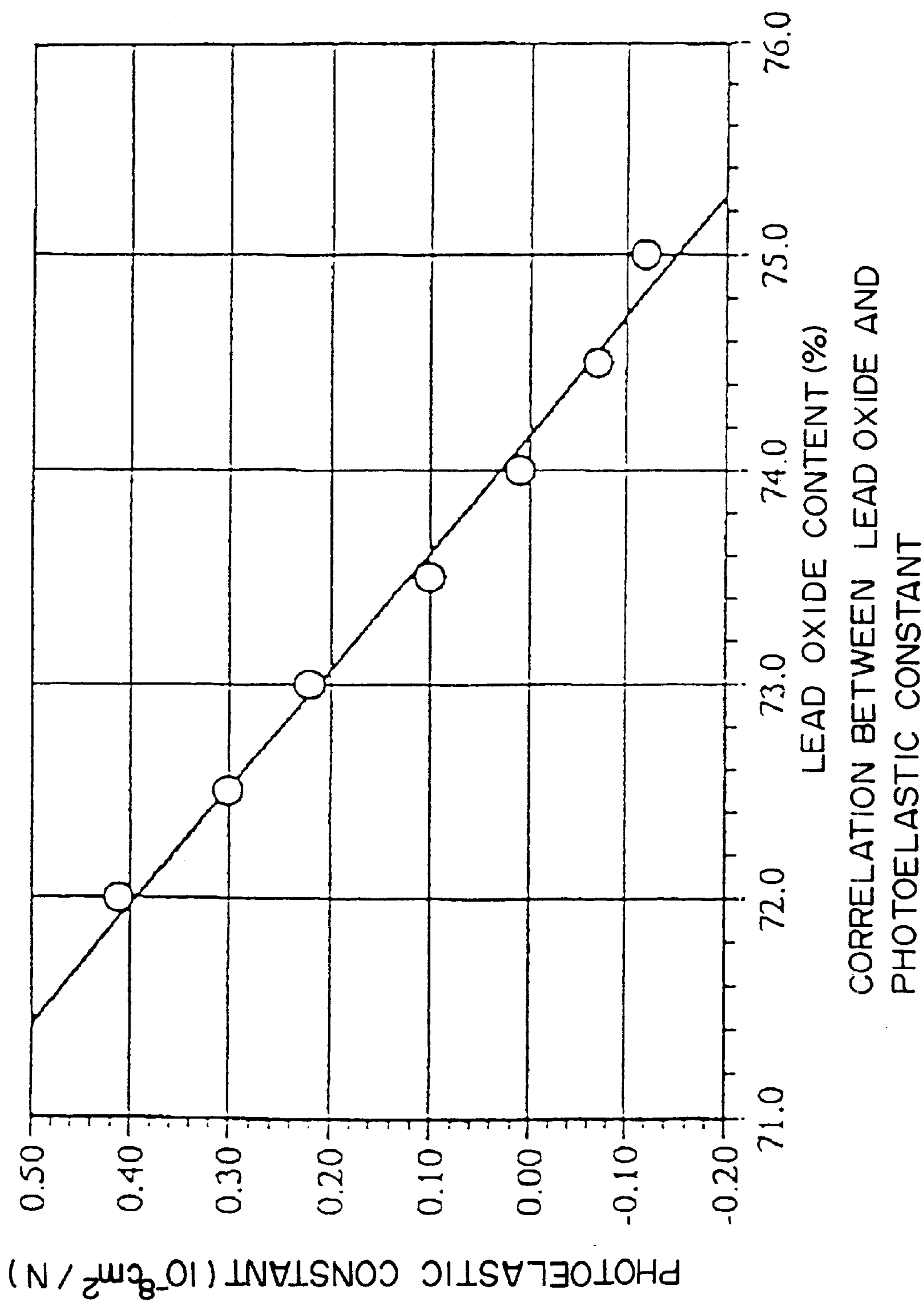
FIG. 28 is a graph showing a correlation between the lead oxide (PbO) content in the optical glass for polarizing optical system according to the present invention provided in Example 1, and the photoelastic constant C thereof.

FIG. 28 is a graph wherein the abscissa denotes the lead oxide (PbO) content and the ordinate denotes the photoelastic constant C, with respect to the each of the glasses (No. 21 to 27) as described above. In view of the graph of FIG. 28, it may be understood that the photoelastic constant C is decreased almost linearly along with an increase in the lead oxide content, and the constant becomes zero at a certain point and thereafter becomes a negative value.

With respect to a borosilicate glass "BK7" as a comparative example which has widely been used for conventional optical systems, the ratios of the components, and the measurement results of the photoelastic constant C for light having a wavelength of $\lambda$=633 nm, and the linear expansion coefficient are shown in FIG. 27 (Table 8).

In view of these FIGS. 26–28 (Table 7–8), it may be understood that the photoelastic constants C of the optical glass according to the present invention (Sample Nos. 21–27) are much smaller than that of the conventional glass "BK7", and particularly, the optical glasses of No. 24 to 26 had a photoelastic constant C in an extremely small range (−0.07 to +0.10).

In addition, the linear expansion coefficients of the optical glasses of Nos. 21–27 according to the present invention are at substantially the same level as that of the "BK7". Accordingly, it may be understood that even when the optical glasses of Nos. 21–27 according to the present invention are used instead of the "BK7", holders for holding the optical glass, or other optical elements are not adversely affected by a difference in the thermal expansion coefficients therebetween.

Example 2

The degrees of the birefringence of the Sample glass Nos. 22, 24 and 25 prepared in Example 1, and the commercially available borosilicate glass BK7 (mfd. by Schott Co., Germany) were measured by use of an apparatus as shown in FIGS. 4 and 5 under the application of a stress of about 30 $N/cm^2$.

More specifically, a sample of each of the glasses having a known size l (el)=10 mm was used for the measurement, the birefringence thereof was measured by using light having a known wavelength of $\lambda$=633 nm under the application of a known uniaxial stress $\sigma_2$ for providing a relationship of $\sigma_1=\sigma_3=0$ in the above-mentioned Equations (1) and (2), whereby an optical path difference Δφ (nm/cm) per 1 cm of the sample glass was obtained. The thus obtained measurement results are shown in FIG. 21 (Table 6) and in the following table.

No. of sample glass: No. 24

Stress: 31.0 $N/cm^2$

Degree of birefringence: 3.10 nm/cm

As shown in the above FIG. 21 (Table 6), the optical glass for polarizing optical system showed an extremely small values as compared with that of the commercially available borosilicate glass BK7.

Example 3

The refractive indices of the Sample glass Nos. 21 to 27 prepared in Example 1, and the commercially available borosilicate glass BK7 (mfd. by Schott Co., Germany) were measured by use of a commercially available apparatus for measuring refractive index, while using light having a wavelength of λ=587.6 nm, and a sample of each glass having a light transmittance thickness of l (el)=10 mm.

The thus obtained measurement results are shown in FIG. 20 (Table 5).

Example 4

As respective raw materials for constituting respective glass compositions, there were provided corresponding oxides, fluorides, carbonates, nitrates, etc. They were weighed (total weight of each batch: 100 to 500 g) in a box of which temperature had been set to room temperature so as to provide respective ratios (wt. %) as shown in FIG. 16 (Table 1), FIG. 17 (Table 2), FIG. 18 (Table 3) and FIG. 19 (Table 4), and mixed with each other thereby to provide a formulated raw material. The above FIGS. 16 to 19 (Tables 1, 2, 3 and 4) show ratios of the respective components calculated in terms of mol % and wt. % (percents shown in the respective batch were 100% in total).

The thus formulated raw materials were melted in a platinum crucible at 1000–1300 degrees by use of an electric furnace in the atmospheric air, and then the resultant mixture was subjected to clarification and stirring to be homogenized in an ordinary manner. Thereafter, the resultant mixture was casted into a metal mold (made of stainless steel) which had been preheated to 300–450 degrees in advance, and then gradually cooled or annealed, whereby 14 kinds of optical glasses (Sample glass Nos. 1 to 14) for a polarizing optical system were prepared With respect to each of the thus prepared glasses (Nos. 1 to 14), a refractive index $n_d$, a transmission spectrum at a thickness of 10 mm (wavelength corresponding to a transmittance of 80%), and a photoelastic constant C for light having a wavelength of λ=633 nm were measured. At this time, the photoelastic constant C was calculated by using the birefringence under the application of a stress obtained by the above-mentioned photoelastic modulation methods while using light having a wavelength of λ=633 nm, and the respective glass samples having a light transmission thickness of l (el)=10 mm as shown in the above-mentioned Equations (1) and (2). The thus obtained results are shown in FIGS. 16 to 19 (Tables 1, 2, 3 and 4).

As shown in the above tables, this Example provided optical glasses for polarizing optical system having various kinds of compositions for providing a photoelastic constant C of substantially zero (C=+0.01 to 0.04).

Example 5

Figure 23:
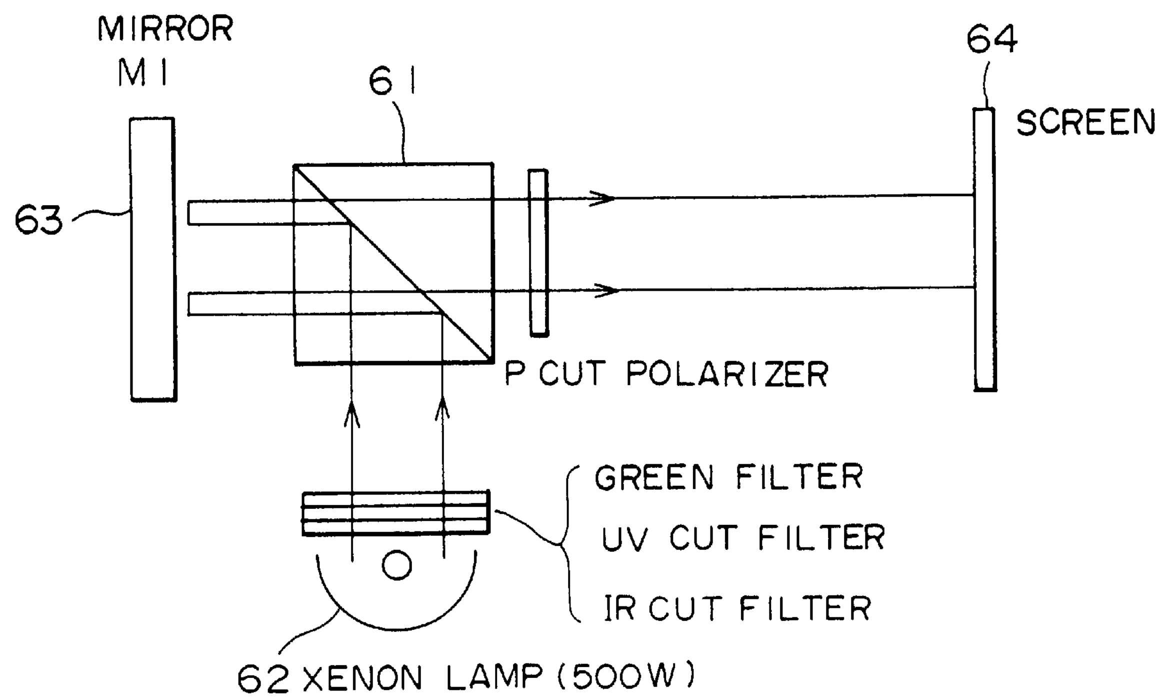
FIG. 23 is a schematic sectional view showing an example of the structure of an optical system for measuring the extinction ratio or illuminance non-uniformity of a polarizing beam splitter which has been constituted by using the optical glass for polarizing optical system according to the present invention.

A polarizing beam splitter (as shown in FIG. 7, the first embodiment of the structure) which had been constituted by using the optical glass for polarizing optical system (Sample No. 24) prepared in Example 1 as the material for the prisms 1 and 2, was evaluated by using an evaluation optical system shown by the schematic view of FIG. 23. The polarizing film of the polarizing beam splitter used herein was designed so as to provide a central wavelength of λ=540 nm corresponding to the wavelength of green.

Figure 24:
FIG. 24 is a photograph showing illuminance non-uniformity which was provided when a polarizing beam splitter constituted by using the optical glass for polarizing optical system according to the present invention was evaluated by using the measurement optical system of FIG. 23.

More specifically, a polarizing beam splitter 61 was illuminated with the light emitted from a xenon lamp 62 as a light source, the image of the xenon lamp 62 was projected onto a screen 64 by way of a mirror 63, and the resultant non-uniformity in the illuminance on the screen 64 was evaluated by use of a photograph taken by a camera. The results of the evaluation are shown in the photograph of FIG. 24, wherein a ghost image can be recognized. As shown in FIG. 24, very little non-uniformity was observed when the polarizing beam splitter using the optical glass according to the present invention having a photoelastic constant C of substantially zero was used.

Figure 25:
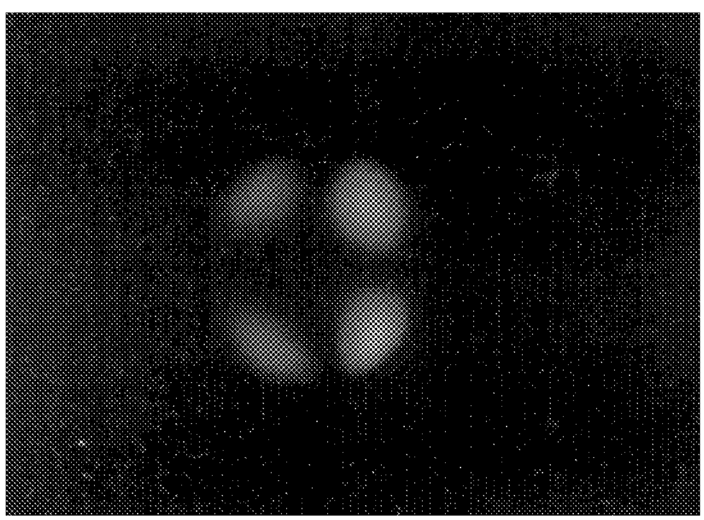
FIG. 25 is a photograph showing illuminance non-uniformity which was provided when a polarizing beam splitter constituted by using a conventional optical glass was evaluated by using the measurement optical system of FIG. 23.

On the other hand, non-uniformity was measured by using a polarizing beam splitter having the same structure as that described above in the same manner as in the above procedure, except that a conventional optical glass (borosilicate glass BK7, mfd. by Schott Co.) was used instead of the above-mentioned optical glass according to the present invention. As a result, marked non-uniformity in the illuminance was observed as shown in the photograph of FIG. 25.

Example 6

As respective raw materials for constituting respective glass compositions, there were provided corresponding oxides, fluorides, carbonates, nitrates, etc. These raw materials were weighed (total weight of each batch: 100 to 500 g) in a box of which temperature had been set to room temperature, and mixed with each other so as to provide respective ratios as shown in FIG. 34 (Table 9), FIG. 35 (Table 10) and FIG. 36 (Table 11).

The thus formulated raw materials were melted in a platinum crucible at 1000–1300 degrees by use of an electric furnace in the atmospheric air, and then the resultant mixture was subjected to plaining and stirring to be homogenized in an ordinary manner. Thereafter, the resultant mixture was casted into a metal mold (made of stainless steel) which had been preheated to 300–450 degrees in advances and then gradually cooled or annealed, whereby eight kinds of optical glasses for polarizing optical system were prepared.

The above FIG. 34 (Table 9), FIG. 35 (Table 10) and FIG. 36 (Table 11) show the ratios of the respective raw materials which have been converted into mol % and wt. % (these ratios shown in the above FIGS. 34 to 36 were respectively 100% in total).

With respect to each of the thus prepared glasses, there were measured the refractive index $n_d$, the wavelength at which the transmittance at a depth of 10 mm (i.e., internal transmittance of a 10 mm-thick sample) became 80%, and the photoelastic constant C for light having a wavelength of λ=633 nm. At this times the photoelastic constant C was obtained by using light having a wavelength of λ=633 nm, and the respective glass samples having a light transmission thickness of l (el)=10 mm as shown in the above-mentioned Equations (1) and (2).

Figure 37:
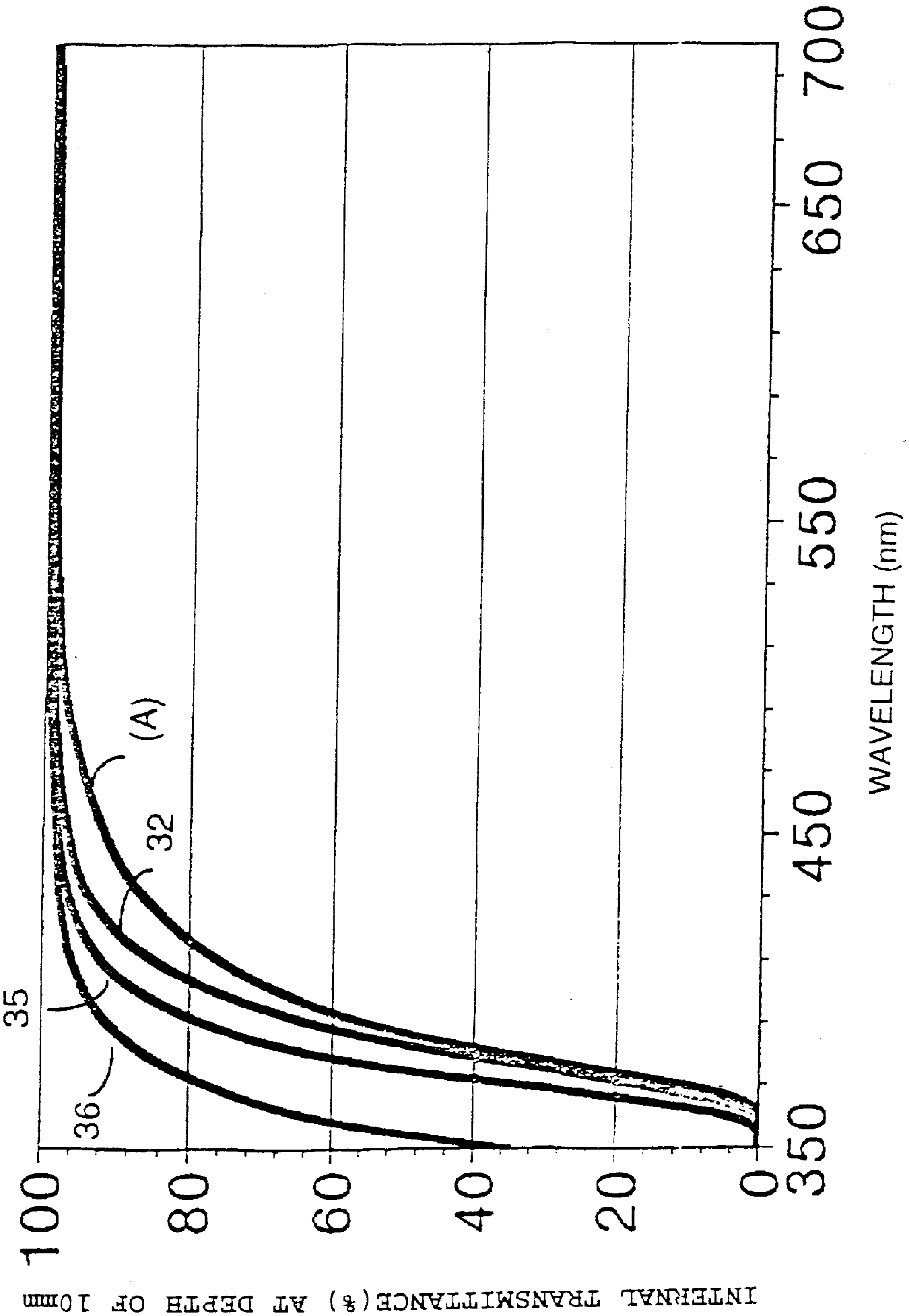
FIG. 37 is a graph showing spectral internal transmittance curves of the optical glasses of Samples Nos. 32, 35 and 36, and Comparative Sample (A) at a depth of 10 mm, which were prepared in Example 6.

The thus obtained results are shown in FIG. 34 (Table 9), FIG. 35 (Table 10) and FIG. 36 (Table 11). FIG. 34 (Table 9) also shows the raw material ratios for an optical glass (A) for polarizing optical system containing a predetermined amount of lead ions (as Reference Sample), and the similar measurement results therefor as described above. In addition, FIG. 37 is a graph showing the respective spectral transmission curves of Sample Nos. 32, 35 and 36; and the Reference Sample (A) at a depth of 10 mm thereof.

Example 7

As respective raw materials for constituting fluorophsphate glasses for polarizing optical system having predetermined refractive indices and Abbe's numbers, there were provided corresponding metaphosphoric acid salts, fluorides, oxides, carbonates, nitrates, etc. These raw materials were weighed and mixed with each other so as to provide respective ratios. The thus formulated raw materials were melted at 900–1300 degrees in an electric furnace, and then the resultant mixture was subjected to plaining and stirring to be homogenized. Thereafter, the resultant mixture was casted into a metal mold which had been preheated in advance, and then gradually cooled or annealed, whereby optical glasses for polarizing optical system were prepared.

The above FIG. 38 (Table 12) shows the ratios of the respective raw materials. Similarly, glasses of Samples 41–46 as shown in FIG. 39 (Table 13) were prepared.

With respect to each of the thus prepared glasses, there were measured the photoelastic constant C for light having a wavelength of $\lambda$=633 nm, the refractive index $n_d$, and transmittance at a depth of 10 mm (i.e., wavelength at which the transmittance became 80%). The thus obtained results are shown in FIG. 39 (Table 13).

At this time, the photoelastic constant C was obtained by using light having a wavelength of $\lambda$=633 nm, and the respective glass samples having a light transmission thickness of l (el)=10 mm as shown in the above-mentioned Equations (1) and (2). The thus obtained results are shown in FIG. 39 (Table 13). This FIG. 39 (Table 13) also shows similar measurement results for "BK7" mfd. by Schott Co., and an optical glass (A) for polarizing optical system containing a predetermined amount of lead ions (as Reference Samples).

FIG. 40 is a graph showing relationships among the refractive indices, Abbe's numbers and photoelastic constants of the respective Samples obtained in this Example. FIG. 41. is a graph showing spectral transmission curves of the respective Sample glasses obtained in this Example at a depth of 10 mm. Further, FIG. 42 is a graph showing the wavelength dependence of the photoelastic constant C in Sample Nos. 46, 41 and 47 (and Sample-A for the purpose of comparison) among the respective Sample glasses obtained in this Example.

As described above, from the above data, it may be understood that the optical glass according to the present invention have photoelastic constants C which are much smaller than that of the comparative glass sample of "BK7", and further they are superior to the optical glass for polarizing optical system containing a predetermined amount of lead ions, in transmittance in a shorter-wavelength visible region and in an ultraviolet region, and have Abbe's numbers $\nu_d$ which are much larger than that of the lead-containing glass.

As described hereinabove, the present invention provides an optical glass for polarizing optical system having a photoelastic constant C in the range of substantially zero with respect to a wavelength range of 0.4 $\mu$m to 3.0 $\mu$m.

As described above, the optical glass for polarizing optical system according to the present invention has an excellent characteristic such that it cause substantially no optical path difference based on an optical anisotropy, even when there occurs a mechanical external stress or a thermal stress. Accordingly, when the glass according to the present invention is applied to an optical element for a polarizing optical system, the polarizing characteristic of optical information may be well retained by substantially obviating the effect of the mechanical external stress or the thermal stress.

In an embodiment wherein the optical glass for polarizing optical system according to the present invention does not contain fluorine, an optical glass for polarizing optical system having a photoelastic constant C of substantially zero may easily be accomplished by selecting the composition ratio of PbO. Accordingly, it is possible for the glass according to the present invention to provide substantially no optical anisotropy, even when there occurs a mechanical external stress or a thermal stress in the glass.

In addition, in the present invention, when the fluorine/oxygen (F/O) ratio is selected, it is also possible to produce an optical glass for polarizing optical system which is capable of increasing or decreasing the refractive index thereof within a predetermined range while retaining the photoelastic constant C to substantially zero. As described above, according to the present inventions it is possible to easily provide an optical glass or an optical element (or an optical component) utilizing such a glass which has a refractive index suitable for the purpose of the use thereof while retaining a good polarizing characteristic. Accordingly, in the present invention, the degree of freedom or possibility in the optical design may be greatly enhanced.

More specifically, in the present inventions the latitude in the selection of an "optical thin film" which is to be determined on the basis of the refractive index of glass, is broadened, and the selection of the optical thin film is facilitated. In addition, the present invention enables an improvement in the transparency (or degree of coloring) at the wavelength corresponding to visible light, and therefore the optical glass may be applied to a larger number of optical elements. The optical glass according to the present invention may particularly preferably be used for a polarizing optical system or a polarizing beam splitter or a read-out transparent substrate for a spatial light modulator which is required to have a high-precision polarizing characteristic.

The present invention further provides an optical glass for polarizing optical system, which has the following composition when represented in terms of oxide mol %:

$B_2O_3$: 0–57.0 mol %
$Al_2O_3$: 0–13.0 mol %
($B_2O_3$+$Al_2O_3$: 0.1–57.0 mol %)
$SiO_2$: 0–54.0 mol %
($SiO_2$+$B_2O_3$+$Al_2O_3$: 43.0–57.0 mol %)
PbO: 43.0–45.5 mol %
$R_2O$ (R: Li, Na, K): 0–3.5 mol %
R'O (R': Mg, Ca, Sr, Ba): 0–12.0 mol %
$As_2O_3$+$Sb_2O_3$: 0–1.5 mol %; and further contains fluorine in the following range:

$F_2/(F_2+O_2)$: 0–0.1.

The present invention further provides an optical glass for polarizing optical system, which has the following composition when represented in terms of oxide mol %:

$B_2O_3$: 0–19.0 mol %
$Al_2O_3$: 0–13.0 mol %
($B_2O_3$+$Al_2O_3$: 2.0–19.0 mol %)
$SiO_2$: 38.0–54.0 mol %
($SiO_2$+$B_2O_3$+$Al_2O_3$: 43.0–57.0 mol %)

PbO: 43.0–45.5 mol %

$R_2O$ (R: Li, Na, K): 0–3.5 mol %

R'O (R': Mg, Ca, Sr, Ba): 0–12.0 mol %

$As_2O_3$+$Sb_2O_3$: 0–1.5 mol %; and further contains fluorine in the following range:

$F_2/(F_2+O_2)$: 0–0.1.

In the above optical glass for polarizing optical system according to the present invention, the coloring due to the elution of platinum which can occur at the time of the melting operation in a platinum crucible, as compared with that in the case of the conventional optical glass for polarizing optical system so that the transmittance thereof has been improved in the entire visible region. Therefore, such an optical glass is applicable to many optical elements. Particularly, the above optical glass is suitably usable for a read-out transparent substrate for a spatial light modulator or a polarizing beam splitter which is required to have a high-precision polarizing characteristic.

The present invention further provides a fluorophsphate optical glass for polarizing optical system having a refractive index $n_d$ of 1.43–1.65, and an Abbe's number $\nu_d$ of 62–96, the absolute value of the photoelastic constant C of the glass being $1.0\times10^{-8}$ $cm^2$/N or less at the wavelength of light to be used for the glass.

The above fluorophsphate optical glass for polarizing optical system according to the present invention has an extremely small optical path difference due to optical anisotropy (birefringence) even when it is subjected to possible mechanical external stress and thermal stress, and further the wavelength dependence thereof is also small. Accordingly, when the glass according to the present invention is used for a practical optical system, the effect of an undesirable optical path difference (birefringence), which can unintentionally occur in the case of the conventional glass, is minimized as completely as possible. In addition, the present invention provides a material which is excellent in the transmittance in a short-wavelength visible region and an ultraviolet region, as compared with that in the case of the conventional optical glass for polarizing optical system. Therefore, it becomes possible to design and manufacture a polarizing optical system which has excellent optical performances.

The present invention further provides a polarizing optical system comprising: at least, polarizing characteristic imparting means for imparting a polarizing characteristic to light emitted from a light source;

analyzer means for converting the polarizing characteristic into light intensity information; and output means for outputting the light intensity information;

at least one element constituting the polarizing characteristic imparting means comprising an optical glass having a photoelastic constant C in the range of substantially zero with respect to a wavelength range of 0.4 $\mu$m to 3.0 $\mu$m.

In the polarizing optical system using the above optical glass according to the present invention, factors capable of disturbing a polarizing information are removed as completely as possible before it passes through the analyzer unit. Therefore, it is possible to exactly convert the polarizing information into intensity information.

Further, the present invention also provides a polarizing beam splitter comprising a light-transmissive substrate, and a dielectric multilayer film disposed on the substrate; wherein the dielectric multilayer film comprises, at least a first dielectric multilayer film and a second dielectric multilayer film respectively having two design reference wavelengths $\lambda_1$ and $\lambda_2$ different from each other;

each of the first and second dielectric multilayer films comprises an alternate layer which includes an n-cycle (n: an integer) laminate of a basic cycle of a two-layer structure of a high-refractive index layer and a low-refractive index layer each having an optical film thickness of $\lambda_1/4$ or $\lambda_2/4$ respectively at the reference wavelength $\lambda_1$ or $\lambda_2$; and a thin-film adjusting layer comprising each one of the high-refractive index layer or the low-refractive index layer having an optical film thickness of $\lambda_1/8$ or $\lambda_2/8$ disposed on both sides of the alternate layer; and the alternate layers of the first and second dielectric multilayer films respectively comprise different combinations of substances.

According to the polarizing beam splitter according to the present invention having the above structure, based on the combination of the high-refractive index substance and the low-refractive index substance, or on the structure comprising the first and second dielectric multilayer films having different design reference wavelengths, it is possible to attain high degree of freedom with respect to the incident angle, and to attain high separation and/or composition between the P-polarized light component and the S-polarized light component over a wide wavelength range.

From the invention thus described, it will be obvious that the invention may be varied in many ways. Such variations are not to be regarded as a departure from the spirit and scope of the invention, and all such modifications as would be obvious to one skilled in the art are intended to be included within the scope of the following claims.

The basic Japanese Applications No.13570/1994 filed on Feb. 7, 1994, No.70623/1994 filed on Apr. 8, 1994, No.61034/1995 filed on Mar. 20, 1995, No.197622/1995 filed on Aug. 2, 1995 and No.198738/1995 filed on Aug. 3, 1995 are hereby incorporated by reference.

What is claimed is:

1. A polarizing optical system comprising:

polarizing characteristic imparting means for imparting a polarizing characteristic to light emitted from a light source;

an analyzer means for converting the polarizing characteristic into light intensity information; and output means for outputting the light intensity information, wherein the polarizing characteristic imparting means is a polarizer comprising an optical glass having a photoelastic constant C in the range of substantially zero for a wavelength range of 0.4 $\mu$m to 3.0 $\mu$m.

2. A polarizing optical system according to claim 1, further including a light source, and a spatial light modulator (SLM), wherein the polarizing is a transmission type and the optical system has a function of an SLM projector.

3. A polarizing optical system according to claim 1, further including a light source, and an object to be observed, wherein the optical system has a function of a polarizing microscope.

4. A polarizing optical system according to claim 1, wherein the photoelastic constant C is in the range of −0.8 to +0.8 ($10^{-8}$ $cm^2$/N).

5. A polarizing optical system according to claim 4, wherein the photoelastic constant C is in the range of −0.1 to +0.1 ($10^{-8}$ $cm^2$/N).

6. A polarizing optical system according to claim 1, wherein the optical glass has the following composition when represented in terms of wt. % of oxide:

$SiO_2$: 17.0–27.0% (35.5–57.0 mol %)

$Li_2O+Na_2O+K_2O$: 0.5–5.0% (0.7–20.0 mol %)

PbO: 72.0–75.0% (39.1–45.0 mol %)

$As_2O_3+Sb_2O_3$: 0–3.0% (0.0–2.0 mol %).

7. A polarizing optical system according to claim 1, wherein the optical glass has the following composition when represented in terms of mol %:

$SiO_2$: 40.0–54.0 mol %

$R_2O$ (R: alkali metal): 0.5–9.0 mol %

PbO: 43.0–45.5 mol %

$As_2O_3+Sb_2O_3$: 0–1.5 mol %; and further contains fluorine in the following range when represented in terms of mol %:

fluorine/oxygen (F/O) ratio: 0.1–18.0 mol %.

8. A polarizing optical system according to claim 1, wherein the optical glass has the following composition when represented in terms of mol %:

$SiO_2$: 40.0–54.0 mol %

$R_2O$ (R: alkali metal): 0.5–9.0 mol %

RF: 0–16.0 mol %

$R_2SiF_6$: 0–3.3 mol %

$PbO+PbF_2$: 43.0–45.5 mol %

$PbF_2$: 0–10.0 mol %

$As_2O_3+Sb_2O_3$: 0–1.5 mol %; and further contains fluorine in the following range in terms of mol %:

fluorine/oxygen (F/O) ratio: 0.1–18.0 mol %.

9. A polarizing optical system according to claim 1, wherein the optical glass has the following composition when represented in terms of oxide mol %:

$B_2O_3$: 0–57.0 mol %

$Al_2O_3$: 0–13.0 mol %

($B_2O_3+Al_2O_3$: 0.1–57.0 mol %)

$SiO_2$: 0–54.0 mol %

($SiO_2+B_2O_3+Al_2O_3$: 43.0–57.0 mol %)

PbO: 43.0–45.5 mol %

$R_2O$ (R: Li, Na, K): 0–3.5 mol %

R'O (R': Mg, Ca, Sr, Ba): 0–12.0 mol %

$As_2O_3+Sb_2O_3$: 0–1.5 mol %; and the optical glass further contains fluorine in the following range:

$F_2/(F_2+O_2)$: 0–0.1.

10. A polarizing optical system according to claim 1, wherein the optical glass has the following composition when represented in terms of oxide mol %:

$B_2O_3$: 0–19.0 mol %

$Al_2O_3$: 0–13.0 mol %

($B_2O_3+Al_2O_3$: 2.0–19.0 mol %)

$SiO_2$: 38.0–54.0 mol %

($SiO_2+B_2O_3+Al_2O_3$: 43.0–57.0 mol %)

PbO: 43.0–45.5 mol %

$R_2O$ (R: Li, Na, K): 0–3.5 mol %

R'O (R': Mg, Ca, Sr, Ba): 0–12.0 mol %

$As_2O_3+Sb_2O_3$: 0–1.5 mol %; and the optical glass further contains fluorine in the following range when represented in terms of mol %:

($F_2/F_2+O_2$): 0–0.1%.

11. A polarizing optical system according to claim 1, wherein the optical glass comprises a fluorophsphate optical glass having a refractive index $n_d$ of 1.43–1.65, and an Abbe's number $\nu_d$ of 62–96, the absolute value of the photoelastic constant C of the glass being $10\times10^{-8}$ $cm^2/N$ or less at the wavelength of light to be used for the glass.

12. A polarizing optical system according to claim 11, wherein the wavelength is in the range of 0.3 μg to 3.0 μm.

13. A polarizing optical system according to claim 11, wherein the variation in the photoelastic constant C in the light wavelength range of 0.4 μm to 0.7 m is $0.3\times10^{-8}$ $cm^2/N$ or less.

14. A polarizing optical system comprising:

a polarizer comprising an optical glass having a photoelastic constant C in the range of substantially zero for a wavelength range of 0.4 μm to 3.0 μm;

an analyzer means for converting light polarized by the polarizer into light intensity information; and output means for outputting the light intensity information.

15. A polarizing optical system according to claim 14, further including a light source and a spatial light modulator (SLM), wherein the polarizer is a transmission type and the optical system has a function of an SLM projector.

16. A polarizing optical system according to claim 14, further including a light source and an object to be observed, wherein the optical system has a function of a polarizing microscope.

17. A polarizing optical system according to claim 14, wherein the photoelastic constant C is in the range of −0.8 to +0.8 ($10^{-8}$ $cm^2/N$).

18. A polarizing optical system according to claim 17, wherein the photoelastic constant C is in the range of −0.1 to +0.1 ($10^{-8}$ $cm^2/N$).

19. A polarizing optical system according to claim 14, wherein the optical glass has the following composition when represented in terms of wt. % of oxides:

$SiO_2$: 17.0–27.0% (35.5–57.0 mol %)

$Li_2O+Na_2O+K_2O$: 0.5–5.0% (0.7–20.0 mol %)

PbO: 72.0–75.0% (39.1–45.0 mol %)

$As_2O_3+Sb_2O_3$: 0–3.0% (0.0–2.0 mol %).

20. A polarizing optical system according to claim 14, wherein the optical glass has the following composition when represented in terms of mol %:

$SiO_2$: 40.0–54.0 mol %

$R_2O$ (R: alkali metal): 0.5–9.0 mol %

PbO: 43.0–45.5 mol %

$As_2O_3+Sb_2O_3$: 0–1.5 mol %; and further contains fluorine in the following range when represented in terms of mol %:

fluorine/oxygen (F/O) ratio: 0.1–18.0 mol %.

21. A polarizing optical system according to claim 14, wherein the optical glass has the following composition when represented in terms of mol %:

$SiO_2$: 40.0–54.0 mol %

$R_2O$ (R: alkali metal): 0.5–9.0 mol %

RF: 0–16.0 mol %

$R_2SiF_6$: 0–3.3 mol %

$PbO+PbF_2$: 43.0–45.5 mol %

$PbF_2$: 0–10.0 mol %

$As_2O_3+Sb_2O_3$: 0–1.5 mol %; and further contains fluorine in the following range in terms of mol %:

fluorine/oxygen (F/O) ratio: 0.1–18.0 mol %.

22. A polarizing optical system according to claim 14, wherein the optical glass has the following composition when represented in terms of oxide mol %:

$B_2O_3$: 0–57.0 mol %

$Al_2O_3$: 0–13.0 mol %

($B_2O_3$+$Al_2O_3$: 0.1–57.0 mol %)

$SiO_2$: 0–54.0 mol %

($SiO_2$+$B_2O_3$+$Al_2O_3$: 43.0–57.0 mol %)

PbO: 43.0–45.5 mol %

$R_2O$ (R: Li, Na, K): 0–3.5 mol %

R'O (R': Mg, Ca, Sr. Ba): 0–12.0 mol %

$As_2O_3$+$Sb_2O_3$: 0–1.5 mol %; and the optical glass further contains fluorine in the following range:

$F_2/(F_2+O_2)$: 0–0.1.

23. A polarizing optical system according to claim 14, wherein the optical glass has the following composition when represented in terms of oxide mol %:

$B_2O_3$: 0–19.0 mol %

$Al_2O_3$: 0–13.0 mol %

($B_2O_3$+$Al_2O_3$: 2.0–19.0 mol %)

$SiO_2$: 38.0–54.0 mol %

($SiO_2$+$B_2O_3$+$Al_2O_3$: 43.0–57.0 mol %)

PbO: 43.0–45.5 mol %

$R_2O$ (R: Li, Na, K): 0–3.5 mol %

R'O (R': Mg, Ca, Sr. Ba): 0–12.0 mol %

$As_2O_3$+$Sb_2O_3$: 0–1.5 mol %; and the optical glass further contains fluorine in the following range:

$F_2/(F_2+O_2)$: 0–0.1.

24. A polarizing optical system according to claim 14, wherein the optical glass comprises a fluorophsphate optical glass having a refractive index $n_d$ of 1.43–1.65, and an Abbe's number $\nu_d$ of 62–96, the absolute value of the photoelastic constant C of the glass being $1.0\times10^{-8}$ $cm^2/N$ or less at the wavelength of light to be used for the glass.

25. A polarizing optical system according to claim 24, wherein the wavelength is in the range of 0.3 $\mu$m to 3.0 $\mu$m.

26. A polarizing optical system according to claim 24, wherein the variation in the photoelastic constant C in the light wavelength range of 0.4 $\mu$m to 0.7 $\mu$m is $0.3\times10^{-8}$ $cm^2/N$ or less.

* * * * *